Oct. 10, 1967 H. P. ANDERSON ET AL 3,346,700

PRIVATE BRANCH EXCHANGE AUTOMATIC NUMBER IDENTIFICATION SYSTEM

Filed Aug. 17, 1964 13 Sheets-Sheet 1

INVENTORS H. P. ANDERSON
F. J. McMAHON
G. A. SCHARG
H. WINTER

BY Howard R. Popper

ATTORNEY

Oct. 10, 1967 H. P. ANDERSON ET AL 3,346,700

PRIVATE BRANCH EXCHANGE AUTOMATIC NUMBER IDENTIFICATION SYSTEM

Filed Aug. 17, 1964 13 Sheets-Sheet 2

FIG. 3 PART OF TRUNK SENSING CCT 30

Oct. 10, 1967

H. P. ANDERSON ET AL

PRIVATE BRANCH EXCHANGE AUTOMATIC NUMBER IDENTIFICATION SYSTEM 3,346,700

Filed Aug. 17, 1964

13 Sheets-Sheet 6

Oct. 10, 1967 H. P. ANDERSON ET AL 3,346,700

PRIVATE BRANCH EXCHANGE AUTOMATIC NUMBER IDENTIFICATION SYSTEM

Filed Aug. 17, 1964 13 Sheets-Sheet 7

Oct. 10, 1967

H. P. ANDERSON ET AL

PRIVATE BRANCH EXCHANGE AUTOMATIC NUMBER IDENTIFICATION SYSTEM 3,346,700

Filed Aug. 17, 1964

13 Sheets-Sheet 8

Oct. 10, 1967

H. P. ANDERSON ET AL

PRIVATE BRANCH EXCHANGE AUTOMATIC NUMBER IDENTIFICATION SYSTEM 3,346,700

Filed Aug. 17, 1964

13 Sheets-Sheet 9

United States Patent Office 3,346,700 Patented Oct. 10, 1967

3,346,700

PRIVATE BRANCH EXCHANGE AUTOMATIC NUMBER IDENTIFICATION SYSTEM

Harold P. Anderson, Lincroft, N.J., and Frank J. McMahon, West Los Angeles, Calif., and George A. Scharg, Holmdel, and Harry Winter, Franklin Township, Somerset County, N.J., assignors to Bell Telephone Laboratories, Incorporated, New York, N.Y., a corporation of New York

Filed Aug. 17, 1964, Ser. No. 389,993
31 Claims. (Cl. 179—27)

ABSTRACT OF THE DISCLOSURE

We disclose a system for automatically identifying a calling station within a private branch exchange by applying a pulse to a path which is unique to the combination of the calling station and the outgoing trunk seized on the call. The path includes magnetic core matrices which store the identities of the calling station and the seized trunk, a gate, and a checking element. A pulse is transmitted directly to the gate at the same time that the pulse is applied to the path unique to the calling station and outgoing trunk. Storage of the station and trunk identities in the respective matrices is permitted only when both pulses are received by the gate. The checking element, which is set when both pulses are received by the gate, is then interrogated and if it has been set the data in the matrices are read out and transmitted to the central office to which the PBX is connected. If, upon interrogation, the checking element is found not to have been set, additional identification pulses are transmitted until either a subsequent attempt results in the setting of the checking element or a predetermined number of attempts do not meet with success.

This invention is concerned with automatic number identification of telephone stations and, more particularly, with such stations as may be found in private branch exchanges in telephone systems.

Recently, communications systems of all kinds have had increased demands in terms of capacity and flexibility placed upon them by the extremely rapid increase in customer needs. Not only have the types of services become more extensive, but the fields of interest in which such services are now expected have proliferated. For example, in telephone systems, recent emphasis has been in the area of providing new and varied customer service facilities. This has been especially true up to the present time where so-called private or individual line customers are involved. That is, the individual line customer may desire and has in fact been furnished with, in many cases, the ability to secure direct (i.e., without operator intervention) telephonic communication with nearly all other subscribers in the domestic telephone network. Such an example is cited merely for illustrative purposes and can legitimately be said to represent only one of a multitude of services offered to such subscribers.

It is therefore natural that large corporate and office facilities would make similar and extensive demands for the provision of such services at their business locations. Since many large business and professional groups are linked for telephone communication through the use of a private branch exchange (PBX), the services alluded to above must be made available through the PBX switching network. This is most economically and practically done through the use of appliqué circuits which make use of already existing PBX equipment to the extent that such use is possible. Many of the services required by PBX extensions may be furnished thereto with no great amount of difficulty as long as intra-PBX switching is involved. However, more complex arrangements usually come into play when a PBX extension customer desires to dial out from the PBX and, for example, through the local central office to a distant point.

Whereas the home or private line subscriber is usually able to make a direct distance dial (DDD) call to such a point, ordinary business and commercial practice often precludes the corporation or office leasing the PBX from allowing all of its extension users to make such DDD or other toll calls. It should be emphasized that there are no technical obstacles to providing DDD service to PBX extension users; the basic problem involves the proper billing of such calls to the individual extensions. Usually, a technique which has become known as "restricted dialing" is relied on to allow different extension users to have limited access to the DDD network external to the PBX. (See R. D. Williams Patent 2,904,637, issued Sept. 15, 1959.) Unauthorized attempts to dial out from the PBX and to engage excluded DDD equipment will automatically result in operator intervention and perhaps occasional embarrassment and resentment. In order to commence a valid toll telephone connection from such a restricted PBX, even an authorized extension user is sometimes required to proceed through the local PBX operator in order to initiate and complete the call. This represents a considerable loss of time both in the completion of the call by the intervening operator and also in the frequently valuable time of the calling extension party.

The main reason for going through what appears to be a lengthy process is that such a process represents a usually reliable method for acquiring an accurate record of the precise extension number initiating such a service request. Thus, if a company has no desire to bill such toll calls to the individual extension originating them, it is a relatively srtaightforward matter for the PBX directory number to be billed for the call under the so-called "pilot billing" arrangements. However, although there have been several attempts over the years to provide automatic number identification (ANI) for individual private customers, without any operator intervention (see, for example, H. D. Cahill et al. Patent 3,071,650, issued Jan. 1, 1963, and H. R. Moore et al. application, Ser. No. 261,264, filed Feb. 27, 1963, now patent 3,243,514, issued March 29, 1966), little such development has been made in the area of PBX ANI.

Working within the confines of the present PBX arrangements, certain expedients have been attempted, none of which have proved entirely satisfactory. One such attempt involves an operator interrogation of the calling extension wherein the calling party is requested to give to the operator his extension listing. Such a procedure, while normally operative, is subject to the time delays referred to above and is also subiect to occasional human errors.

Another approach, utilizable in locations where extensive PBX demands equal or exceed those of the other lines connected to the community central office, is illustrated in L. T. Anderson et al. Patent 3,102,930, issued Sept. 3, 1963. In that arrangement, the PBX extensions appear as ordinary lines in the associated central office, so that toll call charges will be billed to the extensions. However, this system will find few applications in areas where separate line appearances cannot be feasibly or economically given to each PBX extension.

Where efforts have been made in the prior art to provide apparatus to furnish PBX ANI, the structure suggested, while fully practicable, has often been somewhat cumbersome and has required a slavish dependence on central office control. For example, certain of these prior art arrangements could not make a complete identification in response to a trunk seizure from a PBX extension; all that was thereby accomplished was the connection of such an extension through the seized trunk circuit to a central office terminal. The required identification, however, did not yet commence and was in fact dependent upon either the initiation of dialing by the PBX extension or the transmission of a signal from the central office to the PBX indicating that the identification sequence could begin. Furtherfore, the PBX identification equipment was only arranged to furnish the particular station number desired. Complete and accurate correlation of calling and accounting records also required the detection and registration of the particular trunk number involved. In these prior art arrangements, the trunk number identification was acquired by the central office equipment itself as a prerequisite to the acquisition and identification of the station number involved. Thus, if an accurate and valid trunk number identification was not made by the master central office equipment, no valid station number identification could subsequently be made by the dependent PBX equipment. (See, for example, O. H. Williford Patent 3,062,918, issued Nov. 6, 1962.) Such arrangements, while being fully operative for the purposes for which they were designed, were relatively slow operating and lacked the independence from the central office equipment which would have otherwise allowed the acquisition of trunk and station number identifications without any significant reliance on the central office equipment.

In addition to the above factors, the PBX aspect of the identification problem presents occasional additional difficulties. For example, the problem of reliability and signal validity often occurs more frequently within PBX switching equipment than in other switching systems. The reasons for this problem include certain complexities of electrical interaction such as relay switching transients, stray ground signals in the PBX switch train, occasional pulse mutilation, etc. These problems, while not peculiar to PBX's, might be said to be found in concentrated form in these exchanges. It is therefore apparent that when PBX ANI is considered, major problems of economy, accuracy, speed and flexibility are involved.

It is therefore an object of this invention to improve automatic number identification arrangements in conjunction with a private branch telephone exchange.

It is an additional object of this invention to provide a more reliable identification process for a PBX extension on outgoing calls.

It is also an object of this invention to furnish automatic identification of PBX extensions to allow for expanded dialing and increased services for PBX customers.

Still another object of this invention is to free the PBX ANI equipment from the central office equipment during the determination of identification data individual to a particular calling extension, thereby allowing the common central office equipment to accomplish other switching functions.

INTRODUCTION

One particular embodiment of this invention is arranged to be generally compatible with many types of PBX switching equipment. Moreover, the automatic number identification equipment is arranged to operate immediately upon an outgoing trunk seizure by a PBX extension user regardless of the type of call to be subsequently dialed by such an extension caller. That is, the equipment of this embodiment of the invention will, independently of any central office instructions, acquire both the trunk and station number identifications related to the calling extension immediately in response to a trunk seizure by that station; in almost all cases, this information (as well as other identification indicia in certain instances) will have been transmitted to the appropriately responsive equipment at the central office prior to the dialing of any outgoing digit by the PBX extension. Then, depending upon the type of call (e.g., a DDD or toll call) initiated by the extension, the central office equipment may at its "leisure" utilize the digital information for accounting or billing purposes if such action is called for.

It should also be emphasized that the transmission of such identification information to the central office will permit common equipment thereat to perform a variety of useful functions, such as traffic surveys or call tracing. The point to be made, therefore, is that the identification sequence will be completed in most cases prior to the initiation of dialing or certainly prior to its completion, and that the full complement of identification data will be acquired from each extension on each outgoing trunk seizure call, regardless of whether the PBX extension user later dials a toll call or not.

This description will be commenced with the initiation of an outgoing trunk call by a PBX extension user dialing the digit "9." The PBX switching system in the conventional manner (see for example R. D. Williams Patent 2,904,637, issued Sept. 15, 1959) seizes an outgoing trunk circuit to the central office. The ANI appliqué circuit of the present invention includes a sensing circuit common to all of the PBX trunk circuits. This sensing circuit detects the seizure of a trunk circuit during the initiation of an outgoing call and informs a trunk scanner circuit to cease scanning while the identification of this particular seizure is made. The combined effect of the scanner and the sensing circuits serves to operate switches to establish a connection from the common automatic number identification (ANI) equipment to a plurality of trunk circuits, one of which is the trunk which has been seized by the outgoing service request. The operation of these switches provides the initial energization signal for the ANI equipment and a "start" signal is provided to a supervisory control circuit.

This entire PBX ANI system is synchronously controlled by alternately phased power pulses which are arranged to activate selected circuits in the system at discrete times and intervals so as to avoid any race conditions or erroneous interaction. For example, the start signal can be arranged to initially energize the ANI equipment on one phase of the control power pulses while certain steps which must be taken in response to the ANI start signal can appropriately be arranged to occur on either the following phase or on the next cycle of the pulse which originally initiated the ANI start signal. The instant invention therefore provides what will hereinafter be referred to as a "clear-write-check" cycle of pulsing. That is, in response to the start signal, and to insure that certain circuit elements are reset, a "clear" signal is provided through such elements in the system to prepare them for the subsequent transmission of an identification signal. The "write" or identification signal proceeds through selected ones of the circuit elements to provide storage of data individual to the particular outgoing call; the "checks" signal then makes a determination of the validity of this storage.

Storage of identification data individual to the PBX station which has gone off hook (including, for example, the station number thereof and the trunk number related to the trunk circuit which has been seized) is provided by respective switching matrices. The matrices are linked over an electrical path (the sleeve lead of the established connection) connecting the seized trunk, the intermediate switches within the local PBX switch train, and the sleeve lead of the station line circuit. A trunk number matrix is connected to the trunk side of the PBX switch train and a station number matrix is connected to the station sleeve lead side of the PBX switch train. Magnetic storage cores in each of the matrices are responsive to the energization of their associated trunk and station circuits respectively. Thus, without any dependence upon or signal from the central office equipment, the identification or "write" signal of the instant invention is generated (on a phase subsequent to the clear signal). The write pulse is transmitted through the switching cores in the trunk matrix corresponding to the seized trunk, and then over the above-mentioned electrical path back to the off-hook station's sleeve lead and from the sleeve lead to the appropriately responsive cores within the station number matrix.

When the write signal is generated, it is transmitted concurrently to one terminal of a matrix enable gate and also over the path through the various matrices and the PBX switch train mentioned above. From the station matrix, the write signal is transmitted to the control circuitry to therein indicate a successful transmission through the use of a special storage core. Finally, the write signal is transmitted to a separate terminal on the matrix enable gate. In order for such a signal to be successfully transmitted over both of the above-mentioned electrical paths, the matrix enable gate must be energized correspondingly at both of its terminals. The present arrangement thereby protects against the effects of the loss or mutilation of the write signal while it is being transmitted back over the switch train, and also against the generation of possible stray or transient signals which might simulate a write identification signal.

It should be borne in mind at this point that all the identification sequence steps described so far and in fact in all likelihood all those yet to be described will have occurred prior to the extension user dialing the called directory number. Thus, the information to be derived in this identification sequence will be available at the particular data repository (e.g., the central office) at a conveniently early point in the switching sequence. The next phase of the sequence involves the transmission of a "check" signal to a checking element in the control circuitry which will only be responsive to such a signal if this element had been priorly switched by a valid write signal. Continuing with the assumption of a valid identification, the control circuitry responds to the check signal by engaging a communications link which provides data from the PBX to a central office or other data collecting location; an additional function of the check signal is to provide an inhibit signal to inhibit the operation of other circuitry to be described infra which might otherwise initiate additional switching sequences.

During the time interval subsequent to this "bid" or request signal to the central office and a response therefrom, no additional action is taken by the system. In the vast majority of cases, the reply or command signal from the central office will be almost instantaneous and this initiates the readout sequence.

The data is sequentially read out of the matrices under the control of a readout circuit which serves to transmit readout signals to the matrices and to thereafter provide the data to the central office or other data repository via a data link. Each step of the readout sequence is synchronously controlled so that no difficulty arises as to overlapping digital information or as to any race conditions. It will be recalled that the scanning sequence has been temporarily interrupted by the initiation of the identification procedure and at this point (during readout), nothing has occurred to restart the scanning circuit. However, when readout is completed, a signal is transmitted to allow the scanner to again commence scanning the central office trunk circuits. Thus, if a typical data message consisted of a plurality of bits representing in sequence a four-digit trunk number and a four-digit station number, scanning would be arranged to recommence subsequent to the transmission to the data receiver of the last data bit representing the units digit of the station number. Once scanning has again begun, the system continues to scan until a subsequent trunk seizure is detected and in such a case operation is as before.

However, assume that for some statistically improbable reason the initial attempt to energize the checking circuit and the matrices is ineffective because the write identification signal was not generated or was mutilated or diverted to a stray ground point in its transmission through the PBX switch train. In such an event, the matrix enable gate would not be energized and the subsequent check signal would reveal to the control circuitry that although an identification had been initiated, a valid write-in or identification had not in fact been made.

When such a failure is indicated, the control circuitry recycles and at least one more clear-write-check cycle occurs. A predetermined number of such cycles may advantageously be allowed to occur until either the predetermined number of such cycles has been reached or until a valid identification is made. Should the latter occur, the inhibit signal referred to above is finally generated and the system proceeds to bid for a data link, with readout following shortly thereafter. If no valid identification is made during the predetermined number of repetitive cycles, separate and independent timing means are included to simulate a valid identification sequence to the checking portion of the control circuitry. The first operation of this independent timer is arranged to make such a simulation after the termination of the final identification attempt; should this final identification be successful, the need for this initial timing-out arrangement is obviated. On the other hand, should there be a failure to identify on this final one of the predetermined number of attempts, this first operation of the independent timing means results in the same bid signal and subsequent readout of whatever data is stored in the matrices as was adverted to above.

The independent timer is uniquely arranged to prevent tying up the ANI equipment for too long an interval while awaiting the reply or command signal from the central office. Thus, it can be arranged so that the second independent operation of the timing means within the control circuitry serves to disconnect the ANI equipment from the particular trunk and station circuits involved in the call to be identified. That is, should a period of unusually burdensome traffic conditions exist in the central office equipment, the circuitry of the instant invention is arranged to achieve the most efficient and economically desirable result: to abandon the identification attempt under such adverse although unusual circumstances.

Under all of these various circumstances and situations, the termination of the readout sequence or the ultimate decision to abandon identification serves to initiate the scanning process until a new trunk seizure is detected.

In conjunction with the provision of automatic station identification for PBX extensions, the problem of identifying operator or attendant positions on outgoing calls arises. Such identification is, of course, desirable and necessary for the same reasons heretofore mentioned with reference to extension stations. That is, it may be convenient to have a record of all outgoing central office service requests (toll or otherwise) originated from PBX operator positions as well as from extensions. However, due to the unique manner in which some operators are linked to trunk circuits (e.g., by cord and jack arrangements or by the trunk pickup key in the cordless PBX of the Williams patent supra, as contrasted with the PBX switch train), it has priorly been difficult to secure the identification data of operator positions utilizing the same equipment as for regular extensions. The instant invention furnishes the desired operator identification without requiring any additional equipment; the trunk number identification is made in the usual manner, and the operator number identification is made through a unique use of portions of the station number matrix.

It is therefore a feature of this invention that identification means acquire information data relating to a PBX extension number initiating an outgoing central office call independently of central office control.

Another feature of this invention includes facilities for reliably performing such data acquisition through the use of multifunctional checking apparatus.

It is a further feature of the present invention that the identification means secure the numbers of the calling station and of the outgoing trunk seized by the PBX switching train by:

(a) Directing a "clear" pulse to a trunk number matrix and to a station number matrix,
(b) Directing a "write" pulse to the trunk number matrix and to a matrix enable gate,
(c) Receiving at the station number matrix over the switching train the pulse directed to the trunk number matrix,
(d) Applying the signal received by the station number matrix to a check storage element and to the matrix enable gate, and
(e) Validating the numbers in the respective matrices with the output of the check storage element and the matrix enable gate.

Still another feature of this invention includes facilities for repeating the identification attempts a predetermined plurality of times until a valid identification is made.

It is an additional feature of this invention that a dually energizable matrix enable gate checks an identification signal at different points in its transmission path.

Another feature of this invention includes synchronous controlling means for avoiding overlapping or improperly interacting electronic functions.

Another feature of this invention includes timing means for recycling the identification equipment by simulating additional successive start signals and for both simulating a valid identification after a predetermined number of identification attempts has been made and for terminating the entire switching sequence should the data receiving equipment fail to respond within a predetermined time interval.

Yet another feature of this invention includes means for providing automatic identification of outward-calling operator positions by utilizing portions of the swtiching matrices which ordinarily provide identification data only for PBX extensions.

A complete understanding of the invention may be gathered from the following description, the appended claims and the drawing in which:

Figure 8:
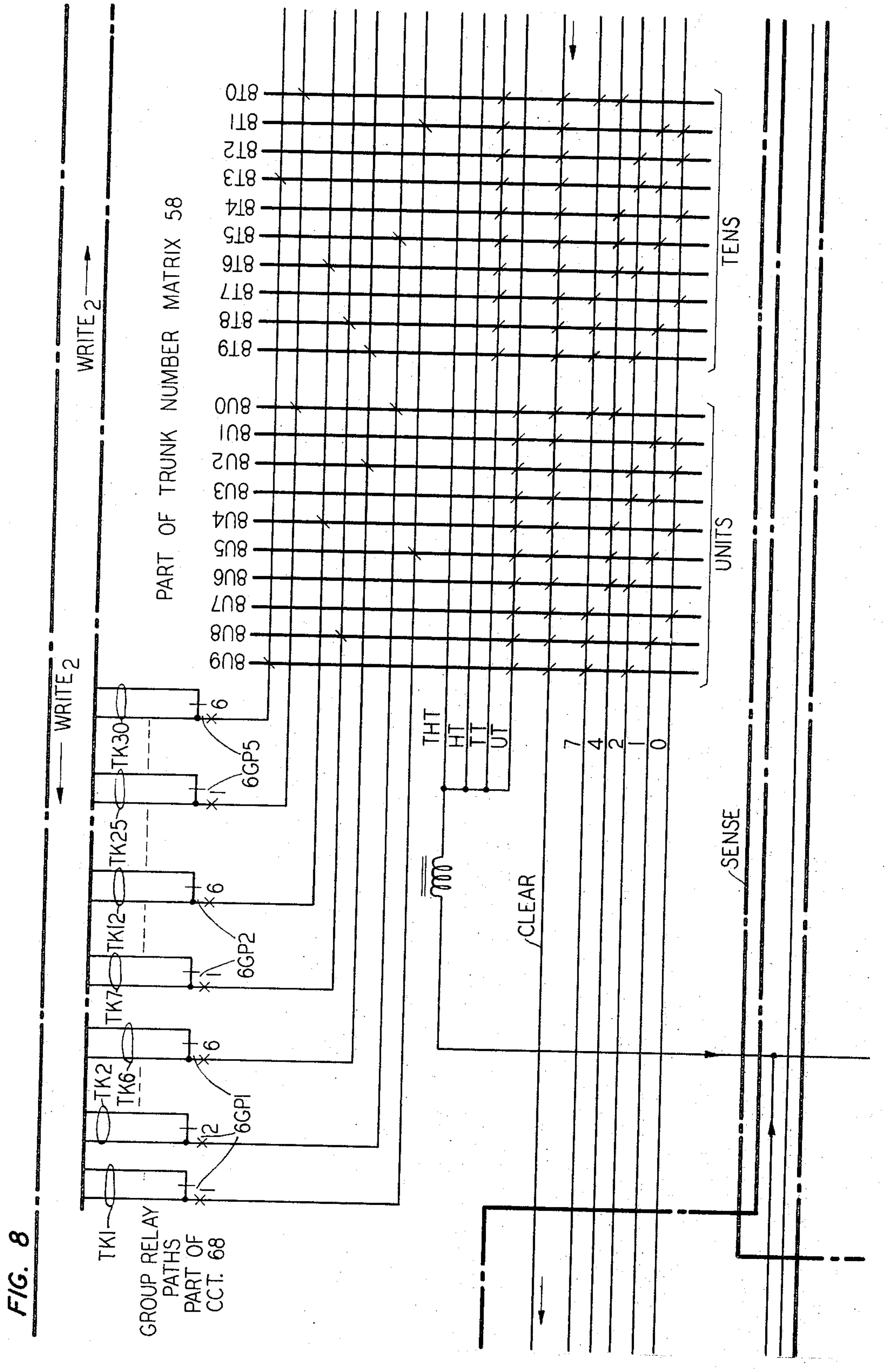
Figure 9:
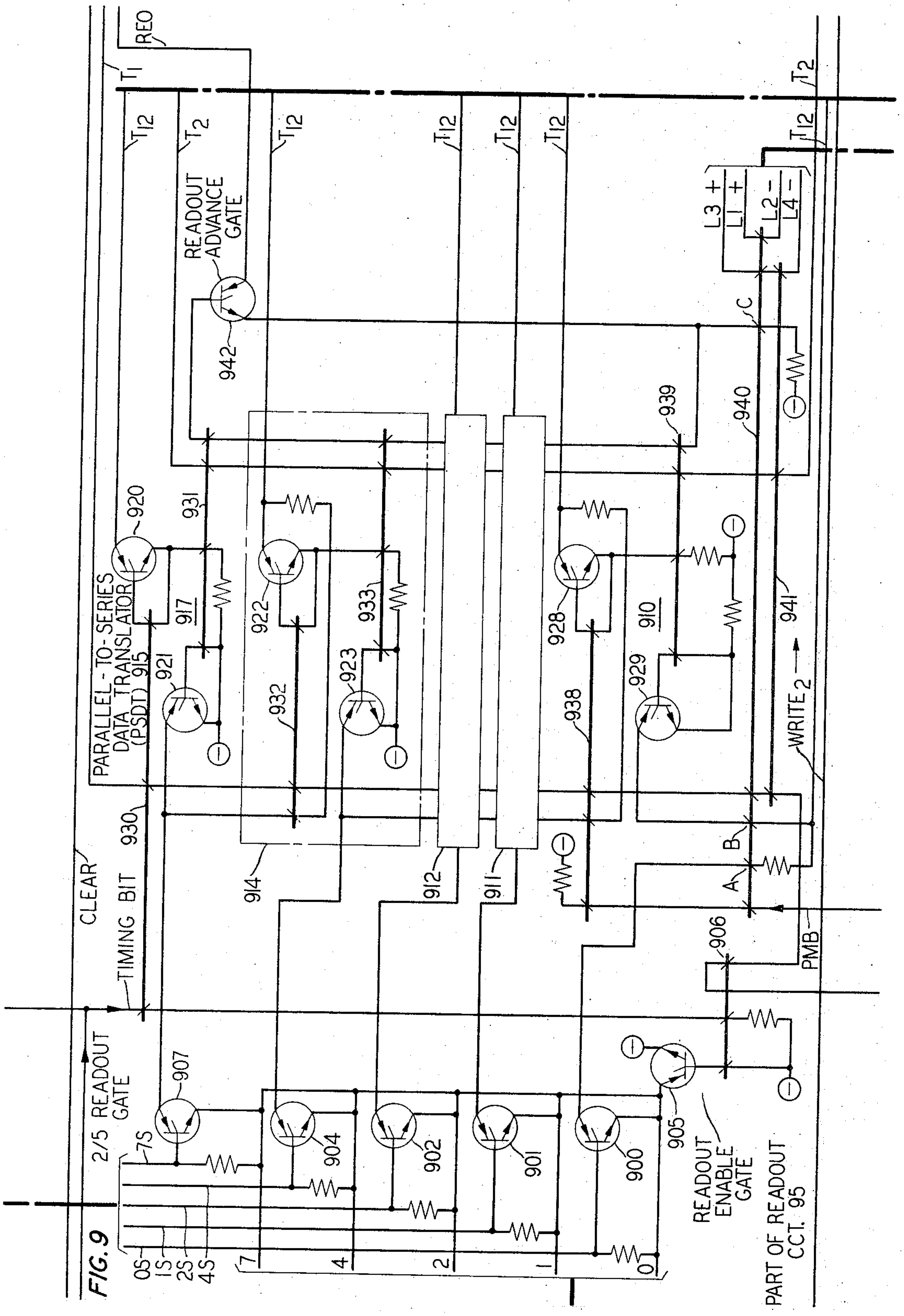
Figure 10:
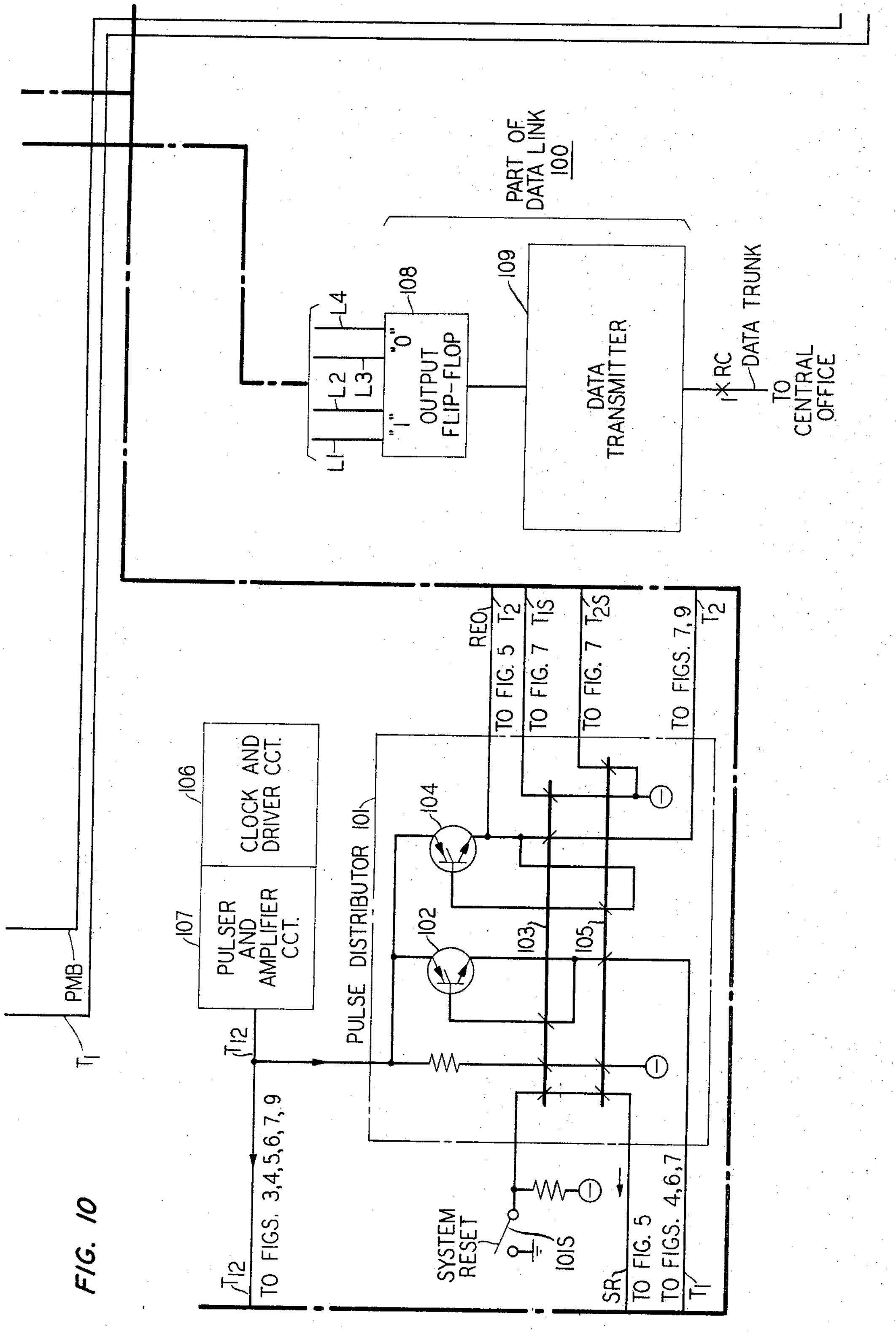
Figure 11:
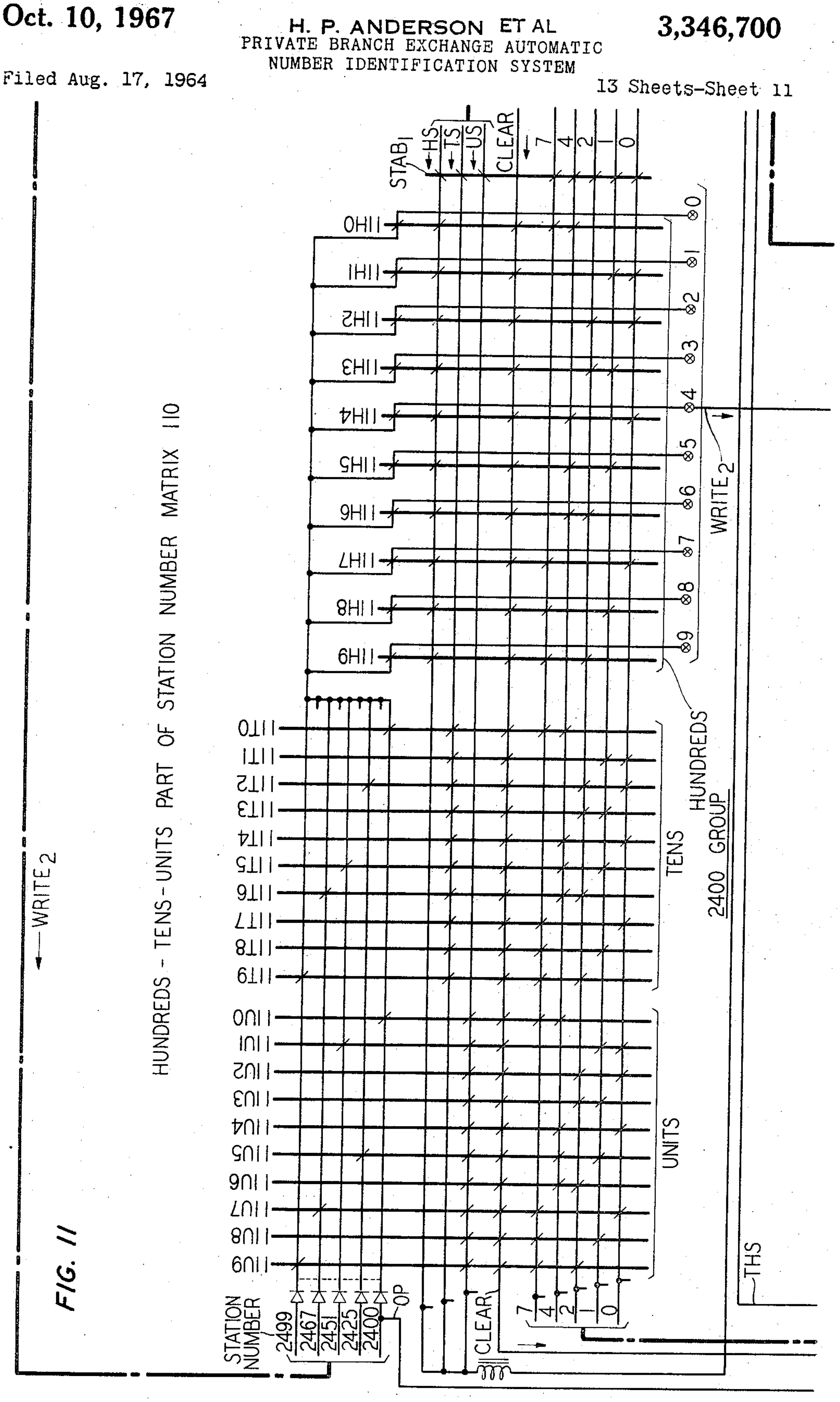
Figure 12:
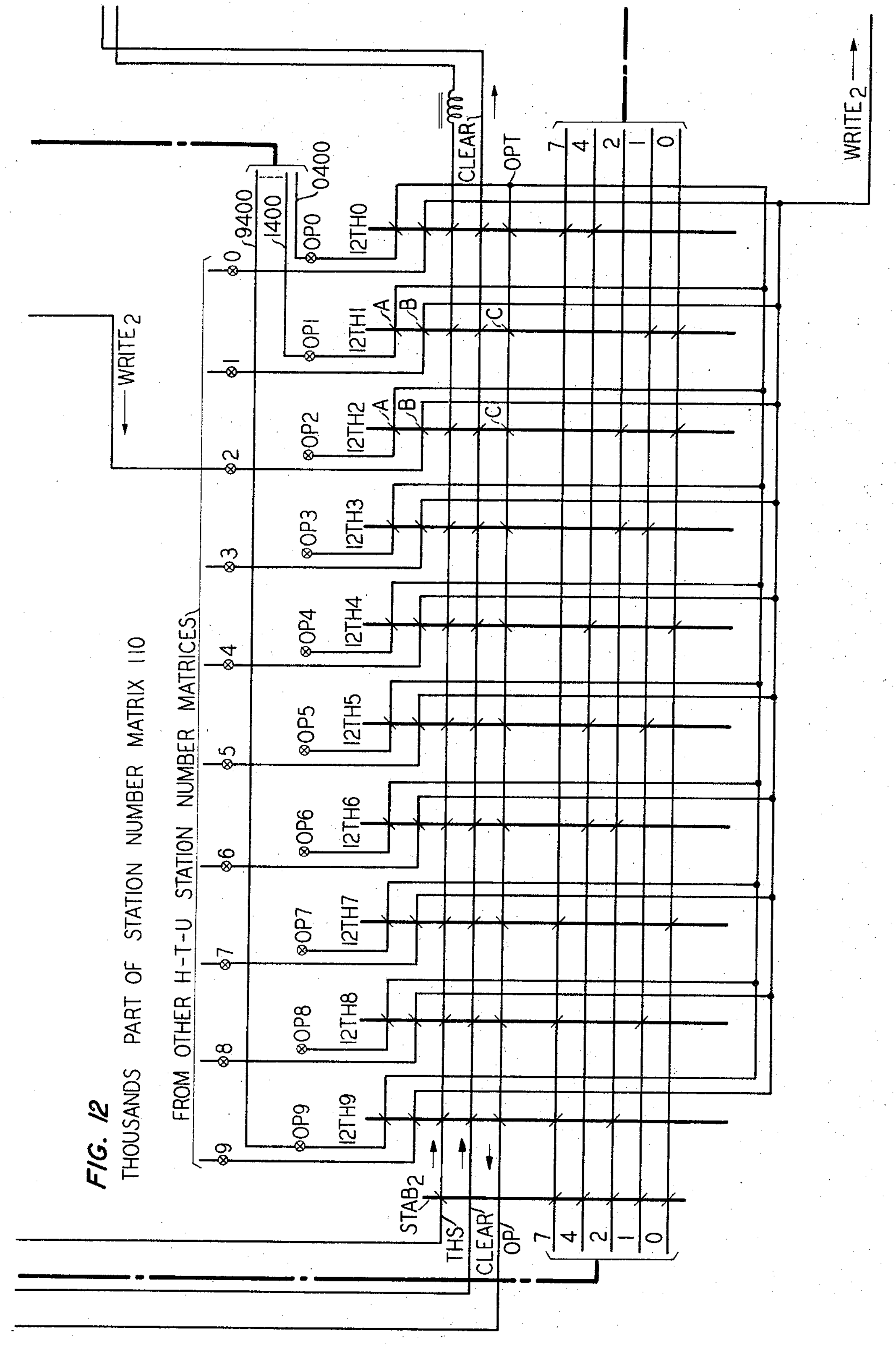
Figure 14:
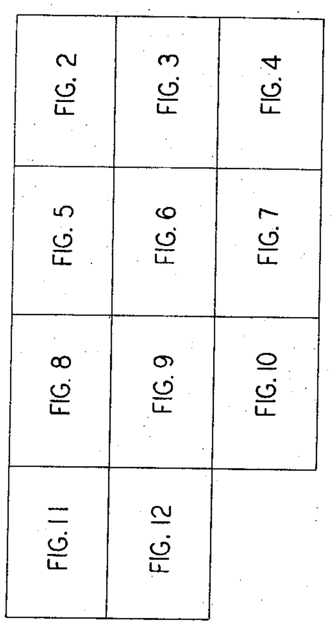
Figure 13:
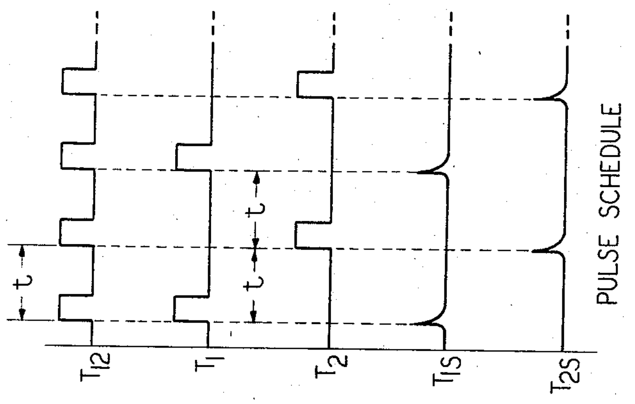

FIG. 8 indicates the remainder of the trunk number matrix and the group relay contact paths;

FIG. 9 shows the remainder of the readout circuit including the two-out-of-five readout gate, the readout enable gate, the parallel-to-serial data translator and the readout advance gate;

FIG. 10 shows the pulser, amplifier and the clock driver in block form and the detailed arrangement of the pulse distributor, as well as symbolic representations of the flip-flop and data transmitter portions of the data link;

FIG. 11 shows the hundreds-tens-units digits cores of the station number matrix;

FIG. 12 shows the thousands digit cores of the station number matrix (also utilized for operator position identification);

FIG. 13 is a time diagram of the synchronous pulse schedule generated by the clock and pulse distributor combination of FIG. 10; and FIG. 14 indicates the manner in which FIGS. 2 through 12 should be placed together for a complete understanding of the relationship of the figures.

GENERAL DESCRIPTION

This specific illustrative embodiment of our automatic number identification system is disclosed in the context of an applique or additional circuit to an existing private branch exchange (PBX) telephone system. In this regard, the invention may be considered as an adjunct to any of the multitude of already existing PBX systems, or it may be installed in conjunction with new PBX systems as they are needed. Typical of the PBX systems to which this invention may be applied are those shown in the R. D. Williams patent cited supra and also that shown in H. H. Abbott et al. Patent 2,981,804, issued Apr. 25, 1961. However, it should be noted that the invention is clearly capable of being utilized in other applications and that modifications of the system which, after a thorough understanding of the invention has been acquired will be obvious to one skilled in the art, may be made to adapt the invention to central office telephone identification or other related switching system use. Nevertheless, in order to facilitate the descriptive analysis to follow infra, application of the subject invention to a PBX will be assumed.

Figure 1:
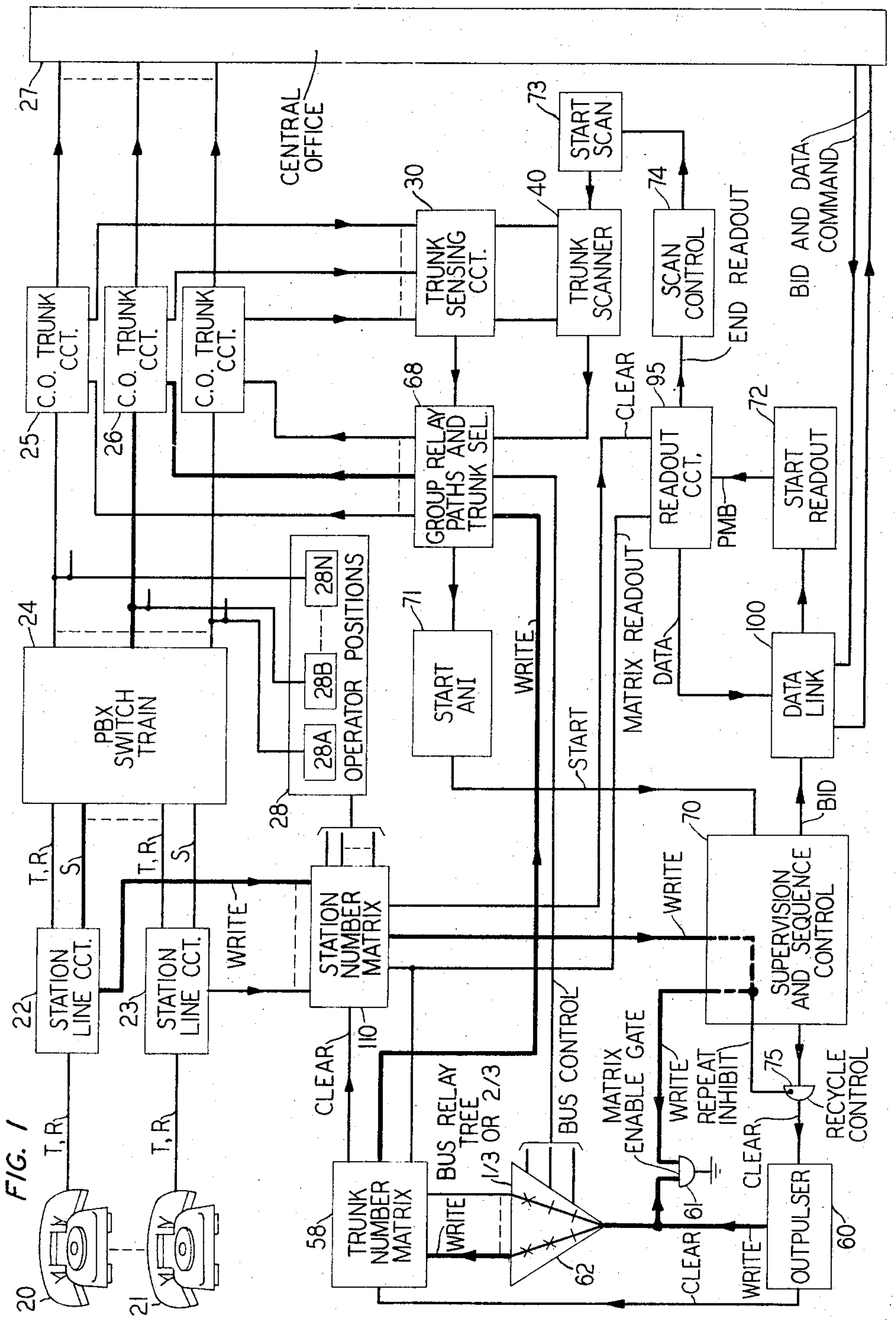
FIG. 1 is a block diagram showing one specific illustrative embodiment of our identification system as applied to a PBX telephone system.

*Block diagram—FIG. 1*

The block diagram of FIG. 1 indicates the general means of interconnecting the various circuit blocks of the invention to an illustrative switching circuit. The overall arrangement, for example, may couple a PBX extension to a central office for the purpose of making an "outside" or toll call which necessitates access from the extension to the central office; on the other hand, the switching connection may return from the PBX to another extension on an intra-PBX call. The upper portion of FIG. 1 is devoted to indicating the general means in which the switching connection may be established from an extension to a central office trunk circuit for the purpose of initiating an outside service request as described above. The lower portion of the figure, in conjunction with the upper portion, includes the circuit blocks which modify the existing circuitry in accordance with the invention.

In general, an attempt has been made in numbering the block elements of FIG. 1 to provide, where possible, a consistent relationship between the first digit or first two digits of the number designations on FIG. 1 and the figure numbers of detailed FIGS. 2 through 12 on which the circuitry within that block is more fully disclosed. For example, the details of the block on FIG. 1 labeled trunk scanner 40 will be found on FIG. 4; similarly, the supervision and sequence control 70 as well as the other blocks on FIG. 1 labeled 71–74 will all be found on FIG. 7. In certain cases, it has not been possible to follow this numbering scheme. Thus, although the trunk sensing circuit is labeled 30 on FIG. 1, a small portion of this circuit will be found on FIG. 2 as well as on FIG. 3. Moreover, the details of the trunk number matrix 58 are found on FIGS. 5 and 8; the details of the station number matrix 110 are found on FIGS. 11 and 12; the group relay paths and trunk selector circuit 68 will be found on FIGS. 6 and 8; the bus relay tree 62 will be found entirely on FIG. 6; and a portion of the readout circuit 95 is found on FIG. 5 as well as on FIG. 9. As an additional point of information, it should be noted that the synchronous control of the system provided by the pulse schedule shown in FIG. 13 is not indicated on the block diagram of FIG. 1 in order to expedite the description at this point.

The structure and function of the pulsing circuitry will, however, be fully covered in the detailed description.

The elements numbered 20–26 are all circuit blocks well known in the art which establish connections between PBX extension stations such as 20 and 21 and also from such stations to the outside lines over trunk circuits such as 25 and 26 connecting the PBX switch train 24 to the central office 27. A typical intra-PBX call might, for example, involve station extension 20 going off hook and dialing, for example, the numerical designation of extension 21; this would engage station line circuit 22 and establish a communications path through switching equipment in the PBX switch train 24 to the station line circuit 23 associated with extension 21. Should station 20 desire, on the other hand, to initiate a service request outside of the PBX, one of the plurality of trunk circuits, only two of which are shown, must be engaged in order to establish a connection to the central office 27. Thus, for example, extension 20, having gone off hook and having had local dial tone returned to it from the PBX, could dial an illustrative one-digit designation such as the digit 9 in order to indicate that it desired to initiate an outsde call. Detection of such a digit by the PBX switch train 24 will cause the seizure of one of a plurality of common central office trunk circuits, for example, central office trunk circuit 26, which has a physical appearance at the central office 27. Assuming no unusual traffic conditions, central office dial tone will be returned to PBX station 20 from the central office 27, thereby informing station 20 that dialing of the seven or more digits of the desired called party may commence.

Much of this circuitry is disclosed or referred to in the above-mentioned Williams and Abbott et al. patents. However, automatic station identification of the extension requesting outgoing call service is another matter. It is here that the restricted PBX problem generally adverted to above comes into play: Should the first three digits of the number dialed by station 20 (after the trunk seizure) represent an "allowed" area code or central office designation, the switching equipment in the PBX switch train 24 will permit the appropriately responsive equipment in the central office 27 to establish the desired connection. As mentioned above, existing switching systems do not provide for automatic identification of the calling extension station however. On the other hand, if the initial few digits mentioned above represent a prohibited code or office exchange, the PBX includes facilities for restricting the connection of outgoing requesting station 20 to an intercept circuit or to an attendant. Such an attendant may inquire into the validity of the call and if it is determined that the call is authorized, as it often is, the attendant may set up the connection. The time-consuming inconvenience of this and other related procedures in order to identify the particular extension initiating such an outgoing request need not be repeated at this juncture. Suffice it to say that the instant invention, the description of which follows immediately below, is arranged to alleviate this and other related difficulties.

It may be noted at this point in general terms that each central office trunk circuit such as 25 and 26 in FIG. 1 will be assigned a trunk identification number particularly identifying that trunk with respect to other trunks from other PBX's. The central office 27 may be the terminating point for many PBX's and thus for a correspondingly increased plurality of trunk circuits. The designation of each of these trunk circuits will distinguish one from the other both within a given PBX and from one PBX to another, so that identification of the trunk number of a trunk circuit serves to identify not only the incoming trunk circuit to the central office but also, in effect, the PBX which has thereby been connected to the central office. For example, a PBX which has 2000 extension lines might be connected by 50 or more trunk circuits to the central office; under the designation system alluded to above, each of these trunk circuits would be given a separate identification number of perhaps four digits, the identification of which during the course of a given switching sequence will allow identification of both the specific trunk circuit and the PBX initiating the service request.

As applied to the instant invention, means may therefore be provided to identify the number of the trunk circuit seized on a central office service request from a PBX extension and then to also identify the particular station initiating the request. Such means will therefore furnish all the necessary information about the identity of the particular calling extension (i.e., from which PBX the call is being originated and further, which extension at that PBX is initiating the request). The identification sequence may then be arranged to furnish this identification data to a central office accounting system which may then take appropriate measures to bill for example only toll calls, the time duration of the call, etc.

*Illustrative identification sequence—FIG. 1*

More specifically, let it be assumed that PBX extension station 20 in FIG. 1 goes off hook and is thereby connected over its tip and ring conductors through corresponding station line circuit 22 to responsive switching equipment in the PBX switch train 24. This is initiated by the station's dialing a digit indicative of a central office service request, such as the digit 9. Well-known equipment in the PBX seizes one of a plurality of central office trunk circuits such as trunk circuit 26 and therefore establishes a connection to the central office 27. This trunk seizure also serves to initiate the identification procedure utilizing the invention and in most cases, such identification will be completed prior to any further dialing by the extension station. The trunk sensing circuit 30 is arranged to detect any outgoing central office trunk seizure at the PBX and will thereby be appropriately affected by the above-assumed seizure of trunk circuit 26 in response to an outgoing service request from extension station 20. The sensing circuit 30 is, however, a relatively "passive" circuit with connections to all of the trunks of a particular PBX. The trunk scanner 40 is arranged to automatically (commencing with the termination of a previous identification sequence) scan the individual sense blocks (not explicitly shown in FIG. 1 but see FIGS. 2 and 3) of the sensing circuit 30 searching for any detection of a trunk seizure. When, as a result of its scanning procedure, the scanner 40 is informed by the sensing circuit 30 that trunk circuit 26 has been seized, means are included in the scanner for initiating several dependent switching processes.

Initially, the scanning procedure is temporarily interrupted. Concurrent with this interruption is the establishment in the bus relay tree 62 and group relay paths and trunk selector circuit 68 of an electrical path from the outpulser 60 through the cores (not explicitly shown on FIG. 1) of the trunk member matrix 58 corresponding to the seized trunk circuit 26 and then to the sleeve of the actual trunk circuit 26. The selection of the appropriate cores in the trunk matrix 58 is made by the related operation of sensing circuit 30 and scanner 40 which selectively operate bus and group relays in the trunk selector circuit 68 to establish the singular path through the proper cores of the trunk matrix 58. Wired cross-connections from outgoing contacts of the group relay paths 68 to the sleeve of the central office trunk circuits complete an electrical path that extends on the block diagram of FIG. 1 (heavy line labeled "WRITE") from the outpulser 60, through bus relay tree 62, through the trunk matrix 58, through the group relay paths 68, over the seized trunk circuit 26, back through the energized switches of the PBX switch train 24, and from the sleeve of the seized station line circuit 22 corresponding to extension station 20 to individually responsive cores in the station number matrix 110. This electrical path is further extended from the cores of the station matrix 110 over a common connection therefrom to a checking element (not explicitly shown in FIG. 1) in the supervision and sequence control circuit 70 and thence terminating in the matrix enable gate 61.

This path is established approximately concurrently with the detection of the seizure of the central office trunk. Switching equipment within the trunk selector circuit 68 serves to also energize the start ANI (Automatic Number Identification) circuit 71. This start ANI circuit 71, as well as many of the other circuits priorly mentioned and discussed below, is synchronously operated by the pulse distributor circuit shown in detail on FIG. 10, but which is not shown on the block diagram of FIG. 1 in order to avoid unduly complicating the description at this point. Shortly following the energization of the start ANI circuit 71 by the trunk selector circuit 68, a "start" signal is delivered therefrom to the supervision and sequence control circuit 70. Driven by the synchronous timing means (not shown) and the start signal, the supervision circuit 70 shortly thereafter generates a "clear" signal. Since recycle control gate 75 is not inhibited, the clear signal resets switching elements in the outpulser 60, trunk matrix 58, station matrix 110 and the readout circuit 95 over the path indicated in FIG. 1. Responsive to the clear signal and a timing pulse (not shown), the outpulser 60 is energized and thereby generates the identification "write" signal. The write signal is transmitted over two distinct paths: The first of these paths directly connects the outpulser 60 with a first terminal of the matrix enable gate 61 to indicate that a legitimate write signal has been generated. The other path traversed by the write signal (shown as a heavy line on FIG. 1) includes the bus relay tree 62, the cores of the trunk matrix 58 corresponding to the designated trunk number of the seized trunk 26, the connecting contacts of the group relay paths in circuit 68, the sleeve of the actually seized trunk circuit 26, the energized switches of the PBX switch train 24, the sleeve lead of the station line circuit 22 associated with the off-hook extension station 20, the cores of the station matrix 110 corresponding to the extension designation of the off-hook station (determined by appropriate cross connections from the line circuits such as 22 and 23 to the cores in the station matrix 110), out of the cores of the station matrix 110 over a common bus to a checking element (not shown) in the supervision and sequence control circuit 70 and finally to the second terminal of the matrix enable gate 61.

The transmission of the write signal to two different terminals of the matrix enable gate 61 at two respectively different points in the transmission path of the signal provides significant additional reliability to the circuit. The matrix enable gate 61 is arranged to be energized only upon the concurrent presence of the "direct" signal from the outpulser 60 as well as the more circuitous "transmitted" signal through the cores.

The matrix enable gate 61 is a logic or AND circuit providing a path to ground for the write pulse when it is energized, thereby only allowing or enabling operation or switching of the cores of the matrices when it is properly energized. Thus should only the signal transmitted circuitously through the matrices appear at the gate 61, without a simultaneous direct signal from the outpulser 61, this is an indication that no identification is intended and that instead some stray transient signal may have occurred in the switching train 24. If this occurs, gate 61 is not enabled, no path to ground is provided, and the signal is prevented from setting the matrix cores of a check core, described further below.

If only the direct signal from the outpulser 60 is received by gate 61, it is apparent that although the signal was properly generated by the outpulser 60, the transmitted signal through the cores and switches was somehow lost or mutilated and no complete valid identification has occurred. While some of the matrix cores may be set, the check core will not be switched since the check core is connected directly to ground through the gate 61, which gate is not energized.

The checking element, which may, for example, be a magnetic core, as discussed above, in the supervision and sequence control circuit 70 and through which the legitimate transmitted portion of the write signal passed, is thereafter interrogated by a subsequent timing pulse. Since it has been assumed that a valid identification has been made, this interrogation will produce an affirmative reply, resulting in the "bid" signal which requests a data link connection to the central office. As long as no unusually burdensome data traffic conditions exist in the central office 27, the bid signal will be rapidly received and processed by the appropriate central office equipment and a data trunk included within data link 100 will be reserved for and connected to the bidding PBX. That this connection has been successfully and timely made will be indicated to the readout circuitry of the identification system by the operation of switching equipment in the data link 100 in response to the "command" signal from the central office 27. The start readout circuit 72 is energized when the connection of data link 100 has been made. The readout circuit 95 is thereby energized by the "PMB" (pre-message bit) and sequentially reads out the stored information from the matrices 58 and 110, delivering back to the readout circuit 95 the trunk number from the trunk matrix 58 and the station number from the station matrix 110. Facilities are included in the readout circuit 95 for continuing the switching sequence by providing this data to the data link 100 to thereby deliver it to the central office 27. When the last bit of data has been read out from the matrices and delivered to the central office 27, the scan control circuit 74 is furnished with an "end readout" signal to so indicate. The scan control circuit 74 is arranged to thereby energize the start scan circuit 73 which in turn re-energizes the trunk scanner circuit 40 which now searches for the detection of another trunk seizure by the trunk sensing circuit 30.

As adverted to previously, it is desired to provide similar identification data with respect to operator positions initiating central office service requests. Since these positions in some cases do not connect to the regular group of station line circuits which serve PBX extensions, some singular steps must be taken to avoid the necessity of providing additional matrices just for the identification of a relatively few operator positions.

In FIG. 1, a symbolic operator switchboard 28 includes facilities for several illustrative operator positions. When a position such as 28B initiates an outside call (e.g., by patching a cord directly to a trunk appearance on the switchboard console or depressing a trunk pickup key as in the cordless PBX's of the Williams and Abbott et al. patents), a central office trunk circuit is seized directly without use of the switching equipment within switch train 24. As with an ordinary PBX extension, a clear signal is generated, followed by a write signal. The write signal travels back to the seized trunk (giving the trunk number identification in the same manner as described above) and directly therefrom to the sleeve of the calling operator position. Then, instead of proceeding to the station number matrix 110 through a station line circuit (such as line circuit 22) serving an extension station, the write signal proceeds directly to a special portion of matrix 110 (not shown separately from matrix 110 on FIG. 1; but see FIG. 12). By proper cross-connections and unusual magnetic switching techniques to be more fully described in the detailed description below, individual identification of the "station number" of the calling operator position is secured. And yet, as will be seen below, several of the same cores of matrix 110 which usually identify a particular PBX extension are used here to provide operator position identification. It will be seen that this allows for flexible assignment of operation position numbers while also obviating the need for additional matrices that such flexible assignment would otherwise require.

Despite the normally reliable operation of this system, it is at least statistically possible that no valid identification will be made on the first attempt. This will be indicated to the circuit, as adverted to above, by the failure of matrix enable gate 61 to be properly energized. If no reliability features were included in the invention, the subsequent interrogation signal of the checking element within the supervision and sequence control circuit 70 would, of course, produce no affirmative response and either no data or only a part thereof would ever be delivered to the central office 27 for correct identification and billing of of the calling extension.

Means are therefore provided in the supervision and sequence control circuit 70 to initiate a predetermined number of additional identification attempts. Such means are energized by the start signal from the start ANI circuit 71 as well as by selected timing pulses. A valid identification sequence on the first or one of the subsequent attempts provide a "repeat inhibit" signal from the supervision circuit 70 to the repeat inhibit lead of recycle control gate 75; however, in the absence of a valid identification, no such signal is generated. The repetitive means within the supervision circuit 70 is, in the absence of the repeat inhibit signal, arranged to provide through energized gate 75 an additional clear signal to the outpulser 60, trunk matrix 58, station matrix 110 and readout circuit 95.

In fact, an entirely "new" clear-write-check cycle occurs as if there had been no initial identification attempt. These cycles will continue until one of these terminating events occur: first, if a valid identification is subsequently made within a predetermined number of attempts, the circuit is arranged to provide the priorly mentioned repeat inhibit signal to curtail further cycles by inhibiting recycle control gate 75; on the other hand, if no valid identification is made within the predetermined number of attempts, a timing arrangement so indicates and also arrests further clear-write-check cycles. This timing arrangement operates by simulating a valid identification to the checking element (e.g., a magnetic core) within the supervision and sequence control circuit 70, Thus, when the interrogation of this element occurs, an affirmative reply will obtain, thus resulting in the bid-command-readout sequence referred to, as well as the arresting of subsequent clear-write-check cycles. Although it may at first impression appear that readout following the failure to get a valid identification would be futile, this is by no means always the case. Rather, since the most probable cause of identification failure is the diversion of the transmitted write signal to an erroneous ground within the PBX switch train 24 after the signal has passed through the selected cores of the trunk matrix corresponding to the seized trunk circuit 26, some information is still obtainable. Thus, although no cores of the station matrix 110 will be set and the gate 61 will not have been energized, the appropriate cores in the trunk matrix 58 have indeed been properly set and it is therefore clearly desirable to have at least this data transmitted to the central office.

The usefulness of this information can be noted by referring again to the manner in which the trunk number designations are assigned. It will be recalled that identification of the trunk number associated with the seized trunk circuit such as 26 in FIG. 1, in fact, serves to identify the PBX itself. Thus, when centralized accounting equipment (not shown) indicates to storage equipment at central office 27 (which has assumedly received only the trunk number) that it now is prepared to receive the data with reference to the originating call, the accounting equipment may, for example, be arranged to bill the call to the overall PBX directory number in the case of a failure to secure the extension station number. Such "pilot billing" is one method of alternate treatment in the case of a partial or complete identification failure; the partial failure referred to herein whereby only the trunk number is acquired may also be dealt with by energizing equipment either in central office 27 or in the centralized accounting equipment which will result in operator intervention under these unusual circumstances.

When the timing equipment in the supervision and sequence control circuit 70 has, after a predetermined time interval, simulated a valid identification sequence resulting in the partial readout referred to above, the bid-command-readout cycle follows as if there had been a valid identification and the end of the readout sequence similarly results in the re-energization of the trunk scanner circuit 40. This timing equipment is also arranged to govern the length of the time interval during which a legitimate data link response (the command signal) may be returned from the central office 27 to the data link 100. This portion of the timing circuit, to be discussed in detail below, operates independently of the validity of any prior identification attempts. Thus, even if the first identification attempt referred to above had been successful, and this had been followed by the proper bid signal requesting the data link, in the rare situation where no proper data connection can be made between the PBX and the central office 27 within a given time interval, the timing equipment within supervision and sequence control circuit 70 is arranged to release all connections and to cause scanning to commence again through the energization of scan control circuit 74 and start scan circuit 73. Thus, under these unlikely circumstances, a connection will have been established between an extension at a PBX and central office switching equipment without the usually associated identification normally provided for in the instant invention having been made.

DETAILED DESCRIPTION

INDEX FOR DETAILED DESCRIPTION

I. General Operation
II. Circuit Blocks and Magnetic Control
III. Synchronous Timing Control
IV. Illustrative PBX—Typical Requirements
  A. Trunks and Extensions
  B. Operator Positions
  C. Identification Matrices
V. Illustrative Identification of Central Office Trunk Seizure—Outgoing Call
  A. Trunk Seizure
  B. Detection of Trunk Seizure
  C. Trunk Scanning
    (1) Scan Group Advance
  D. Scanning Detects Trunk Seizure
  E. Operation of Bus and Group Relays
  F. Identification Sequence
    (1) START Signal
    (2) Control of Recycle Timer
    (3) CLEAR Signal
    (4) WRITE Signal
    (5) Path of WRITE Signals
  G. Check Feature
    (1) Case I—Valid First Attempt Identification
      (a) CHECK Signal
      (b) BID and REPEAT INHIBIT Signals
      (c) Central Office Reply
      (d) Start of Readout
        (i) Pre-Message Bit
        (ii) Readout Advance Gate
        (iii) Parallel-to-Serial Data Translator (PSDT)
        (iv) Readout Stepping Switch
        (v) Bias Cores
        (vi) Shifting of Data Through PSDT
      (e) End of Readout (f) Scanner Restarts and Timers Reset
(2) Case II—Initial Identification Failure with Successful Identification Subsequent to First Attempt
(3) Case III—No Complete Identification Within Five Attempts
(4) Time-Out Timer—Additional Supervisory Functions
VI. Identification of Operator Position on Outgoing Call
A. Number Assignment
B. Illustrative Operator Position Outgoing Call
C. Path of WRITE Signals

I. GENERAL OPERATION

Figure 2:
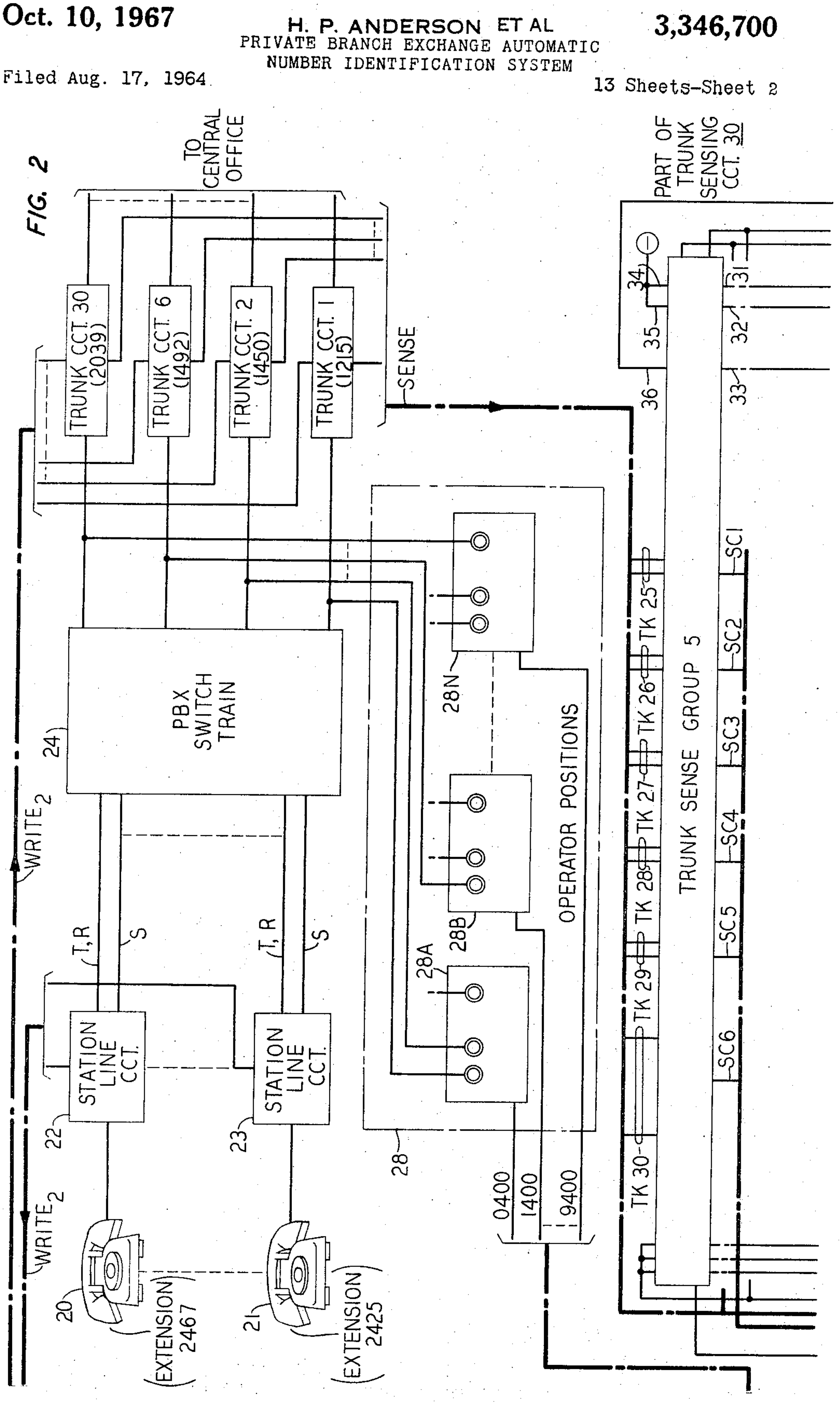
FIG. 2 shows illustrative telephone stations, line circuits, connecting switches and trunk circuits in block form, as well as a portion of the trunk sensing circuit.

It may be initially helpful to discuss not only the detailed contents of each of the figures of the drawing but also the relationship which those figures bear to each other. Thus, the upper portion of FIG. 2 shows the extension stations, station line circuits, PBX switch train and central office trunk circuits much in the same manner as those respective portions are indicated on the block diagram of FIG. 1. Stations 20 and 21 in FIG. 2 are respectively labeled "Extension 2467" and "Extension 2425," those being the assigned PBX extension numbers for those stations. As indicated on FIG. 2, only two such stations are shown for illustrative purposes, each of them connecting to respective station line circuits 22 and 23 which are connectable either to each other or to a central office trunk circuit by means of the PBX switch train 24.

For the illustrative PBX to be described herein, thirty central office trunks will be assumed to connect the PBX switch train 24 to the local central office; of these thirty trunk circuits, shown in block form on FIG. 2, only trunk circuits 1, 2, 6 and 30 are specifically indicated, with parenthetical designations of their assigned trunk numbers for purposes of identification. For example, illustrating the complete flexibility of trunk number assignment, trunk circuit 1 may be assigned trunk identification number 1215, whereas immediately adjacent trunk circuit 2 may have trunk number 1450 for purposes of identification.

Figure 3:
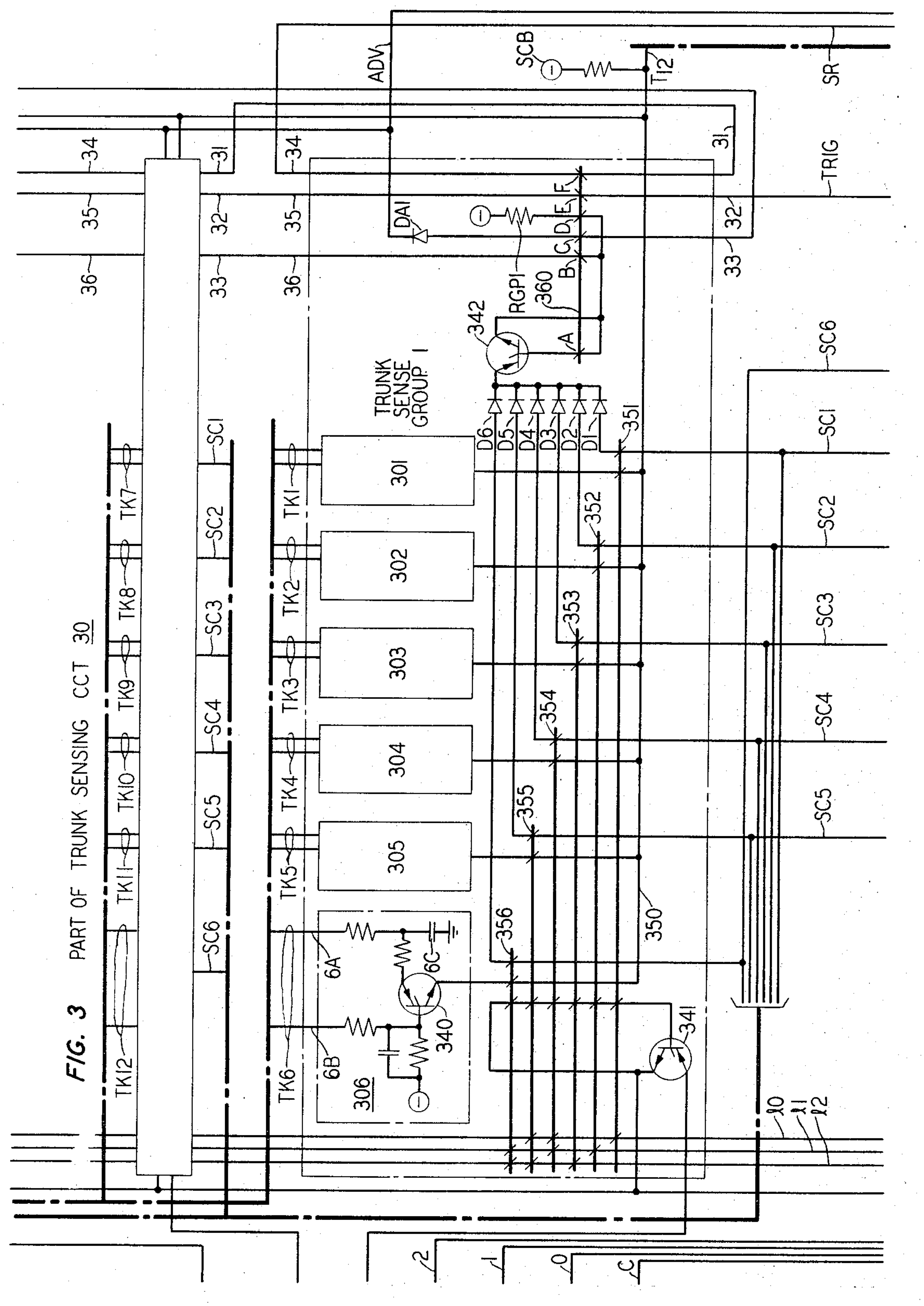
FIG. 3 shows the remainder of the trunk sensing circuit.
Figure 4:
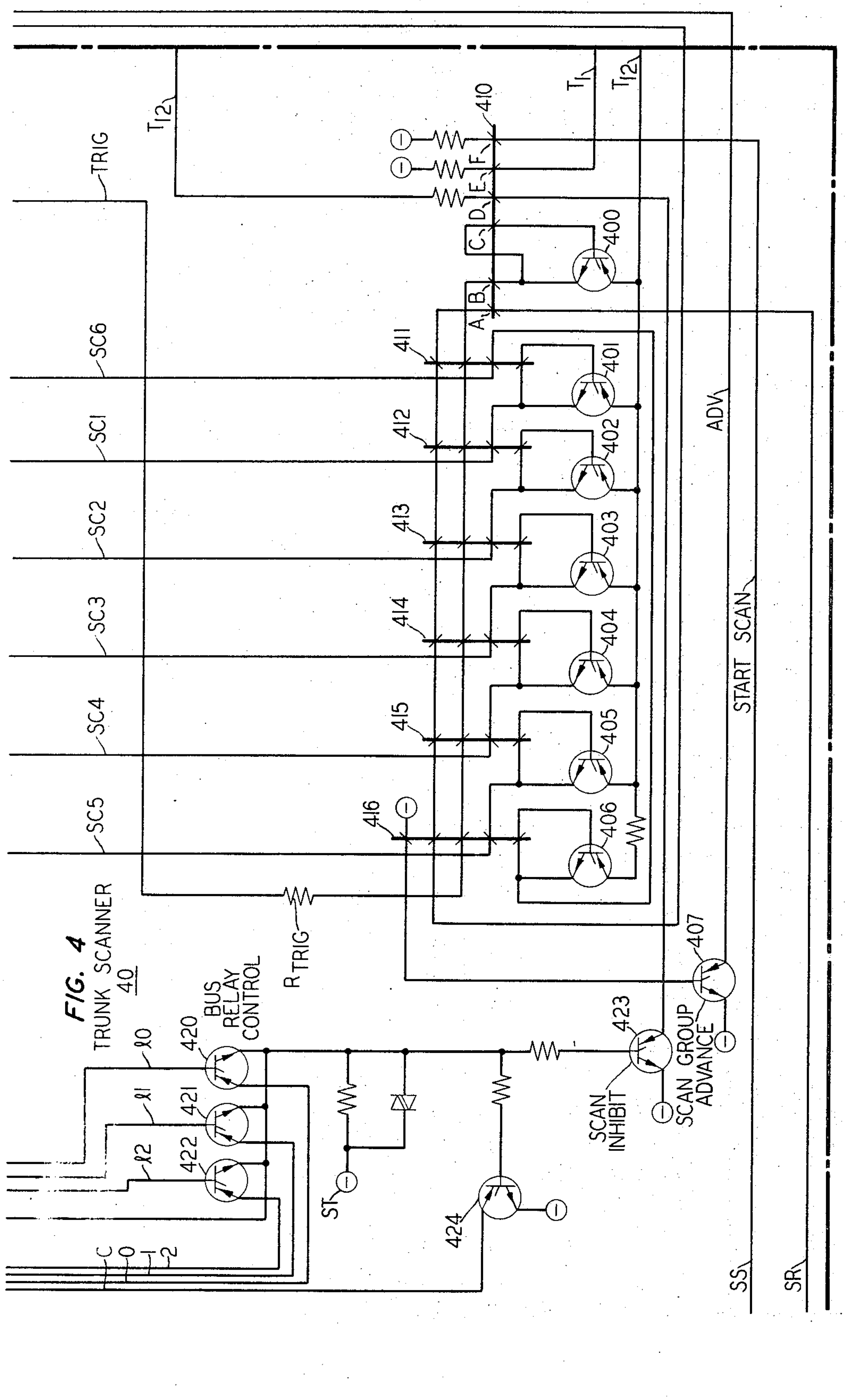
FIG. 4 shows the trunk scanner circuit.

Trunk sensing circuit 30 comprises five trunk sense groups numbered 1 through 5, groups 1 and 2 being shown on FIG. 3 and group 5 being indicated on FIG. 2. With reference to trunk sense group 1 shown in detail on FIG. 3, such a group is equipped to detect a central office trunk seizure of any of six of the thirty trunk circuits mentioned above. To achieve this, cabled connections connect detectors 301–306 to trunks 1 through 6, respectively, so that detector 301 of trunk sense group 1 will detect a seizure of trunk circuit 1 with identification number 1215 on FIG. 2. (That is, trunk sense group 1 detects seizure of any of trunks 1 through 6, trunk sense group 2 detects seizure of any of trunks 7 through 12, etc.)

Once a trunk seizure has been detected, storage in one of thirty cores such as 351–356 so indicates. At the commencement of any particular switching sequence, the trunk scanner circuit 40 shown in FIG. 4 sequentially scans the storage cores of the trunk sensing circuit 30 over leads SC1–SC6. This scanner is essentially a reentrant stepping switch under the control of stepping transistor 400 which, as will be fully explained below, sequentially activates transistors 401–406 to provide the scanning signals to the various storage cores in the trunk sense groups 1–5. Following a trunk seizure and its detection by the sense-scanner combination, further scanning is interrupted by the inhibiting of core 410 which controls stepping transistor 400. Additionally, one of relays 6GP1–6GP5 on FIG. 6 will operate dependent upon the one of the five groups in which the seized trunk is located; one or two of relays 6B0–6B2 will also operate to establish a connection from the outpulser 60 over one of the six bus paths of the bus relay tree 62 shown on FIG. 6 to selected cores of the trunk number matrix 58 shown on FIGS. 5 and 8. The operation of one of the five relays 6GP1–6GP5 at its respective contacts in FIG. 8 completes the electrical path from the cores of the trunk number matrix 58 to the actually-seized trunk circuit of FIG. 2. Trunk selector circuit 68, accordingly, selects the appropriate cores of trunk number matrix 58 through which the to-be-generated WRITE signal will pass by input and output relay contact steering. That is, the operation of one or two of relays 6B0–6B2 determines the "position" of the seized trunk within an individual group (by selecting one of six input paths), and the operation of one of five relays 6GP1–6GP5 provides the output steering back to the actually-seized trunk circuit by determining the one of five groups in which the seized trunk is located.

Figure 5:
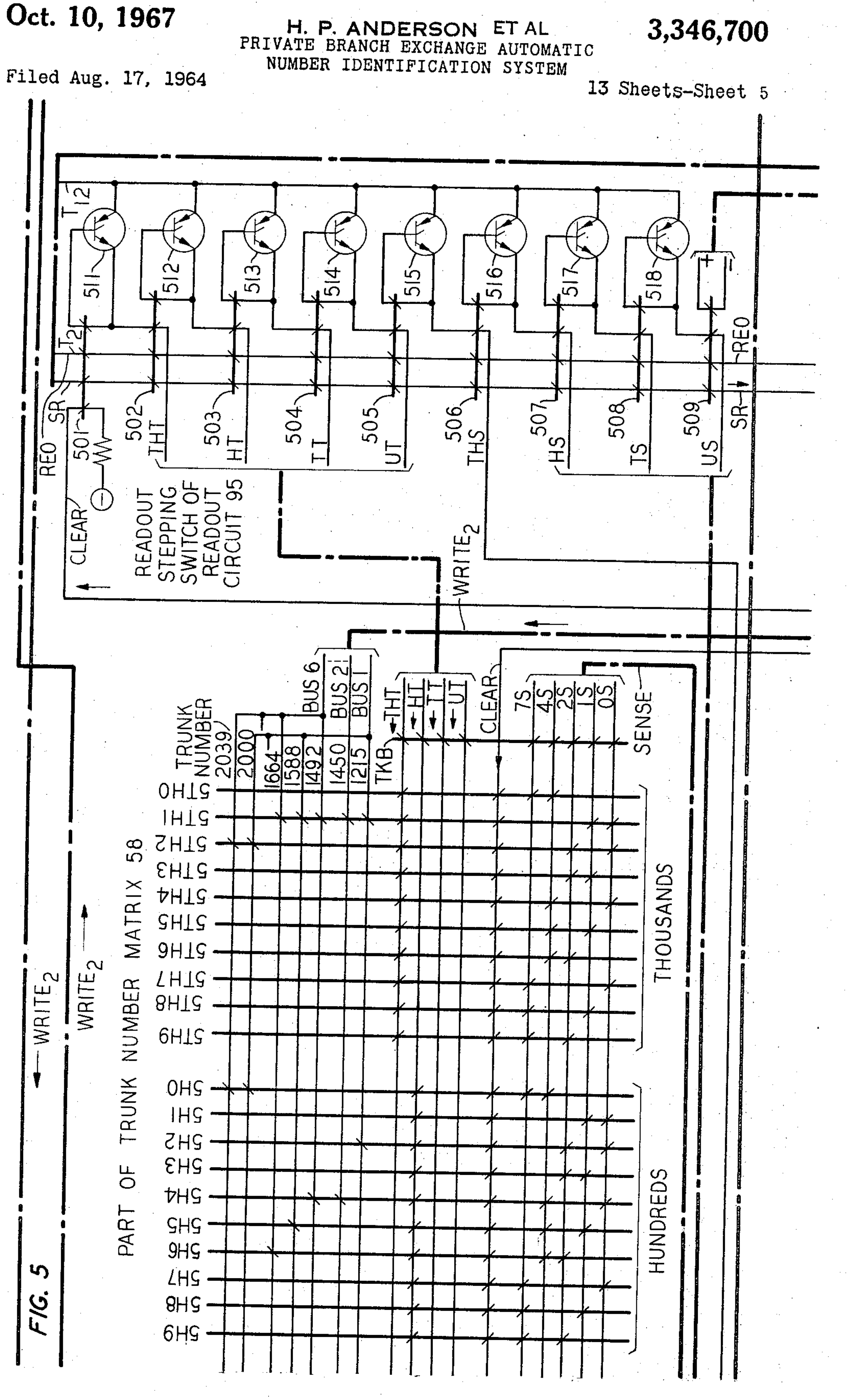
FIG. 5 shows a portion of the trunk number matrix and the readout stepping switch portion of the readout circuit.
Figure 6:
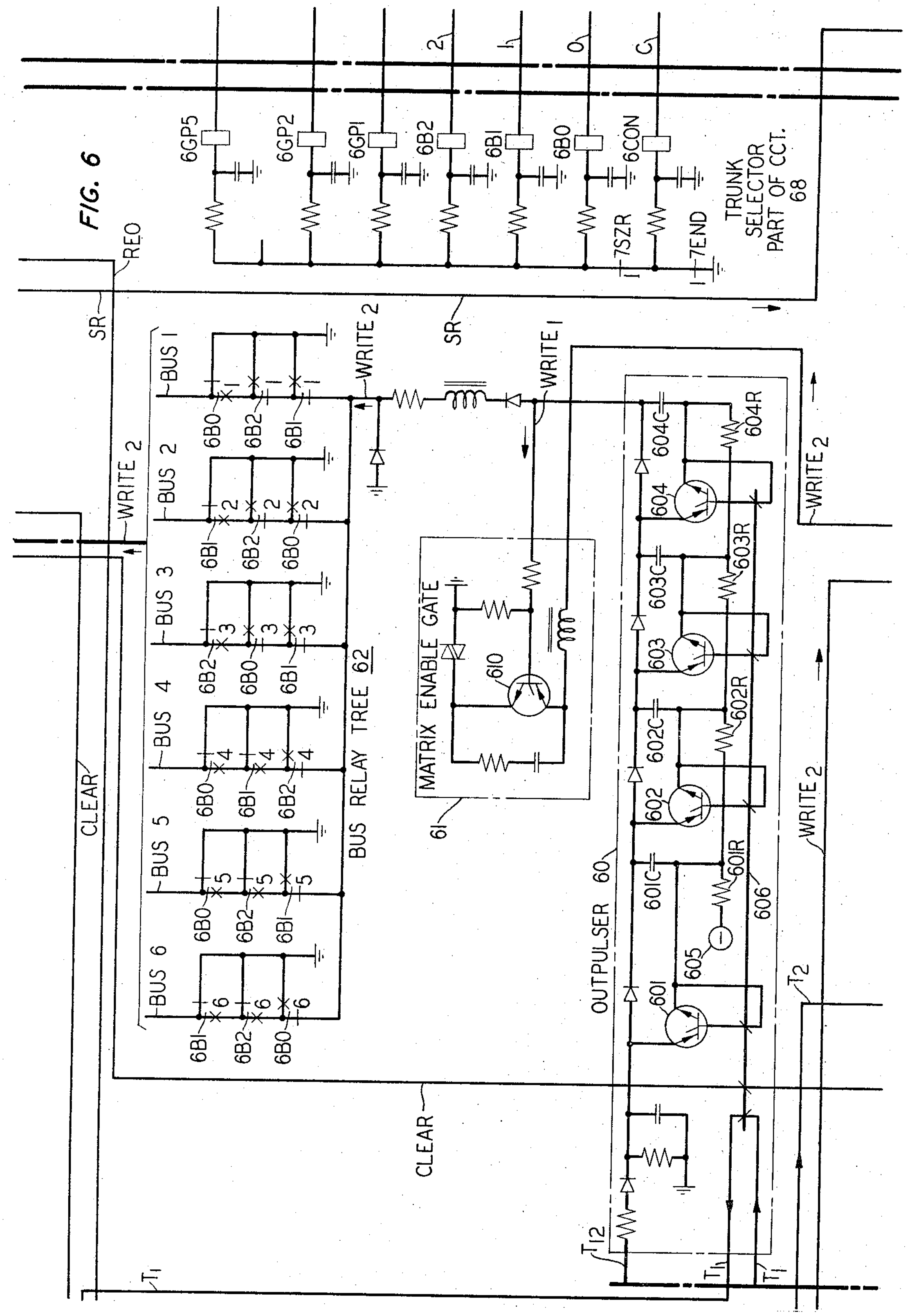
FIG. 6 illustrates the outpulser, the matrix enable gate, the trunk selector relays and the bus relay contact portion of the relay tree.
Figure 7:
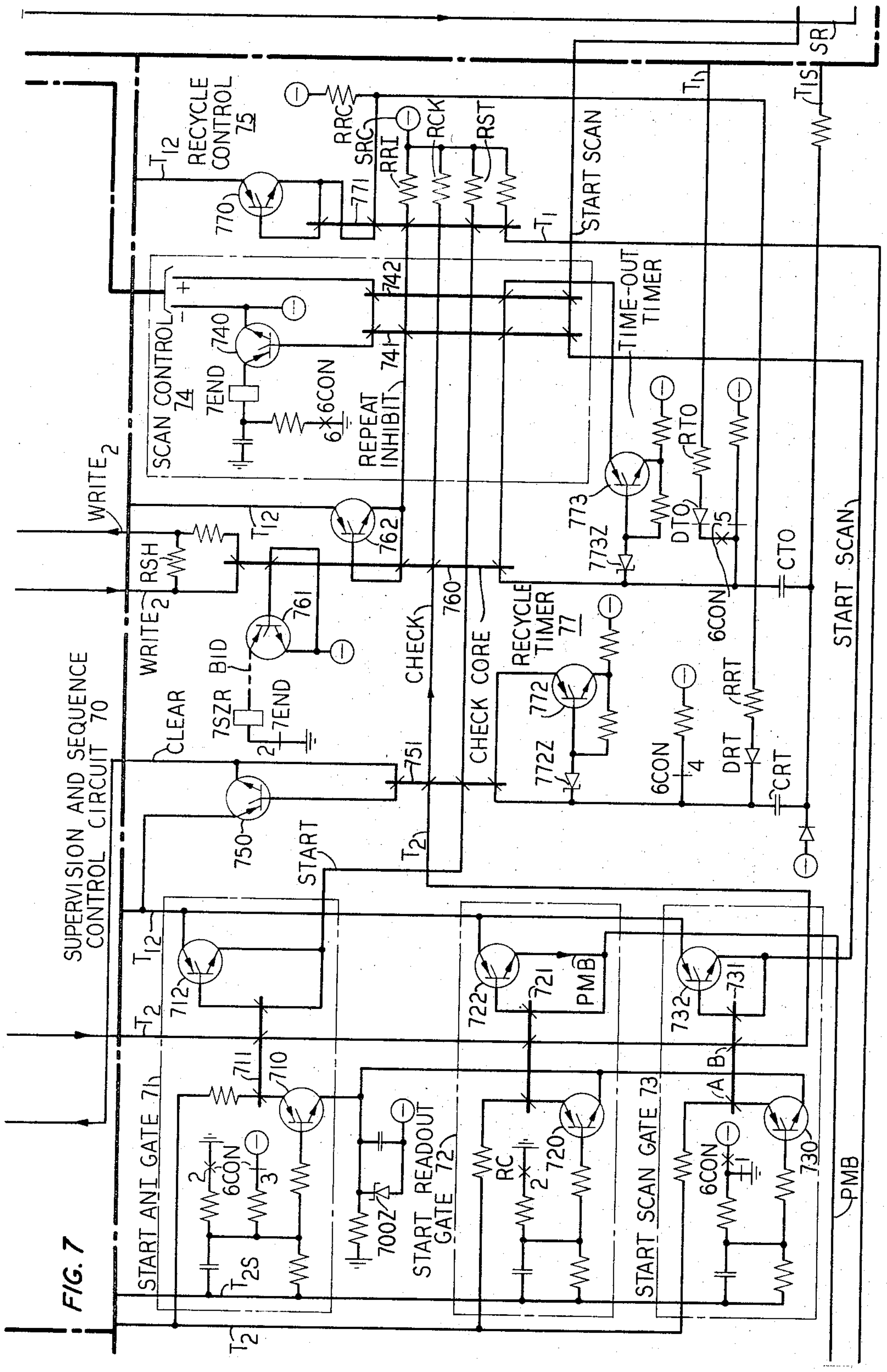
FIG. 7 shows the three synchronizing gates for starting identification, readout and scanning, and also shows the supervision and sequence control circuitry.

Also operating in response to the detection of a trunk seizure is relay 6CON on FIG. 6 which activates start ANI gate 71, and the "time-out timer" of FIG. 7. A "START" signal is thereafter provided from start ANI gate 71 to windings on cores 751 and 771, the former being thereafter switched to result in the provision of the "CLEAR" signal and the latter to be thereafter switched to energize the recycle control circuit 75 which in turn energizes the recycle timer 77. The CLEAR signal as indicated passes through controlling core 606 of outpulser 60, all the cores or trunk number matrix 58 (FIGS. 5 and 8) and of station number matrix 110 (FIGS. 11 and 12), and terminates at negative battery through core 501 of the readout stepping switch of readout circuit 95 (FIG. 5).

The outpulser 60 is then energized to provide the "WRITE" pulse over two distinct paths, one going to the matrix enable gate 61 and the second being transmitted over the selected one of the six bus paths BUS 1–6 (FIG. 6) and thence to the cores of the trunk number matrix 58 corresponding to the identification number of the seized trunk, over the operated contact of the selected 6GP– relay and over the cross-connection from the selected relay tree path back to the seized trunk of FIG. 2. From the trunk, the signal proceeds back over the PBX switch train 24 to the energized station line circuit and via similar cross-connections through the appropriate cores of the station number matrix 110 (FIGS. 11 and 12) and finally through check core 760 (FIG. 7) to matrix enable gate 61. (Gate 61 is thus termed a "matrix enable gate" because it must be energized before the appropriate station matrix cores will be set or "enabled.") This switching step is followed by a "CHECK" signal to check core 760, the switching of which indicates a valid identification which results in a "BID" signal for a central office data link and also inhibits further timing operations by the recycle timer by controlling transistor 770 of recycle control circuit 75 with the "REPEAT INHIBIT" signal. (The BID signal, in operating relay 7SZR, also causes the release of the relay tree 62 and of the group relay paths part of circuit 68.)

Readout of the stored data in the trunk and station number matrices begins in response to the connection of a central office data trunk to the circuit. The parallel-to-serial data translator (PSDT) 915 shown on FIG. 9 as part of a readout circuit 95 is activated by the reply from the data trunk and allows the readout stepping switch on FIG. 5 to sequentially apply readout pulses to the four groups of digit cores of each of the matrices in sequence. Sense windings of all of the matrix cores furnish the stored data to the PSDT 915 through the two-out-of-five readout gate also shown on FIG. 9. Synchronously controlled shifting then reads the data out from the PSDT 915 to the output flip-flop 108 and thence to the data transmitter 109 of FIG. 10, the latter transmitting this data over the data trunk (not shown) to the central office. (Data transmitter 109 may illustratively be of the type disclosed in H. J. White application Ser. No. 253,-375, filed Jan. 23, 1963, now Patent 3,204,200, issued Aug. 31, 1965.) When the last bit of data has been read out, the 7END relay on FIG. 7 operates as part of scan control circuit 74, through paths described in detail below, and scanning by the trunk scanner circuit 40 is thereby caused to begin again.

In the absence of a valid identification on the first attempt as assumed above, the recycle timer 77 on FIG. 7 is arranged to start the CLEAR-WRITE-CHECK cycle anew for a predetermined plurality of additional attempts; these additional attempts will continue until either a valid identification is made, at which time recycle control transistor 770 is arranged to prevent further recycle attempts, or until a predetermined time interval determined by the time-out timer on FIG. 7 has elapsed, at which time the recycle control circuit 75 similarly arrests further repetitive cycles. The time-out timer thereby serves to place an upper limit on the number of recycle attempts, terminating them at the first time-out; this timer also serves to operate the 7END relay, allowing scanning to commence again after its second time-out period has elapsed. Since the time-out timer is controlled only by the detection of a trunk seizure, an upper limit of two time-out intervals is also placed on the period of time during which a data link may be connected and data read out as described in general terms above.

II. CIRCUIT BLOCKS AND MAGNETIC CONTROL

Throughout this disclosure, magnetic core switching techniques are employed to store information, as in the trunk and station number matrices, and to control the switching of PNPN transistors, as in supervision and sequence control circuit 70. The nomenclature and symbolism used throughout the drawing and specification will be in general accord with that utilized in the article "Pulse-Switching Circuits Using Magnetic Cores," by M. Karnaugh, I.R.E. Proceedings, volume 43, pages 570–583 (May 1955). To provide additional elucidation of certain singular techniques of magnetic core control, two specific core-PNPN operations will be described at this point.

First, consider the start scan gate 73, shown in FIG. 7. Basically, this gate provides for the commencement of scanning after the termination of a particular identification, at which point relay 6CON will have been released. Relay 6CON released, at its transfer contact 1 in FIG. 7, removes negative battery from the control base electrode of PNPN transistor 730 (and places resistive ground thereon) and allows the resultant positive-going pulse superimposed with the $T_{2S}$ "strobe" pulse (see Section III infra) to turn this transistor on as soon as the back-bias of Zener diode 700Z is overcome (in phase with $T_{2S}$). Transistor 730 is turned on and this allows the passage of a $T_2$ timing pulse downward through winding A of core 731. Winding A of core 731 has more turns than winding B. (Alternatively, more ampere-turns are furnished by the pulse passing through winding A than through winding B.) Accordingly, the $T_2$ pulse delivered through winding A switches core 731 to the left even though the $T_2$ pulse delivered through winding B tends to maintain core 731 switched to the right. This "override" effect, switching core 731 to the left, will turn on transistor 732 and thereby allow a $T_{12}$ pulse (still in phase with the same $T_2$) to be transmitted through the active electrode path of transistor 732 and to proceed as the START SCAN signal through cores 741, 742 and 410. Transistor 730 remains conductive, allowing subsequent $T_2$ pulses through winding A to continue to override $T_2$ pulses through winding B, thereby maintaining core 731 switched to the left. Only when the 6CON relay operates (at the beginning of an identification sequence), placing negative battery on the control electrode of transistor 730, will that transistor go off. The following $T_2$ pulse, passing only through winding B, then serves to set core 731 back to the right. Start scan gate 73 thus exhibits a "one shot" type of operation.

A more complex winding control arrangement is indicated with respect to core 410 which controls the trunk scanner 40 by controlling its transistor 400. Windings A through F are shown wound on core 410 and the core and its related circuitry function as follows. Winding A receives the system reset signal from the symbolic switch shown on FIG. 10; this switch, from a practical viewpoint, is operated only when the system is installed and sets core 410 to the right. (The scanner is, in effect, started for the first time by the system reset pulse; all subsequent starts are accomplished by the START SCAN signal infra.) A "normal" starting sequence will be assumed, whereby core 410 was switched to the left following the end of a prior scanning operation.

The START SCAN signal generated as described above by the start scan gate 73 proceeds upward to negative battery through winding F and switches core 410 to the right; due to the relative orientation of windings F and C, the latter being the pick-up winding for transistor 400, transistor 400 is not energized at this time. However, when a $T_1$ pulse then passes upward through winding E, switching core 410 back to the left, transistor 400 turns on due to the relative orientation of windings E and C. Now that transistor 400 is "on," a simultaneous $T_{12}$ pulse may be transmitted through the active electrode path of transistor 400 and upward through winding B on core 410 and thence through a winding on each of cores 411–416 and out as the trigger signal through resistor $R_{TRIG}$ to the trunk sensing circuit 30. This signal switches one of cores 411–416 to energize one of transistors 401–406 respectively, thus providing a scanning signal on one of leads SC1–SC6. It will be noted that the passage of this pulse in an upward direction through winding B serves to switch core 410 back to the right in what may be described as a "self-setting" operation. Winding E on core 410 is now ready to receive the next $T_1$ pulse to cause trunk scanner 40 to sequentially scan each of the leads SC1–SC6; no separate resetting circuit is required.

This alternate right-to-left sequence continues until a trunk seizure is detected (see below) which results, inter alia, in the firing of scan inhibit transistor 423. Now, when a $T_{12}$ pulse passes upward through winding B tending to "self-set" core 410 to the right, an inhibit signal (a concurrent $T_{12}$ pulse) can pass downwardly through inhibiting winding D on core 410 and to negative battery through transistor 423. The passage of this $T_{12}$ pulse through winding D attempts to set core 410 to the left; the $T_1$ pulse which passed through winding E to switch core 410 to the left still maintains a magnetomotive force in that direction. And since the impedance in the path of winding B is made greater than that in series with winding D, the magnetomotive forces associated with windings D and E override the magnetomotive force of the $T_{12}$ pulse going up through winding B and the core is thus inhibited from switching to the right until a subsequent START SCAN signal arrives at winding F. (This will not occur until a complete identification sequence has been completed as indicated by the operation of the 7END relay which causes the 6CON relay to release.)

III. SYNCHRONOUS TIMING CONTROL

As discussed previously, this system is operated under the synchronous control of a centralized timing mechanism.

Considering the pulse schedule of FIG. 13, the uppermost portion thereof indicates the $T_{12}$ pulse wave form which is the basic driving and energizing signal for many of the circuit blocks of the subject system. The pulse distributor 101 shown in detail on FIG. 10 serves to "distribute" the $T_{12}$ pulse in accordance with a predetermined switching pattern so that PNPN transistors 102 and 104 selectively pass alternate pulses of the $T_{12}$ pulse train, thereby resulting in the $T_1$ and the $T_2$ separate pulse trains also shown in the second and third lines of FIG. 13. Finally, the $T_{1S}$ and $T_{2S}$ pulse trains operate as "strobe"

or synchronizing pulses to operate, for example, the synchronizing gates 71–73 on FIG. 7. These strobe pulses are in actuality relatively low amplitude "blips" which coincide with the leading edge of their respective power counterparts; that is, $T_{1S}$ coincides with the leading edge of $T_1$ and $T_{2S}$ coincides with the leading edge of $T_2$. The manner in which pulse distributor 101 distributes and generates these pulses will now be described.

Initially, regardless of the magnetic orientation of cores 103 and 105 which respectively control distributor transistors 102 and 104, system reset switch 101S, which may in fact be operated only once prior to the installation of this system, is operated and causes core 103 to switch to the right and core 105 to switch to the left. Clock and driver circuit 106 and pulser and amplifier circuit 107 cooperate once system operation has commenced to generate the $T_{12}$ pulse train at a predetermined rate. (A sample illustrative rate might be approximately 1470 pulses per second, so that the time separation between successive $T_{12}$ pulses or alternately from a $T_1$ phase to a $T_2$ phase, both of which separations are indicated on FIG. 13 at *t*, would be approximately 0.68 millisecond.)

Thus, the $T_{12}$ pulses begin to be delivered to pulse distributor 101 with core 103 set to the right and core 105 set to the left. The first $T_{12}$ pulse will therefore be seen to affect only core 103 in proceeding to negative battery within the distributor 101; core 103 is switched to the left, whereas core 105 being already saturated in the left direction does not switch. The switching of core 103 and the relative orientation of its $T_{12}$ drive winding and the $T_{1S}$ strobe winding (the furthest right-hand winding on core 103) result in the generation of a $T_{1S}$ strobe or synchronization pulse. It may be noted that this pulse is of very small relative magnitude since it represents only the induced voltage pick-up when core 103 switches. The $T_{1S}$ strobe pulse is employed in FIG. 7 to synchronize the driving of the recycle and time-out timers. When core 103 switches, the relative orientation of its $T_{12}$ drive winding and its dependent transistor 102 control winding is such that transistor 102 turns on. Transistor 102 in the "on" condition transmits a concurrent $T_{12}$ pulse to circuit blocks on FIGS. 4, 6 and 7 as the $T_1$ phase of the driving pulses.

The $T_1$ phase pulse also passes through a winding on the other control core 105 which switches that core to the right. However, the switching of core 105 which occurs coincident with the $T_1$ pulse, does not turn on transistor 104 because of the relative arrangement of the winding energized by $T_1$ and the pick-up winding connected to the control electrode of transistor 104. Thus, after the generation of $T_1$, core 103 is switched to the left and core 105 is switched to the right. The next $T_{12}$ pulse delivered from the pulser and amplifier circuit 107 to the drive windings on each of cores 103 and 105 is ineffective with respect to core 103 but switches core 105 to the left. This switching of core 105 results in the generation of a $T_{2S}$ strobe pulse (transmitted to FIG. 7) in the identical manner as that described with respect to $T_{1S}$. In addition, transistor 104 is energized by virtue of a positive inductive pick-up being delivered to its control electrode from the winding on core 105. In this energized state, transistor 104 passes a coincident $T_{12}$ pulse through its active electrode path to serve several $T_2$ synchronizing functions. First, over lead REO a readout drive signal is delivered to the readout stepping switch (part of readout circuit 95) on FIG. 5; it will later be seen with respect to the description of the readout procedure that the stepping switch is only stepped to achieve sequential readout if the readout advance gate consisting of PNPN transistor 942 is energized. Secondly, the $T_{12}$ pulse is transmitted to various circuit portions on FIGS. 7 and 9 as a $T_2$ timing pulse. Another function served by the $T_{12}$ pulse passing through an energized transistor 104 is the setting of control core 103 to the right to prepare this core to receive the next $T_{12}$ pulse and thus commence the timing cycle anew. That is, after the generation of a $T_2$ pulse, core 103 is switched to the right while core 105 is switched to the left, these orientations being the same as those which existed when the timing cycle began.

IV. ILLUSTRATIVE PBX—TYPICAL REQUIREMENTS

A. *Trunks and extensions*

The specific illustrative embodiment of our invention described herein comprises a PBX which will be assumed to have the overall or "pilot" directory number CH 3–1000 and will also include facilities for at least two thousand extension stations internally numbered 2000–3999. Since it is the number of extensions and outgoing traffic requirements of these stations which largely determine the number of required outgoing trunk circuits connecting the PBX to the CH 3 central office, we can also assume that, as an illustrative number, 30 trunk circuits will be sufficient to serve the PBX. It is understood that additional trunk circuits can always be added as extensions and outgoing traffic increase. Two typical extension stations 20 and 21 are shown in FIG. 2 having been assigned four-digit extensions 2467 and 2425 respectively. Each of these stations has a corresponding station line circuit such as 22 and 23 connecting the extension to the PBX switch train 24.

Trunk circuits 1 through 30 connect PBX switch train 24 to responsive central office equipment (not shown). Of these 30 trunks, only four are shown in block form on FIG. 2 and those which are so shown are indicated by parentheses within the blocks to have been assigned flexible four-digit trunk number designations. Thus, referring to FIG. 2, trunk circuit 1 is designated by the four-digit number 1215, trunk circuit 2 is designated by 1450, trunk circuit 6 is designated by 1492 and trunk circuit 30 is designated by 2039. As has been previously discussed, the assignment of these four-digit trunk numbers can be made on a relatively random basis. Moreover, if there is only one trunk circuit identified by the designation 1215 (e.g., trunk circuit 1) connecting any PBX to the CH 3 central office, it is apparent that an identification which includes a trunk number of 1215 specifically identifies the CH 3–1000 PBX.

B. *Operator positions*

Before describing the matrices and other dependent circuit blocks required by the size of the assumed PBX in the instant invention, an introduction to the identification of operator-initiated outgoing service requests appears desirable. Any of a plurality of operator positions in illustrative switchboard 28 (FIG. 2) may initiate an outgoing service request to seize a trunk by plugging in a cord to one of a plurality of available trunk access terminals on the switchboard console 28, or by depressing a trunk pickup key as described in the Williams and Abbott et al. patents. For the purposes of the following description, it will be assumed that at the CH 3–1000 PBX there are several attendants or operator positions, three of which (28A, 28B and 28N) are symbolically shown on the switchboard 28; each of these positions may respond to an operator service request from one of the PBX extensions in a predetermined group and may also seize any of a plurality of central office trunk circuits within a predetermined group directly by cord or key. (Thus, operator position 28A may have access to trunk 1–5, position 28B may have access to trunk 6–10, etc. In practice, as is well known, some overlapping between positions may be provided so that different attendants to some extent may be able to seize the same trunks.)

At this point, it will only be mentioned and will be observable from FIG. 2 that the peculiar manner in which any of operator positions 28A–28N can seize a trunk and the different location of these positions' sleeve leads relative to those of the extension stations, require certain unique treatment in order to fully identify the operator position (by a four-digit identification number) on an outgoing service request. Moreover, it is often desirable or necessary to assign to operator positions identification numbers which do not conform to the normal PBX extension numbers assigned in accordance with the internal PBX numbering plan. Thus, although the hypothetical CH 3-1000 PBX is arranged to have only four-digit extensions between 2000 and 3999, it may be required to have operator position identification numbers beginning with the thousands digit 1, 4, 5, etc. The instant invention allows for this type of number assignment without requiring any additional matrices. By reference to FIGS. 2 and 12 it will be seen that pursuant to these requirements, connections are made from the sleeve leads of each of the operator positions directly to the thousands part of station number matrix 110 shown on FIG. 12.

This thousands part of station number matrix 110 serves a dual function: In addition to providing the identification of the thousands digit of a PBX extension number (via a cross-connection from the hundreds-tens-units part of station number matrix 110 shown on FIG. 11), it also furnishes "listed number" identification for operator positions (via a cross-connection from the originating operator position sleeve on switchboard 28). The analysis of the exact manner and nature of this dual function identification will, however, be reserved from the description below (Section VI) referring to a sample operator-initiated call.

C. *Identification matrices*

It will be recalled that the specific embodiment of a PBX described herein has an illustrative 2000 extensions (or at least was designed for a capacity of 2000 extensions) internally numbered 2000–3999 and has thirty trunk circuits illustrated in block form in FIG. 2. With reference to the trunk number matrix 58 shown in FIGS. 5 and 8, it may be seen that there are ten cores for each digit of the trunk number for a total of forty digit cores and a bias core TKB in the entire matrix 58. When a particular trunk is seized, and is specifically determined by the operation of one of the five relays 6GP1–6GP5 and one or two of the relays 6B0–6B2 (thereby establishing a single electrical path from one of the buses 1–6 on FIG. 6 through one of the six transfer contacts 1–6 associated with the operated one of the relays 6GP1–6GP5 on FIG. 8—i.e., one of six buses in combination with one of five group relays completely determines the one of thirty trunks seized), a path will be set up from the outpulser 60 to one of the thirty write inputs (only seven of which are shown) to the trunk number matrix 58.

In proceeding from right to left in FIGS. 5 and 8 illustrating the trunk number matrix 58, one of cores 5TH0–5TH9 will be set downward to indicate the hundreds digit of the trunk number, one of cores 8T0–8T9 will be set downward to indicate the tens digit of the trunk number and one of cores 8U0–8U9 will be set downward to indicate the units digit of the trunk number. (The description of trunk bias core TKB will be deferred until readout is discussed.) It may therefore be concluded at this point that one trunk number matrix such as 58 is sufficient to satisfy the trunk identification needs of the illustrative PBX.

The station number matrix 110 appears in two parts, a hundreds-tens-units (H-T-U) part on FIG. 11 and a thousands part of FIG. 12. The H-T-U portion on FIG. 11 consists of thirty digit cores, ten each for the units, tens and hundreds digits of the calling station number, and a bias core $STAB_1$. The thousands part of the matrix 110 shown on FIG. 12 consists of ten identification cores and one bias core $STAB_2$ one of the former of which will furnish the thousands digit of the station number or of the calling operator position. Thus, when a station number identification is to be made, a WRITE signal finds its way back from the sleeve lead of the calling extension over the cabled path traversing FIGS. 2, 5, 8 and 11 to one of 100 inputs to the H-T-U matrix. One of cores 11U0–11U9 will be set downward to indicate the units digit of the station number, one of cores 11T0–11T9 will be set downward to indicate the tens digit of the station number and one of cores 11H0–11H9 will be set downward to indicate the hundreds digit of the station number. Only one of cores 11H0–11H9 in the typical H-T-U part of the station number matrix 110 labeled on FIG. 11 as the "2400 group" (for identification numbers 2400–2499) will be set because of the individual cross-connection from only one of those ten cores to a terminal connected to a winding on only one of cores 12H0–12H9 on the thousands part of station number matrix 110 shown on FIG. 12.

It may therefore be noted that for our assumed 2000 extensions, twenty different matrices such as the H-T-U part shown on FIG. 11 will be required, each of these H-T-U portions furnishing identification data for 100 extensions. However, it is equally clear that only one of the FIG. 12 thousands part of station number matrix 110 will be required, cross-connections being made from the various H-T-U portions (only the 2400 group being shown) to either the input terminal to a winding on core 12TH2 or 12TH3 in accordance with the internal PBX numbering plan adverted to above. Thus, with respect to the 2400 group illustrated on FIG. 11, a cross-connection is illustrated from a terminal 4 connected to a winding on core 11H4 to a terminal 2 connected to a winding on core 12TH2; this completely specifies the thousands digit (2) and the hundreds digit (4) applicable to the 2400 group.

Illustrative cross-connections are also shown to some of the lower set of terminals OP0–OP9 on FIG. 12, the illustrated cross-connections being to terminals OP0, OP1 and OP9 associated with the uppermost windings on cores 12TH0, 12TH1 and 12TH9 respectively. These cross-connections come from operator positions such as 28A, 28B and 28N on FIG. 2. By virtue of being connected to core 12TH1, it will be seen that operator position 28B is assigned, for station identification purposes, the thousands digit 1; in the description of a sample operator-initiated call below, it will be seen that the remaining three digits of the operator identification number are assigned in a somewhat "parasitic" fashion based on the connection of lead OP from FIG. 12 to input lead 2400 to the matrix of FIG. 11.

V. ILLUSTRATIVE IDENTIFICATION OF CENTRAL OFFICE TRUNK SEIZURE—OUTGOING CALL

In order to fully describe the manner in which the instant invention operates, there follows the sequential switching procedure attendant upon initiation of an outgoing service request by a typical PBX extension. The extension stations 20 and 21 with four-digit station identification numbers 2467 and 2425, respectively on FIG. 2 are again merely illustrative of the much greater plurality of similar extensions connecting to the CH 3–1000 PBX. Similarly, trunk circuits 1–30, each with their respective four-digit trunk identification numbers in parentheses on FIG. 2, are merely shown in symbolic form; such trunk circuits, which may be seized in random fashion by switches within PBX switch train 24 in response to outgoing service requests from any of a plurality of PBX extensions, may be of the general type disclosed in the previously cited H. H. Abbott et al. patent. As has also been previously mentioned, the assignment of trunk identification numbers to each of the trunk circuits 1–30 on FIG. 2 can be made in a relatively random and flexible manner; it will be assumed that no two trunk circuits connecting any PBX to the CH 3 central office are identically designated. From a practical viewpoint, the thirty trunk circuits associated with the CH 3–1000 PBX actually occupy thirty separate line appearances terminating at the CH 3 central office. That is, as is often the case in central offices, the line appearances corresponding to directory numbers CH 3–1000 though CH 3–1029 are occupied by the thirty terminating trunks from the CH 3–1000 PBX. This naturally precludes the assignment to private lines of any directory numbers in this group. As far as the central office is concerned, trunk circuit 1 on FIG. 2 might have been identified at the central office by the number 1000, trunk circuit 2 being identified as 1001, trunk circuit 6 as 1005 and trunk circuit 30 as 1029. However, the numerical assignment of trunk numbers according to the instant invention requires no adherence to such central office designations although the two numbering systems may, if desired, coincide. To illustrate the flexibility in trunk number assignment associated with the instant invention, no such coincidence will be assumed herein, although it should be understood that it is easily obtainable.

A. *Trunk seizure*

It will be assumed at this point that PBX extension station 20 with four-digit station identification number 2467 initiates a service request by going off-hook and thereby engaging station line circuit 22 and responsive equipment in the local PBX switch train 24. This returns local dial tone to extension 20. Station 20 now indicates its desire to initiate an outside call (either a call to the local dialing area or a toll DDD call, for example) by dialing the digit 9. Equipment within switch train 24 is thereby energized to result in the seizure of one of trunk circuits 1–30 on FIG. 2. Let it be assumed that trunk circuit 6 (corresponding to trunk circuit 26 on FIG. 1) with four-digit trunk identification number 1492 is so seized.

B. *Detection of trunk seizure*

Seized trunk circuit 6 with identification number 1492 is the sixth trunk in group 1 of the five groups of trunk circuits connecting the CH 3–1000 PBX to the CH 3 office. Each of the trunk circuits 1–30 is connected to a separate sense circuit block such as 306 for trunk circuit 6 in the trunk's respective sense group such as trunk sense group 1 for trunks 1–6. Thus, by a connection shown as a common cable from the trunk circuits on FIG. 2, an individual path exists from trunk circuit 6 to sense block 306 in trunk sense group 1.

When a two-way trunk, such as trunk circuit 6, is seized on an outgoing call, it applies a positive battery signal to lead 6A prior to grounding lead 6B. On the other hand, if trunk circuit 6 is seized on an incoming call, lead 6B will be energized prior to 6A. Since it is assumed that identification only of outgoing calls is desired, circuit block 306 is arranged to be energized only when an input signal on lead 6A precedes a similar signal on lead 6B. This is achieved by means of capacitor 6C which first discharges in response to the initial signal over lead 6A, and then charges through the active electrode path of transistor 340 when that transistor is subsequently turned on in response to the signal on lead 6B. The charging signal from capacitor 6C proceeds through the active electrode path of transistor 340 and down through a winding on core 356, setting that core to the right, and thence over common bus 350 for trunk sense group 1 to negative battery SCB. To avoid possible errors which might result from the simultaneous scanning (by trunk scanner 40) and sensing (by one of the sense groups of trunk sensing circuit 30) of a sense core (such as 356), an arrangement is included to prevent the firing of any sense transistor (such as 340) in phase with $T_{12}$. This is done by feeding a portion of the $T_{12}$ pulse to the bus 350 common to all the output electrodes of the sense transistors in each sense group. This back-biases these transistors during the $T_{12}$ pulses and prevents them from firing until a $T_{12}$ pulse has terminated. Since scanning over leads SC1–SC6 occurs in phase with $T_1$ pulses (in phase with alternate $T_{12}$ pulses), there can be no improper simultaneous switching of the sense cores.

In response to the seizure of trunk circuit 6 by an outgoing service request from PBX extension 20, sensing core 356 in trunk sensing circuit 30 has been set to the right and now awaits the reception of a scanning signal through its scanning winding. It can now be seen that if lead 6B of detector block 306 were energized first, capacitor 6C would not charge and core 356 would not switch.

C. *Trunk scanning*

At the end of a previous identification sequence, the 6CON relay (FIG. 6) will have released in response to the operation of the 7END relay (FIG. 7) and in so doing will have energized start scan gate 73. This results in the provision of the START SCAN signal through the bottom windings on cores 741 and 742 setting both those cores in the upward direction (but transistor 740 is not energized) and upward through winding F on core 410 setting that core to the right. Trunk scanner 40 is arranged to sequentially scan the different sense groups of trunk sensing circuit 30 over common multipled (among trunk sense groups 1–5) leads SC1–SC6 under the control of core 410 and transistor 400 as follows:

It will be recalled that the START SCAN signal set core 410 to the right in phase with a $T_2$ pulse so that according to the pulse schedule of FIG. 13, it is apparent that the next power pulse (i.e., $T_1$, $T_2$ or $T_{12}$ as opposed to the lower amplitude $T_{1S}$ and $T_{2S}$ strobe pulses) which will affect trunk scanner 40 will be the $T_1$ pulse transmitted upward through winding E on core 410 to negative battery. This signal switches core 410 to the left and causes transistor 400 to turn on and to pass another coincident $T_{12}$ pulse through the active electrode path of transistor 400 and upward through winding B on core 410 and thence through a winding on each of cores 411–416 and then as the trigger signal through resistor $R_{TRIG}$ and over the TRIG lead to winding E on a core such as 360 in each of the five trunk sense groups 1–5 of the trunk sensing circuit 30. The system reset signal having previously set core 360 in trunk sensing group 1 to the left through winding F thereon over lead SR, this core 360 is now switched to the right by the triggering signal over lead TRIG and in so switching turns on sense gating transistor 342. Core 410 is self-set back to the right by the passage of the trigger signal upward through winding B.

Passage of the trigger signal through the windings on each of cores 411–416 is effective as follows: Of cores 411–416, the only one affected by this signal, which attempts to set these cores in an upward direction, is core 411 which was the only core previously switched in the downward direction (in response to either the system reset signal over lead SR or from a previous scanning sequence which had transmitted a pulse from transistor 406 out to scan lead SC6). All the other cores 412–416 are at this time already switched in the upward direction and are therefore saturated and will not be switched by the triggering signal.

Core 411 thus switches in response to the signal proceeding thereto from winding B of core 410, firing transistor 401, and still in coincident phase with the $T_1$ pulse which originated the entire sequence, a $T_{12}$ pulse is passed through the active electrode path of transistor 401 to set core 412 in the downward direction (overriding the signal from winding B of core 410 which would tend to maintain core 412 in an upward oriented direction). This $T_{12}$ pulse is transmitted out of the scanner 40 over lead SC1 and scans sense core 351 of trunk sense group 1 in the trunk sensing circuit 30. This scanning is achieved by the scan signal of lead SC1 passing through the far right winding on core 351 and attempting to set that core to the left; a sense core such as 351 will only switch, however, if it has been previously switched to the right in response to the detection of a trunk seizure by its associated sense transistor circuit, in this case indicated by the block 301. Under the instant assumption, whereby seizure of trunk circuit 6 energizes sense circuit block 306 and switches core 356, no detection will be made at this time.

Since the switching of core 360 in response to the trigger signal, supra, turned on transistor 342, the scanning signal over lead SC1 may find a complete electrical path from the scanned winding on core 351 through diode D1, through the active electrode path of transistor 342 and in a self-setting sequence to negative battery through winding D and resistor RGP1, thereby resetting core 360 back to the left to prepare it for the next trigger signal. (The scan signal transmitted through the active electrode path of transistor 342 cannot pass through windings B or C on core 360 due to the "off" state in which scan group advance transistor 407 is at this time.)

At the termination of the $T_1$ phase pulse, the critical core orientations are: core 410 is set to the right, core 412 is the only one of cores 411–416 switched in the downward direction, and core 360 is switched in the left direction. When the next $T_1$ pulse passes through winding E, a similar switching sequence as that described above takes place whereby cores 410, 412 and 360 are switched in phase with this second $T_1$ pulse. As a result of these cores having switched, their respective transistors 400, 402 and 342 turn on, transistor 400 providing the trigger signal to switch core 360, transistor 402 providing the second scan signal over lead SC2 to scan core 352 and transistor 342 providing a path for this SC2 signal to proceed through the scan winding on core 352 to reset (i.e., "self-set") core 360 as before. Since according to our assumption, supra, only core 356 is set to the right indicating detection of a trunk seizure, the SC2 signal also has no effect on core 352.

The scanning procedure by trunk scanner 40 proceeds by sequential signals over scanning leads SC3–SC5 with similar "ineffective" results. After the SC5 signal has scanned core 355, only core 416 of cores 411–416 is set down. When the next scanning step occurs in response to the following $T_1$ pulse having energized winding E on core 410 in the manner described above, the trigger signal switches core 416, turning on transistor 406, and the SC6 scan signal simultaneously having set core 411 downward in a re-entrant manner, now scans sense core 356. Since core 356 had been the only sense core previously set to the right, this SC6 attempt to set it back to the left is successful and the core switches. Before proceeding with a specific description of the results of core 356 having so switched in accordance with our specific example, it is believed to be instructive at this point to indicate the manner in which scanner 40 is advanced to scan the other trunk sense group cores.

(1) *Scan group advance.*—In order for the trunk scanner 40 to scan the various circuit blocks of the trunk sense groups in addition to group 1, we have included arrangements to advance the scanning procedure past group 1 once the energization of transistor 406 has caused scan signal SC6 to scan sense core 356. The manner in which scanning is advanced from group 1 to group 2 will be indicated below, the advancing from group 2 to the other groups and then back to group 1 being readily apparent therefrom. When core 416 in trunk scanner 40 is switched by the trigger signal from transistor 400 to allow for the SC6 scan signal through transistor 406, a pickup winding on core 416 inductively couples a positive polarity signal to the base control electrode of scan group advance transistor 407. Transistor 407 therefore turns on at precisely the same time as does transistor 406.

In turning on, transistor 407 provides negative battery through its active electrode path and over the ADV advance lead to the cathode of diode DA1 of trunk sense group 1. Now, when the SC6 scan signal proceeds through the scan winding on the final sixth core (356) to be scanned in trunk sense group 1, it proceeds through diode D6 and through the active electrode path of transistor 342 and thence through winding B or core 360 and through a winding similar to winding C on a core corresponding to core 360 in each of trunk sense groups 2–5 over the input-output lead path comprising leads 33 and 36 relating to each of these groups. The signal further passes from lead 36 connected to trunk sense group 5 back to lead 33 of trunk sense group 1 and upward through winding C on core 360 to the negative battery on the ADV lead through diode DA1. Thus, the totality of input signals to windings on core 360 coincident with this sixth $T_1$ pulse is as follows: The trigger signal over lead TRIG upward through winding E on core 360, tending to set that core to the right and through a similar winding on each of the other similar cores in each of the other groups tending to set those cores to the right; the scan signal SC6 upward through winding B of core 360 tending to set that core to the right and to lead 33 of the corresponding core (not shown) in trunk sense group 2 tending to set that core to the left and also upward through winding C on core 360 tending to set that core to left. Although the trigger signal to winding E on core 360 was effective to switch that core, the cumulative effect of the trigger signal still passing through winding E when added to the scanning signal passing through winding B overrides the attempt of the same scanning signal to set core 360 to the left through winding C. (The scanning signal is almost completely ineffective in respect to winding D because of the higher impedance to negative battery represented by resistor RGP1 on FIG. 3.)

Thus, core 360 is switched to the right by the trigger signal over lead TRIG upward through winding E, but the self-setting sequence normally operative is at this point inhibited. Core 360 remains switched to the right and is thus unaffected by subsequent trigger signals over lead TRIG until the scanning of trunk sense group 5 has been completed as indicated by a signal from lead 36 of trunk sense group 5 into lead 33 of trunk sense group 1 which resets core 360 back to the left and allows for scanning of trunk sense group 1. Meanwhile, the sense gate core in trunk sense group 2 (corresponding to core 360 in trunk sense group 1) has received a signal from lead 36 of trunk sense group 1 to lead 33 of trunk sense group 2, passing the scan signal through its winding C tending to set the core to the left. A concurrent signal (the trigger signal) has proceeded through its winding E from lead 35 on trunk sense group 1 to lead 32 on trunk sense group 2 tending to maintain that core in its right-oriented direction. However, the signal through the C winding tending to switch the core to the left is arranged to override the signal through the E winding due to the increased impedance represented by resistor $R_{TRIG}$ in the path of the trigger signal to winding E. The ampere-turns through winding C tending to switch the gating core in trunk sense group 2 to the left therefore exceed those tending to maintain the core switched to the right, and the core does in fact switch to the left. The gating core in trunk sense group 2 is now prepared to be switched through 6 successive left-right switching cycles while the circuit blocks of trunk sense group 2 are scanned by the SC1–SC6 scan signals from the trunk scanner 40. All the other gating cores (in trunk sense groups 1 and 3 through 5) are presently switched to the right and will thereby unaffected by any trigger signals until their scanning "turn" arrives. Scanning advance proceeds in an identical manner from group 1 to group 5 and then back to group 1 again until a seized trunk is detected at which point the scanning procedure is temporarily interrupted as indicated below.

D. *Scanning detects trunk seizure—Effects of switching of sense core 356 in response to scanning signal*

The switching of sense core 356, indicating the detection of the seizure of trunk circuit 6 in accordance with the above assumption, provides a proper polarity inductive output on three output windings to turn on group transistor 341 and bus relay control transistors 421 and 422 (the latter two over leads *l*1 and *l*2 connected to windings on core 356). This switching, it will be recalled, is occurring in phase with a $T_1$ pulse and the energization of each of transistors 341, 421 and 422 provides an operating path for a different relay of the trunk selector relays on FIG. 6. It may be observed that a positive pulse may proceed through the windings of each of relays 6GP1, 6B2 and 6B1 of the trunk selector part of circuit 68 on FIG. 6. These positive signals proceeding through the active electrode paths of transistors 341, 422 and 421 respectively, to negative potential source ST on FIG. 4, serve to provide a positive signal to the control base electrodes of scan inhibit transistor 423 and transistor 424 prior to the actual operation of the three relays mentioned above.

The energization of scan inhibit transistor 423 serves to inhibit further scanning at this time by trunk scanner 40 by providing a path to negative battery for a $T_{12}$ pulse downward through winding D on core 410 establishing a magnetomotive force which, when added to the magnetomotive force associated with winding E, will override the normally greater magnetomotive force associated with winding B. Core 410, therefore, remains switched to the left, unaffected by subsequent $T_1$ pulses through winding E, until the 7END relay operates at the end of the identification sequence to remove the holding ground at its break contact 1; this releases the 6CON relay and allows start scan gate 73 to provide a START SCAN signal to set core 410 to the right, thus starting scanning again.

E. *Operation of bus and group relays*

As mentioned above, the energization of transistors 341, 422 and 421 provide operating paths for relays 6GP1, 6B2 and 6B1, respectively, which then operate. The selection of one of the six bus inputs 1–6 on FIG. 6 is made by the combined operation of relays 6B1 and 6B2. It will be seen that when relays 6B1 and 6B2 operate, the only one of buses 1–6 which establishes a complete path between the outpulser 60 and the cabled output therefrom to the trunk number matrix 58 on FIG. 5 is bus 6, by virtue of the operated condition of relays 6B1 and 6B2 and the normal unoperated condition of relays 6B0. A completed path now exists from the outpulser 60 to the input to the trunk number matrix 58 over the normal break portion of transfer contact 6 of relay 6B0, the make portion of transfer contact 6 of relay 6B2 and the make portion of transfer contact 6 of relay 6B1.

The operation of group relay 6GPI, indicating that the seized trunk is in group 1 and has been detected by the operation of one of the six circuit blocks in the trunk sense group 1, provides the output steering from the trunk number matrix 58 on FIG. 8 and finally determines which one of the 30 paths through the trunk number matrix 58 has been selected. The selected path representing the seized trunk 6 is indicated at the output of the trunk number matrix 58 on FIG. 8 by the operation of transfer contacts 1–6 of relay 6GP1. However, the only one of these 6 paths which coincides with a completed path (bus 6) through the bus network on FIG. 6 is the one connecting to trunk 6 through the make portion of transfer contact 6 of relay 6GP1. The complete electrical path thereby established can be seen to proceed from the outpulser 60 through bus 6, through a winding on each of trunk number matrix cores 5TH1, 5H4, 8T9 and 8U2 (corresponding to identification number 1492 for trunk 6 as indicated above).

From the winding on core 8U2, the path is established through the make portion of transfer contact 6 of relay 6GP1 and over the cabled connection representing a cross connection to the sleeve of the actually seized trunk circuit 6 shown in block form on FIG. 2. It will be recognized that since PBX extension 20 is itself connected to seized trunk 6, the path may be further extended back from trunk circuit 6 through the PBX switch train 24 to station line circuit 22 associated with extension 20. A cross connection from the sleeve of station line circuit 22, represented by the cabled connection crossing FIGS. 2, 5, 8 and 11 connects the energized station's sleeve to the appropriate lead of the hundreds-tens-units part of station number matrix 110 (for the 2400 group) corresponding to the assigned extension number associated with calling extension 20, i.e., input lead 2467 on FIG. 11. The complete utilization of this path will be described more fully with respect to the write-in identification procedure infra.

F. *Identification sequence*

(1) *START signal.*—The energization of transistor 424 mentioned above provides an operating path for a positive pulse through the winding of control relay 6CON (to negative battery over lead C and through the active electrode path of transistor 424 to negative battery). Relay 6CON on FIG. 6 thereby operates and at its transfer contact 1, inhibits the operation of start scan gate 73 by connecting negative battery to the control electrode of transistor 730 thus disabling that transistor.

The combination of the closure of its make contact 2 and the opening of its break contact 3 serves to remove negative battery from the control electrode of transistor 710 in start ANI gate 71 and to thereby furnish a positively increasing signal (by virtue of the coupled capacitor) to the base of transistor 710. As with the start scan gate 73, this positive-going signal in conjunction with $T_{2S}$ strobe pulses also delivered to the base of transistor 710 serves to initially energize start ANI gate 71 by turning on transistor 710.

The recycle timer including transistor 772 has negative battery removed from the base of transistor 772 by the opening of break contact 4 on the 6CON relay; this prepares the recycle timer to be subsequently energized (by timing pulses charging capacitor CRT) when the recycle control including transistor 770 is energized, to be described infra.

The time-out timer, which is independent of any such control, is energized at this time by the removal of negative battery from the base of transistor 773 in response to the opening of the break portion of 6CON relay transfer contact 5, so $T_1$ pulses may now begin to charge capacitor CTO from a $T_1$ bus through resistor RTO, diode DTO and the operated make portion of 6CON relay transfer contact 5. As will be more fully described below, the time-out timer will only operate when transistor 773 is energized in response to the breaking down of Zener diode 773Z when the charge on capacitor CTO reaches a certain predetermined threshold value.

Finally, at its make contact 6, relay 6CON provides a ground closure to the winding of the 7END relay; this relay does not operate however until transistor 740 is energized.

With respect to start ANI gate 71, the energization of transistor 710 when the back bias of Zener diode 700Z is overcome allows a $T_2$ power pulse to switch core 711 to the left, thereby energizing transistor 712 which in turn allows a $T_{12}$ pulse to proceed through the active electrode path of transistor 712 and out of the start ANI gate 71 as the START signal.

In proceeding to negative potential source SRC, the START signal sets core 751 up (overriding the coincident $T_2$ pulse tending to maintain core 751 in a downward direction because of the windings' turns ratio and the appropriate disparity in values between resistor RCK and RST) and also sets core 771 in the upward direction. Although both cores 751 and 771 are switched upward in response to this START signal which is in phase with $T_2$, their respectively controlled transistors 750 and 770 are not energized at this time.

(2) *Control of recycle timer.*—Referring to the pulse schedule of FIG. 13, it will be seen that the next power pulse which can affect any of the thusly set cores is a $T_1$ pulse through the lowest winding on core 771, resetting that core downward and thereby turning on recycle control transistor 770. When transistor 770 fires, a $T_{12}$ power pulse in phase with the $T_1$ pulse which turned on the transistor can pass through the active electrode path of transistor 770 through a self-setting (upward) winding on core 771 to negative battery through the resistor RRC. This resets core 771 preparing it for the next $T_1$ pulse and also increases the potential connected to the upper plate of capacitor CRT through resistor RRT and diode DRT, thereby allowing capacitor CRT to begin to charge in a cumulative stepping fashion in phase with the $T_1$ pulses connected to its lower plate. Each successive $T_1$ pulse thereafter causes core 771 to go through a set-reset cycle identical to that described immediately above and capacitor CRT continues to be charged. When, in phase with such a $T_1$ pulse, the charge on capacitor CRT exceeds the back bias provided by Zener diode 772Z, the recycle timer turns on by the energization of transistor 772. A signal, the utility of which will be described below with reference to the unsuccessful identification attempt description (Case II), is transmitted to the lower winding on start core 751 to thereby set that core upward and thus simulate a legitimate signal from start ANI gate 71.

When capacitor CRT has fully discharged to negative battery through the active electrode path of transistor 772, transistor 772 turns off and the charging cycle of capacitor CRT may commence anew. The periodic timing interval for the recycle timer may be controlled by selecting appropriately valued elements for Zener diode 772Z, capacitor CRT and resistor RRT; a typical illustrative periodic interval could be arranged to be approximately 200 milliseconds. (Since a typical illustrative periodic interval for the time-out timer could be, for example, one second, it may be initially seen at this point that five successive cycles of the recycle timer might be permitted before time-out occurs.)

(*3*) *CLEAR signal.*—It will be recalled that core 751 was switched upward in response to the START signal which was in phase with a $T_2$ timing pulse. On the next $T_1$ pulse which was observed to have commenced the energization of the recycle control circuit and the recycle timer, core 751 remains unaffected. However, the following timing signal is a $T_2$ pulse which passes through a winding on core 751 to reset that core in the downward direction. (The same $T_2$ pulse passes to negative potential source SRC through resistor RCK through a winding on core 760, but as this core is normally set in the downward direction, the instant $T_2$ pulse does not affect that core.) When core 751 is thereby switched, transistor 750 is energized, allowing a $T_{12}$ pulse to proceed through the active electrode path of transistor 750 and out from the supervision and sequence control circuit 70 as the CLEAR signal.

The CLEAR signal is arranged to reset in the proper switching orientation any cores in the circuit which might in any way have been either erroneously switched by a stray transient signal or which were perhaps not read out during the course of a prior identification. (The purpose of the CLEAR signal is more apparent with respect to additional identification attempts following an initial failure; see, for example, the "Case II" description below in Section G.2.) The CLEAR signal initially proceeds to the outpulser 60 where outpulser control core 606, normally switched to the left, is switched to the right to prepare for the generation (see next section, infra) of the WRITE signal. However, due to the polarity relationship between the core 606 clear winding and the control windings connected to the base electrodes of outpulser transistors 601–604, these transistors remain in the "off" state.

The CLEAR signal further proceeds through all the cores of the trunk number matrix 58 insuring that those cores are definitely set in the upward direction, and has the same effect on the cores of the H-T-U part of station number matrix 110 shown on FIG. 11. With respect to the thousands part of station number matrix 110 shown on FIG. 12, the CLEAR signal insures that all of those cores are set in the downward direction.

Finally, the CLEAR signal proceeds from the thousands part of the station number matrix 110 and traverses FIGS. 9, 6 and 5 and goes to negative battery through a winding on core 501 of the readout stepping switch of readout circuit 95, switcihng that core to the right and thereby preparing it for the readout procedure to occur later on in the identification sequence when a $T_2$ pulse appears on readout lead REO after readout advance gate transistor 942 has fired.

(*4*) *WRITE signal.*—At this point in the switching sequence, it may be recalled that the CLEAR signal had set core 606 to the right coincidently with a $T_2$ phase pulse. PNPN transistors 601–604 are thus still in the "off" condition, no positive signal having yet been received by their control base electrodes.

Capacitors 601C–604C have been charging in parallel in response to $T_{12}$ power pulses through respectively corresponding resistors 601R–604R to negative potential source 605. These capacitors are arranged to be fully charged when or before core 606 switches to the right in response to the CLEAR signal. The next timing pulse which affects outpulser 60 is a $T_1$ pulse upward through the left-hand winding on outpulser core 606 which switches that core back to the left. The polarity relationship between this $T_1$-responsive winding and the windings connected to the control electrodes of each of transistors 601–604 is appropriate to turn on each of these transistors. The energization of transistors 601–604 serves to connect, by means of the active electrode paths of each of these transistors, capacitors 601C–604C in series whereas they had been charged in parallel. It is apparent that, assuming equally charged capacitors, the voltage magnitude of the pulse appearing at the output of the outpulser 60 (connecting initially to check gate 61) is four times the charge on a single one of the capacitors. That is, the outpulser 60 as shown operates as a fourfold voltage multiplier or "quadrupler."

This relatively high voltage short duration pulse, (e.g., 200 volts for 30 microseconds) proceeding initially to the matrix enable gate 61 and then to the one available bus of the six buses 1–6, is the WRITE signal. When capacitors 601C–604C have been fully discharged, transistors 601–604 turn off allowing capacitors 601C–604C to be reconnected in parallel for the purpose of recharging. Outpulser core 606 remains switched to the left and will not generate any subsequent WRITE signals unless and until another CLEAR signal switches core 606 back to the right to subsequently allow the serial connection of capacitors 601C–604C. If the identification sequence is successful on the first attempt, as will initially be assumed below (Case I), no CLEAR signal will arrive from the supervision and sequence control circuit 70 until another identification is called for. Capacitors 601C–604C may, therefore, charge to their maximum voltage limited by source 605 and the $T_{12}$ charging pulse. However, should another attempt be required for any given identification to be successfully made, it will be seen that separate CLEAR signals will allow for the generation of the appropriate number of corresponding WRITE signals.

(*5*) *Path of WRITE signals.*—To facilitate the following description, the single WRITE signal will be analyzed in an electrically equivalent manner as two separate WRITE signals, $WRITE_1$ and $WRITE_2$. Since it will be seen that matrix enable gate 61 is ultimately responsive to both of these WRITE signals, it is sufficient to say at this point that the matrix enable gate 61 will not be properly energized to allow the transmission of the WRITE signals unless both $WRITE_1$ and $WRITE_2$ coincidently affect the control and input electrodes respectively of gate transistor 610. Thus, initially, the $WRITE_1$ signal proceeds directly from the outpulser 60 to the control base electrode of transistor 610 in gate 61.

The function of the $WRITE_2$ signal is to properly set all the appropriate cores in trunk number matrix 58 and in both parts of station number matrix 110, as well as indicating, by setting check core 760, that a successful identification has been made, and finally proceeding to ground through the active electrode path of transistor 610 of matrix enable gate 61. As will be more fully developed below, the instant invention assumes (and it is a valid electrical assumption) that if check core 760 is set in the upward direction by the $WRITE_2$ signal, all the appropriate cores in the two matrices will also have been properly set.

In accordance with the electrical path previously established, the $WRITE_2$ signal may be seen to be transmitted through the only one of the six bus paths providing a completed connection, i.e., bus 6, to the appropriate one of the five bus 6 input leads at the right-hand side of trunk number matrix 58 on FIG. 5. As noted before, with output steering having selected the proper one of these five leads by the operation of the 6GP1 relay, the $WRITE_2$ signal proceeds from right to left over trunk number matrix lead 1492 corresponding to the identification number of seized trunk circuit 6. The cores in the trunk number matrix 58 which are thereby set in a downward direction by the $WRITE_2$ signal, are cores 5TH1, 5H4, 8T9 and 8U2. The signal then proceeds out of the trunk number matrix 58 through the make side of 6GP1 relay transfer contact 6 and over the cabled cross-connection to the sleeve lead of seized trunk circuit 6 on FIG. 2.

From the sleeve lead of seized trunk circuit 6, the $WRITE_2$ signal proceeds over the only available electrical path back through the energized switches in the PBX switch train 24 which connect station line circuit 22, corresponding to calling extension 20, to the switch train. After having been transmitted over the sleeve lead of line circuit 22, the $WRITE_2$ signal proceeds over the cabled cross-connection shown traversing FIGS. 2, 5, 8 and 11 to the appropriate one of the one-hundred identification inputs to the hundreds-tens-units part of station number matrix 110. Since calling extension 20 has been assigned, according to our prior assumption, PBX extension 2467, the cross-connection from the sleeve lead of station line circuit 22 is to input identification lead 2467 of the H-T-U part of station number matrix 110. In proceeding through this part of the station number matrix 110, the $WRITE_2$ signal switches the following cores downward: cores 11U7, 11T6, and, due to the only available path out of this part of the station number matrix 110 by virtue of the single cross-connection unique to the 2400 group, core 11H4.

The $WRITE_2$ signal proceeds over the 2400 group cross-connection to terminal 2 of the thousands part of station number matrix 110, setting core 12TH upwards through winding B thereon and proceeding out to the common bus over FIGS. 9, 6 and 7, on the last of which it sets check core 760 up by passing through its uppermost winding (a portion of the signal also goes through shunting resistor RSH). Finally, the pulse is transmitted from this winding on core 760 to the input of the active electrode path of transistor 610 of matrix enable gate 61, going to ground within gate 61.

It may be noted, therefore, that matrix enable gate 61 is in the nature of an AND gate in that it provides a safety feature. More specifically, transistor 610 of gate 61 will not be fully energized if either the $WRITE_1$ or $WRITE_2$ signals is missing. The $WRITE_1$ signal would be absent whereas the $WRITE_2$ signal would be present under circumstances such as a false identification pulse generated by an erroneous transient or stray signal emanating from for example, the PBX switch train 24 or similar switching equipment. However, neither the matrix cores nor the check core would be set (i.e., matrix not "enabled") in that situation due to the blocking effect to ground presented by the "off" condition of gate transistor 610. On the other hand, the presence of the $WRITE_1$ signal and the absence of the corresponding $WRITE_2$ signal might occur where a legitimate identification sequence had, in fact, been initiated, but where the $WRITE_2$ signal was either mutilated in its transmission back to gate 61 or perhaps diverted to a stray ground within the PBX switch train 24 after having only set the appropriate cores in the trunk number matrix 58. (There only need be sufficient mutilation or loss so that shunting resistor RSH diverts enough of the remaining signal from the shunted winding on core 760 to prevent that core's being set. Resistor RSH can be said to require a minimum threshold level for setting core 760, this level being higher than that for the matrix cores.) In either of these situations, check core 760 in the supervision and sequence control circuit 70 will not have been set and the invention is arranged to thereupon make additional identification attempts.

G. *Check feature*

(1) *Case I—Valid first attempt identification.*—

(*a*) *CHECK signal:* For the purposes of this portion of the description, it is assumed that this first attempt to make an identification of the seized trunk and the calling extension identification numbers is successful. (This will be the situation in the vast majority of cases.) Following this assumption, check core 760 will have been set in the upward direction by the passage through its uppermost winding of the $WRITE_2$ signal as indicated immediately supra. It will now be helpful to recall that the entire write-in sequence, involving the setting of the matrix and check cores, all occurred in phase with the $T_1$ pulse which energized the outpulser 60. When the next $T_2$ pulse then proceeds to negative battery SRC through resistor RCK on FIG. 7, although it will have no effect on core 751 it will have the important effect of switching check core 760 downward; it is for this reason that this particular $T_2$ pulse is denominated as the CHECK signal.

(*b*) *BID and REPEAT INHIBIT signals.*—When this $T_2$ CHECK signal switches check core 760, both transistors 761 and 762 turn on. In turning on, transistor 761 provides an operating path to negative battery through the winding of symbolic supervisory relay 7SZR through the active electrode path of transistor 761. Relay 7SZR illustratively symbolizes a central office supervisory control circuit (not shown) which is located, as is relay 7SZR, at the PBX; its function is to request of the central office a connection to the readout and data transmitting equipment of the instant invention, of a data link such as 100 shown in block form on FIG. 1. This request in response to the energization of transistor 761 is called the BID signal and is also symbolically shown on FIG. 1 as well.

The operation of relay 7SZR energizes certain equipment (not shown) at central office 27 (FIG. 1) to establish a data link connection to the data transmitter 109 of FIG. 10. At its break contact 1 (FIG. 6), relay 7SZR operates to remove the holding ground which had previously held relays 6B1, 6B2 and 6GP1 operated. These relays now release, thereby returning the bus relay tree 62 and the group relay paths of circuit 68, consisting of buses 1–6 and the output steering contacts of relays 6GP1–6GP5 respectively, to their normal condtions. (It will be seen that any required holding grounds for trunk circuits 1–30 are still provided to these trunks from each of the grounds associated with buses 1–6 connected over various normally closed contacts of relays 6B0–6B2 through the thirty paths of the trunk number matrix 58 and over the normally closed break portions of the six transfer contacts of each of relays 6GP1–6GP5 over cross-connections to the respective trunk circuits.)

Now that a successful first attempt identification has been indicated by the proper setting and checking of core 760, the need for the recycle timer including transistor 772 is obviated. It is therefore desirable to inhibit its operation by, in turn, inhibiting its "master," i.e., the recycle control circuit 75 including transistor 770. This is achieved by the above-mentioned energization of transistor 762 which was turned on in response to the switching of check core 760 by the $T_2$ CHECK signal. A $T_{12}$ power pulse in phase with this $T_2$ CHECK signal may therefore pass through the active electrode path of transistor 762 as the REPEAT INHIBIT signal, going to negative battery SRC through a winding on recycle control core 771, switching that core downward. (Although the REPEAT INHIBIT signal also goes through a winding on core 741, it is of no effect since that core is already switched upward.) With respect to recycle control core 771, which normally would await a $T_1$ pulse through its lowest winding to switch it down and thereby activate transistor 770 to continue the charging of capacitor CRT, the REPEAT INHIBIT signal in phase with $T_2$ may be said to "pre-empt" the function of the next $T_1$ pulse. That is, as priorly discussed, the normal function of transistor 770 is to allow a $T_{12}$ pulse in phase with a $T_1$ pulse to both "self-set" core 771 upward and to then proceed to negative battery through resistor RRC and thereby additionally charge recycle timer capacitor CRT. However, the REPEAT INHIBIT signal in phase with a $T_2$ pulse which precedes the next $T_1$ pulse "steals the thunder" of the subsequent $T_1$ pulse and switches it downward. Although it is true that one final $T_{12}$ pulse will add to the charge of capacitor CRT at this time, core 771 is arranged to remain switched in the downward direction due to the overriding effect achieved by the REPEAT INHIBIT signal compared to the $T_{12}$ signal attempting to switch core 771 up. (This override is achieved by the increased mangetomotive force tending to keep the core switched downward in response to the REPEAT INHIBIT signal compared to the lesser quantum of magnetomotive force attempting to switch the core upward; somewhat more specifically, an appropriate relationship is in part provided by an illustrative and approximate 1-to-6 ratio between resistors RRI and RRC.) No additional charging of recycle timer capacitor CRT can occur at this time and capacitor CRT will be effectively "reset" when the 6CON relay releases at the end of the identification readout procedure by providing a discharge path to negative battery through its break contact 4.

(*c*) *Central office reply.*—Equipment (not shown) within central office 27 (FIG. 1) responds to the BID signal represented by the operation of relay 7SZR to indicate to the readout circuit 95 of the instant invention (FIGS. 9 and 5) that the data link 100 between the PBX identification equipment and the central office equipment has been properly established. This "transmit command" is represented by the operation of the RC relay (not shown) which, at its symbolic make contact 1 (FIG. 10), connects the data transmitter 109 to the data trunk linked to the central office. At the make contact 2 of the RC relay within the start readout gate 72, a positive pulse is delivered to the control electrode of transistor 720 which is energized in phase with a $T_{2S}$ strobe pulse superimposed on the rising positive-going pulse just mentioned. When the bias of Zener diode 700Z is overcome, transistor 720 is energized to allow a $T_2$ power pulse to switch core 721 to the left (overriding a coincident $T_2$ pulse tending to keep core 721 switched to the right) and the output signal thereby generated turns on transistor 722.

(*d*) *Start of readout.*—(i) *Pre-message bit* (*PMB*): When transistor 722 is turned on in phase with the $T_2$ pulse which switched core 721 to the left, as in-phase $T_{12}$ pulse is transmitted through the active electrode path of transistor 722 as the pre-message bit (PMB) to cores 938 and 940 of the parallel-to-serial data translator (PSDT) 915 of the readout circuit 95 as shown on FIG. 9.

(ii) *Readout advance gate.*—At this point in the switching sequence, no readout has occurred due to the closed condition of the readout advance gate (transistor 942) which must be energized in order to allow the readout stepping switch (FIG. 5) to step through the stored digits in the matrices. Transistor 942 will only be energized under rather singular conditions; that is, only when the readout windings on the odd-numbered cores of each PSDT 915 stage (e.g. cores 931, 933, 935, 937 [cores 935 and 937 not being shown] and 939) have proper polarity pulses connected to the control electrode of transistor 942. More specifically, the two right-hand windings on each of these odd-numbered cores are so arranged as to provide a positive turn-on pulse to transistor 942 only when core 939 switches in response to a $T_2$ pulse and none of the other four odd-numbered cores so switches. Thus, when any of odd-numbered cores 931–937 switch simultaneously with advance core 939, there is a cancelling effect and either a zero level signal or a negative signal is delivered to the control electrode of the readout advance gate comprising transistor 942. However, when core 939 is the only odd-numbered core to switch in response to a $T_2$ pulse (i.e., after all data associated with a particular digit is shifted through the PSDT 915), a positive polarity signal is delivered to readout advance gate transistor 942 and a $T_2$ readout signal can be transmitted to negative battery over lead REO through the readout stepping switch, comprising cores 501–509 and transistors 511–518, to read out the stored digit.

(iii) *Parallel-to-serial data translator* (*PSDT*) *915.*—The transmission of the PMB to cores 938 and 940 switches both of those cores to the right but due to the polarity arrangements of the windings on these cores there are no outputs at this time. Data stored within PSDT 915 is sequentially shifted from stage to stage and then out in the form of coded 1's and 0's to output flip-flop 108 in response to sequential $T_1$ and $T_2$ pulses which alternately switch the even-numbered and odd-numbered cores, respectively. Thus, it may be seen than $T_1$ pulses may switch cores 930, 932, 938 and 940 (cores 934 and 936 not being shown), while $T_2$ pulses may switch cores 931, 933 and 939 (cores 935 and 937 not being shown).

Data is transmitted from the PSDT 915 to the output flip-flop 108 in response to selective switching of output cores 940 and 941. Only if the polarities on leads L1 and L2 associated with core 940 and L3 and L4 associated with both cores 941 and 940 are as indicated on FIG. 9 will there be appropriate driving signals delivered to the output flip-flop 108. Thus, in the absence of any switching of core 940 which delivers "1" signals to output flip-flop 108, it is noted that core 941 switches in response to each $T_1$ pulse through its left-hand winding to provide the proper L3–L4 polarity signals to output flip-flop 108 to thereby indicate a "0." (When a $T_2$ pulse switches core 941 to the right, the polarity of the signals delivered to output flip-flop 108 is not in accordance with that indicated on leads L3 and L4 and such a signal merely resets core 941 preparatory to its being switched by the next $T_1$ pulse.)

When core 940 is switched in response to a $T_1$ pulse switching it to the left, there is a positive polarity pickup on lead L1 and a negative pickup on lead L2 thereby delivering a "1" input to the output flip-flop 108; in addition, an opposite polarity output is developed on a winding in series with the core 941 output winding. This cancels the signal from core 941 which would otherwise also send a "0" input to the output flip-flop 108. To summarize, therefore, when core 941 switches in response to a $T_1$ pulse, a "0" is transmitted to the output flip-flop 108; when both core 940 and 941 switch in response to a $T_1$ pulse, a "1" signal is indicated to the output flip-flop 108. As a final note, when readout advance gate transistor 942 is energized in response to the switching of core 939 alone, normally turning on transistor 929 to attempt to switch core 940 to the right via winding B, an inhibiting signal over lead REO through the active electrode path of transistor 942 and to negative battery through winding C on core 940 inhibits such switching by maintaining core 940 in its left-oriented direction.

(iv) *Readout stepping switch.*—It will be recalled that the PMB had switched cores 938 and 940 to the right in phas with the $T_2$ pulse which switched core 721 of start readout gate 72. The next $T_1$ pulse delivered to PSDT 915 can be seen to switch cores 938 and 940 to the left, the former causing the energization of transistor 928 and the latter providing a "1" output over leads L1 and L2 to output flip-flop 108 and providing no output on leads L3 and L4 due to the cancellation between the oppositely oriented windings on cores 940 and 941. The first bit of data has thus been transmitted over the data link 100 to equipment (not shown) at central office 27 to indicate that a data message is about to be sent. When transistor 928 is thereby energized, a $T_{12}$ pulse in phase with the $T_1$ switching pulse can pass through the active electrode path of transistor 928 and to negative battery through a winding on core 939, switching that core to the right.

At this point, therefore, the only data core (including cores 932–940) which is not in its normal switching condition is core 939 which is switched to the right. The next $T_2$ pulse delivered to the PSDT 915 accomplishes several functions. Firstly, it switches core 939 back to the left thereby providing the proper polarity readout signal to the control electrode of readout advance gate transistor 942 to energize that gate. (The switching of core 941 in response to this $T_2$ pulse provides no proper polarity output to flip-flop 108 on leads L3 and L4.) Since transistor 942 is now on, a $T_2$ pulse (still in phase with the original $T_2$ pulse) can proceed through the cores 501–509 of the readout stepping switch (FIG. 5) and over lead REO through the active electrode path of transistor 942 and to negative battery through winding C on core 940. The passage of this $T_2$ signal through winding C on core 940 initially inhibits the switching of core 940 to the right by overriding the in-phase $T_{12}$ signal tending to do this through the active electrode path of transistor 929 and winding B of core 939, transistor 929 having fired when core 939 was switched.

The only one of cores 501–509 of the readout stepping switch which will be affected by the $T_2$ readout signal over lead REO is core 501 which was the only one of those cores previously switched to the right (in response to the CLEAR signal, supra). When core 501 switches, corresponding first-stage transistor 511 is energized and allows a still in-phase $T_{12}$ pulse to pass through the active electrode path of transistor 511 through a winding on core 502 switching that core to the right (overriding the $T_2$ readout signal) and out to readout lead THT. The signal on readout lead THT provides readout of the thousands digit of the trunk number (as leads HT, TT and UT read out the hundreds, tens and units digits of the trunk number, and as leads THS, HS, TS and US read out the stored thousands, hundreds, tens and units digits of the station number) by attempting to switch trunk matrix thousands cores 5TH0–5TH9 upward, and passing out of trunk number matrix 58 to a common connection providing the timing bit input to core 930 of PSDT 915 and also firing the readout enable gate by switching readout enable gate core 906 to the right.

The only one of cores 5TH0–5TH9 which will, in fact, be switched upward is the one core which was priorly set downward by the $WRITE_2$ identification pulse, namely core 5TH1. In so switching, the polarity orientation relationship between the readout winding and the two sense windings on core 5TH1 is such that a positive polarity output will appear on sense leads 1S and 0S, these leads being respectively cabled to the control electrodes of readout gate transistors 901 and 900, respectively.

The sense windings on all matrix cores, connected in coded combinations to sense leads 7S, 4S, 2S, 1S and 0S, are arranged in the well-known 2-out-of-5 code so that for the thousands digit of trunk number 1492, as in the instant assumption, it is clear that leads 1S and 0S should provide the only outputs which thereby energize transistors 901 and 900. Since readout enable gate core 906, normally switched to the left in response to $T_1$ pulses through its right-hand winding, was switched to the right as indicated above by the timing bit $T_2$ phase signal, transistor 905 of this gate is energized. There is, therefore, an available electrical path for a $T_{12}$ pulse (still in phase with $T_2$) to pass upward through a winding on core 938 switching that core to the right and out of circuit block 911 (the details of which are identical to block 914) through the active electrode paths of transistors 901 and 905 to negative battery. Core 940 is similarly switched to the right by the passage of a $T_{12}$ pulse upward through winding A thereon and through the active electrode paths of transistors 900 and 905; this switching of core 940 is, however, slightly more complex than that of core 938 since there must be, in effect, a "double override" which adds together the similarly oriented magnetomotive forces of windings A and B to overcome that of winding C on core 940. This double overriding effect will be seen to occur only when transistor 900 is energized. Since, it will be recalled, transistor 900 is energized when one of the characters in the 2-out-of-5 code is zero, this double overriding effect only occurs when one of the decimal digits 1, 2, 4, or 7 is received by the PSDT 915.

Therefore, at the termination of this critical $T_2$ multipurpose pulse, cores 930, 938 and 940 are switched to the right; in the readout stepping switch, only core 502 is switched to the right preparatory to the next $T_2$ readout signal when readout advance gate transistor 942 is again energized. (Readout advance gate transistor 942, readout gate transistors 900 and 901, readout enable gate transistor 905, PSDT transistor 929 and readout stepping switch transistor 511 all turned off at the termination of the $T_2$ driving pulse or the in-phase $T_{12}$ driving pulse as the case may be.)

(v) *Bias cores.*—It is to be noted that the function of bias cores TKB related to trunk member matrix, 58, $STAB_1$ related to the H-T-U part of station number matrix 110 and $STAB_2$ related to the TH part of station number matrix 110, is to cancel the cumulative induced voltage associated with the sense windings on unswitched matrix cores during readout. To briefly illustrate this point only with respect to core TKB, consider the above-described readout of the thousands digit 1 of the trunk number 1492. Only core 5TH1 of cores 5TH0–5TH9 is supposed to provide a legitimate sense output on sense leads 1S and 0S. But what of the remaining sense leads 7S, 4S and 2S? Looking specifically at sense lead 7S (FIG. 5), it is in series with sense windings of thousands cores 5TH0, 5TH7, 5TH8 and 5TH9, none of which are being legitimately switched in response to the thousands digit readout signal from readout stepping switch lead THT. However, due to the fact that small induced voltages ("shuttle" voltages) on each of those sense windings may add together to cause an erroneous energization of readout gate transistor 907, the winding on bias core TKB coupled to readout lead THT is wound oppositely to the readout windings on core TKB; moreover, the TKB winding coupled to sense lead 7S has sufficient turns to generate a voltage which exceeds that generated by the four "unwanted" sense windings mentioned above. The voltage generated in the TKB sense winding in series with lead 7S is thus more than sufficient to cancel the otherwise erroneous sense output on that lead; however, this reverse bias signal is insufficient to overcome the legitimate sense outputs on leads 1S and 0S so that only readout gate transistors 900 and 901 are thereby energized. (As a specific illustration, each single turn sense winding on the four unwanted cores might generate approximately 100 millivolts when the core does not switch upon interrogation over lead THT; the TKB core sense winding may be arranged to have, for example, five turns, so that a 500-millivolt opposite polarity signal more than cancels out the 400 millivolt cumulative signal.)

(vi) *Shifting of data through PSDT 915.*—The first $T_1$ pulse delivered to PSDT 915 after the multipurpose $T_2$ pulse described above serves to set core 906 of the readout enable gate to the left, preparing that gate for the next bits of data associated with the hundreds digit of the trunk number to arrive at the 2-out-of-5 readout gate subsequently. More importantly, the $T_1$ pulse switches timing core 930, and data cores 938 and 940, as well as switching "0" output core 941. The switching of core 940 both cancels the "0" output from core 941 and also transmits a "1" over leads L1 and L2 to the output flip-flop 108 which in turn energizes data transmitter 109 to provide this bit over the data trunk to the central office. The switching of core 930 energizes transistor 920 to allow a $T_{12}$ pulse in phase with the $T_1$ switching pulse to pass through the active electrode path of transistor 920 to switch core 931 to the right. And, lastly, the switching of core 938 similarly allows an in-phase $T_1$ pulse to pass through the active electrode path of now energized transistor 928 to switch core 939 to the right. This switching sequence leaves cores 931 and 939 switched to the right and all other PSDT cores switched to the left.

These two cores are each switched back to the left in response to the next $T_2$ pulse, energizing respectively transistors 921 and 929 to provide a path through these transistors' active electrode paths for a $T_{12}$ pulse to switch cores 932 and 940 to the right. (Again, the switching of core 941 in response to $T_2$ pulses is not of the proper polarity with respect to its output winding to provide any data to output flip-flop 108.) A $T_1$ pulse now switches cores 932, 940 and 941, the latter two combining in effect to provide a "1" bit to the output flip-flop 108, and the first of these energizing transistor 922 to provide a path for a $T_{12}$ pulse to switch core 933 to the right. At this point, therefore, three successive "1" bits (representing in order the PMB, and the 0 and 1 positions of the trunk number thousands digit 1 in the 2-out-of-5 code) have been transmitted to the central office and core 933 is the only PSDT data core that can now be affected by the next $T_2$ pulse.

This next $T_2$ pulse does switch data core 933, resulting, in a manner identical to that described above, in the switching of core 934 (not shown) within block 912. The next $T_1$ pulse switches core 934 and core 941, the latter now providing a "0" bit to the output flip-flop 108 with the correct polarity signals on leads L3 and L4. A $T_2$–$T_1$–$T_2$ sequence similarly results in the transmission of an additional "0" bit to output flip-flop 108 and leaves core 938 switched to the right. A $T_1$ pulse thereupon switches that core back to the left, turning on transistor 928 to allow a $T_{12}$ pulse to switch core 939 to the right; this same $T_1$ pulse also switches core 941 to the left thereby providing the third and final "0" bit (representing the 7 position in the 2-out-of-5 code) to the output flip-flop 108. The total information thus transmitted to the output flip-flop 108 and then by the data transmitter 109 over the data trunk to the central office has been, reading from left to right, 111000; the first "1" represented the PMB and was recognized as the beginning of a data sequence by equipment (not shown) within central office 27, the second and third "1" bits represented the 0 and 1 positions in the 2-out-of-5 code, and the three "0" bits represented the 2, 4 and 7 positions in the 2-out-of-5 code. In this manner, the thousands digit 1 of the assumed trunk number 1492 is transmitted to data responsive equipment in central office 27 through data link 100.

The next $T_2$ pulse switches core 939 and energizes readout advance gate transistor 942 to allow an in-phase $T_2$ readout pulse to proceed through the readout stepping switch over lead REO and through transistor 942 to negative battery through winding C on core 940. This inhibits the switching of core 940 to the right which would otherwise occur in response to a $T_{12}$ pulse through winding B and energized transistor 929. This $T_2$ readout signal only switches core 502 of the readout stepping switch, triggering transistor 512 to allow an output $T_{12}$ readout signal to proceed through transistor 512 and out to lead HT and through readout windings on each of trunk number matrix cores 5H0–5H9; it also inserts a timing bit into PSDT 915 core 930 and switches core 906 thereby opening the readout enable gate. Only previously-switched hundreds core 5H4 is affected by this readout signal, resulting in the provision of a positive polarity sense output on each of leads 0S and 4S, thus energizing transistors 900 and 904. Data is concurrently inserted into PSDT 915 by the switching to the right of cores 940 and 934 (again a double override with respect to core 940). The next five successive $T_1$–$T_2$ timing cycles result in the provision of bits 10010, representing the hundreds digit 4 of assumed trunk number 1492, to the data link 100. The final $T_2$ pulse of these five cycles again energizes readout advance gate transistor 942 and provides for readout of the tens digit of the trunk number in a manner identical to that described above with respect to the thousands and hundreds digits. The remaining digits continue to be read out in an identical manner.

(*e*) *End of readout.*—As mentioned above, readout of the stored trunk and station number digits continues in a similar manner with successive signals on leads TT, UT, THS, HS, and TS reading out digits 9, 2, 2, 4 and 6. When the last bit of data associated with the tens digit of station number 2467 has been transmitted from PSDT 915 to data link 100, the switching of PSDT 915 core 939 again activates readout advance gate transistor 942, thereby allowing a $T_2$ readout pulse to proceed through the readout stepping switch and over lead REO to negative battery through the active electrode path of transistor 942. Readout stepping switch core 508 is thereby switched to the left, energizing coupled transistor 518 to allow a $T_{12}$ pulse to proceed through transistor 518 and to provide, over lead US, readout of units digit 7 of the station number by attempting to switch each of cores 11U0–11U9 upward.

In accordance with the assumed extension number of 2467, only core 11U7 actually switches, providing proper polarity signals on sense leads 7S and 0S thereby energizing readout gate transistors 907 and 900. As with the other steps in the readout sequence, the next core (core 509) in the readout stepping switch was switched to the right by the units digit readout signal from transistor 518. The shifting of the data of station units digit 7 proceeds until the switching of core 939 again energizes readout advance gate transistor 942 to allow a $T_2$ readout pulse to switch core 509 back to the left, thereby providing the positive and negative polarities indicated on that core's right-hand output winding.

The cabled connection from the core 509 output winding to the scan control 74 on FIG. 7 can be seen to connect the positive lead to the control electrode of scan control transistor 740, thereby energizing that transistor and operating the 7END relay over a path including ground and make contact 6 of the 6CON relay.

When the 7END relay operates, its break contact 2 causes the release of the 7SZR relay; the operation of the 7END relay also removes the holding ground at its break contact 1 (FIG. 6) which had held the 6CON relay operated. The release of the 6CON relay in turn removes at its make contact 6 the holding ground necessary to keep the 7END relay operated, and the 7END relay also releases.

(*f*) *Scanner restarts and timers reset.*—The release of the 6CON relay in response to the operation of the 7END relay serves several other functions. Initially, at its transfer contact 1, the 6CON relay furnishes a positive-going ramp signal strobed by $T_{2S}$ pulses to the control electrode of start scan gate transistor 730. This energizes the start scan gate 73 as described earlier and a START SCAN signal is provided to negative battery through winding F on scan stepping core 410. This switches that core to the right and prepares it to control scanning again by making it responsive to the next $T_1$ pulse through winding E. Scanning then continues in a manner identical to that described above until a subsequent trunk seizure is detected.

At its make contact 2 and break contact 3, the release of the 6CON relay removes ground from and returns negative battery to the control electrode of transistor 710 in start ANI gate 71, thereby insuring that no START signal will be delivered to the supervision and sequence control circuit 70 until a genuine trunk seizure is detected as indicated by the operation of the 6CON relay.

Finally, operation of the 6CON relay also interrupts, and in effect prepares for restarting of, the recycle timer and the time-out timer. The recycle timer, including transistor 772, is stopped and reset by the closure at 6CON relay break contact 4 of a discharge path to negative battery for the voltage which had been building up on capacitor CRT. Negative battery is also connected to the base of transistor 772 to guarantee that the recycle timer will not improperly trigger. The time-out timer, including transistor 773, is similarly inhibited by the provision of a discharge path to negative battery for build-up capacitor CTO through the closed break portion of transfer contact 5 of the 6CON relay. This same negative potential also directly inhibits transistor 773 by a connection to its base electrode. In addition, the source of $T_1$ pulses which had priorly served to charge capacitor CTO through resistor RTO, diode DTO and the make side of 6CON relay transfer contact 5, is removed from the capacitor by the release of the 6CON relay.

Both of these timers are thereby completely reset and will not commence their timing intervals again until the 6CON relay operates in response to a trunk seizure detection; the recycle timer, it will be recalled, also requires the additional inputs generated by the recycle control circuit including transistor 770.

Therefore, under the assumption of a valid first attempt identification, the data representing trunk number 1492 and PBX extension number 2467 has been transmitted to the appropriately responsive storage equipment (not shown) in the central office 27 over data link 100. Scanning by trunk scanner 40 has commenced again, seeking a trunk seizure of one of trunk circuits 1–30. All the matrix and PSDT cores are in their normal conditions as are the associated PSDT transistors, and all relays are released.

All that is required to commence an identification sequence essentially identical to that previously described is a trunk seizure and its detection by trunk sensing circuit 30.

(2) *Case II—Initial identification failure with successful identification subsequent to first attempt.*—It will be recalled that it has to this point been assumed that the valid identification described above was made on the first identification attempt. Statistically, this will represent the overwhelming majority of cases. However, there is the slightest statistical possibility that the first attempt will not be successful. This would be indicated to the supervision and sequence control circuit 70 by the failure of the $WRITE_2$ signal to set check core 760 upward. This might occur due to possible mutilation or diversion to ground of the $WRITE_2$ signal in being transmitted back through the PBX switch train 24 after having set the appropriate four cores of trunk number matrix 58. By the time the $WRITE_2$ signal had reached check core 760, it may be that insufficient amplitude remained to overcome the shunting effect of resistor RSH which is deliberately included to require a well-defined $WRITE_2$ signal to emerge from the switch train 24 and cores of station number matrix 110. Should the $WRITE_2$ signal be of such insufficient amplitude or lack sufficient definition to switch check core 760 upward, the supervision and sequence control circuit 70 will be seen below to interpret this as a "check failure,' in accordance with an assumption that the appropriate cores of station number matrix 110 were also not properly set.

Since check core 760 was assumedly not set in response to the $WRITE_2$ signal in phase with a $T_1$ pulse, the next $T_2$ pulse which normally acts as the CHECK signal to check core 760 (proceeding to negative source SRC through resistor RCK) will be ineffective to switch core 760 since that core is still switched down. Therefore, in contrast with Case I where a valid first attempt identification did occur, neither transistor 761 nor transistor 762 will be energized. Consequently, there will be no BID signal to operate relay 7SZR, nor will there be a REPEAT INHIBIT signal to inhibit the recycle control circuit to, in turn, inhibit the recycle timer.

The lack of a REPEAT INHIBIT signal which would ordinarily prevent additional charging of recycle timer capacitor CRT thus allows the recycle timer 77 to continue timing its interval. For the sake of description, let it be assumed that this interval is approximately 200 milliseconds, commencing after the operation of the 6CON relay had removed, at its break contact 4, the discharge path for recycle timer capacitor CRT and after the recycle control transistor 770 had been energized as described supra. This timing interval of the recycle timer 77 allows more than enough time for a successful identification to be made. In accordance with the instant Case II assumption of an initial failure, the reverse bias provided by Zener diode 772Z will be overcome by the charge on capacitor CRT approximately 200 milliseconds after the operation of the 6CON relay. When this reverse bias is overcome, recycle timer transistor 772 is energized and provides a discharge path to negative battery through the lowest winding on core 751 and the active electrode path of transistor 772. This switches core 751 upward just as if it were a legitimate START signal through the next highest winding of core 751. (However, as the discharge of the recycle timer is in phase with $T_1$, no overriding effect with respect to core 751 is necessary.)

It may be therefore be said that the operation of the recycle timer 77 in effect simulates a legitimate START signal by affecting core 751 in the exact same way as would a legitimate START signal from start ANI gate 71, i.e., by switching core 751 upward. Since core 751 is now set upward just as if it had received the legitimate START signal described above in Case I, it is apparent that the next $T_2$ pulse delivered to the winding on core 751 will serve to start a complete new identification attempt by switching core 751 downward and thereby energizing transistor 750 to provide therethrough a $T_{12}$ pulse as the CLEAR signal. Furthermore, the recycle timer capacitor CRT may again beging to charge, since transistor 772 will have turned off when the discharging signal from capacitor CRT through the active electrode path of transistor 772 has dissipated. The recycle timer 77 is, therefore, arranged to provide the identical function as just described on any additional identification attempts.

The respective functions and manners of operation of the CLEAR, WRITE and CHECK signals described above are identical on these subsequent attempts as they were with respect to the first attempt described in Case I. If it is further assumed that a valid identification does in fact occur within the permissible number of attempts, for example, five such attempts, check core 760 will be set upward by a legitimate $WRITE_2$ signal and a subsequent CHECK signal will switch core 760 to energize transistors 761 and 762 to provide the previously described BID and REPEAT INHIBIT signals, respectively. A reply from the central office 27 in response to the BID signal will again be indicated by the operation of the RC relay (not shown) which will energize the start readout gate 72 to provide the PMB to PSDT 915 to start the readout sequence. Readout will continue in a manner identical to that described with relation to Case I and at the conclusion thereof, the operation of the 7END relay again causes the release of the 6CON relay and allows for scanning to commence anew. The circuit is now in the same condition as it was following the termination of the successful identification which occurred after the first attempt described in Case I.

(3) *Case III—No complete identification within five attempts.*—An even more remote statistical possibility is the failure to provide a complete identification within the time interval represented by the predetermined number of attempts made in response to the successive operations of the recycle timer. Under these circumstances, the time-out timer including transistor 773 comes into play. An illustrative time interval of one second will be assumed for the time-out timer, this time being measured from the operation of the 6CON relay which immediately allows $T_1$ pulses through resistor RTO, diode DTO and the make portion of 6CON relay transfer contact 5 to begin charging capacitor CTO. If, as has been assumed, the time constant associated with the charging of capacitor CTO and its relation to the reverse bias provided by Zener diode 773Z is appropriate, time-out timer transistor 773 will operate approximately 1000 milliseconds following the operation of the 6CON relay, and in phase with a $T_1$ pulse.

Before considering the specific function served by the time-out timer, it may be helpful to described the nature of a typical identification "failure" which may occur as described above. Since the most usual reason for the failure of check core 760 to be set by a $WRITE_2$ signal within the predetermined number (illustratively 5) of identification attempts is that the $WRITE_2$ signal never actually emerges from the PBX switch train 24 due to a stray ground point therein, there is at least a partial identification in such an event. That is, under such ordinary "failure" conditions, at least the four trunk cores associated with the seized trunk would be properly set before the $WRITE_2$ signal would be erroneously diverted to the stray switch train ground. To illustrate this, assume that a valid trunk seizure has occurred just as in Case I, and for the sake of facilitating the description, assume it is again trunk circuit 6 with identification number 1492. The description follows that of Case I through the exact same steps, resulting in the generation of the $WRITE_1$ and $WRITE_2$ signals, the latter proceeding through bus 6 and setting cores 5TH1, 5H4, 8T9 and 8U2 and proceeding over the make portion of transfer contact 6 of relay 6GP1 back to the sleeve lead of seized trunk 6. According to the normal procedure as described in Case I, the $WRITE_2$ signal should now find its way back through the switch train 24 to the sleeve of the station line circuit associated with the calling extension. However, it is here being postulated that an erroneous ground signal has somehow become attached to the path in the PBX switch train 24 over which this particular $WRITE_2$ signal would ordinarily be transmitted. Instead of then proceeding through the appropriate cores of station number matrix 110, check core 760 and to the ground existing through the active electrode path to check gate transistor 610, the transmission of the $WRITE_2$ signal is assumedly herein terminated abruptly within the PBX switch train 24. This obviously precludes the switching of the check core 760, and assuming that the stray ground remains erroneously attached to the switch train 24 for the next four identification attempts, it is clear that check core 760 cannot be set upward by a $WRITE_2$ signal. However, the four appropriate trunk cores will remain set after the fifth attempt.

The fifth and final identification attempt by the recycle timer is made somewhat more than 800 milliseconds after the operation of the 6CON relay has indicated a trunk seizure. If it is assumed that this attempt also fails, leaving only the four priorly mentioned trunk number matrix cores appropriately set, the time-out timer will complete its first timing interval somewhat under 200 milliseconds after this final attempt has been made. When this occurs and time-out timer transistor 773 is energized, capacitor CTO can discharge to negative battery through windings on cores 760, 741, and 742. With respect to check core 760, the passage of this discharge pulse through its lowest winding simulates a legitimate $WRITE_2$ signal by switching core 760 upward just as a valid $WRITE_2$ signal would have done. This is done in phase with a $T_1$ pulse so that the immediately succeeding $T_2$ pulse, acting as the CHECK signal to core 760, switches core 760 down thereby energizing bid transistor 761 and repeat inhibit transistor 762. The generation of the *BID* and *REPEAT INHIBIT* signals then causes the circuit to operate as before (e.g., Case I) culminating in the readout sequence; readout of the stored trunk number is identical to that described in Case I. However, since no digits are stored in any portion of station number matrix 110, readout from the readout stepping switch leads THS, TS, HS, and US each insert only a timing bit per missing digit in the PSDT 915. No data can be inserted since there is none to insert. After having transmitted the trunk number data to the central office 27 over data link 100, the PSDT 915 only serves to transmit four successive series of five "0" bits each over the data link, the timing bit inserted in PSDT 915 core 930 (after five $T_1$–$T_2$ cycles) energizing readout advance gate transistor 942 each time core 939 switches, thus allowing for "readout" of the next missing digit.

After the fourth series of five "0" bits, representing the missing station units digit, is read out and transmitted over the data link 100, the 7END relay operates as before in response to the switching of core 509; this terminates the identification sequence and returns the circuit to its normal condition so as to be responsive to a subsequent trunk seizure.

(4) *Time-Out Timer—Additional Supervisory Functions.*—Returning to the time-out timer, it may be noted that although the discharge of capacitor CTO passes through a winding on each of cores 741 and 742 and switches both of those cores downward, transistor 740 is not energized at this time due to the cancellation effect between the output windings on each of cores 741 and 742. When the $T_2$ CHECK signal then switches core 760 and energizes transistor 762 to provide the REPEAT INHIBIT signal, it is seen that core 741 is switched upward by the passage of this signal through a winding thereon. Again, transistor 740 remains off at this time due to the reverse polarity of the output winding pulse of core 741. Core 741 is now switched up, while companion core 742 is switched down.

After the first time-out operation of the time-out timer, capacitor CTO automatically begins to charge again since the time-out timer is independent of any external control other than relay CON. Under the unusual circumstances whereby the response from the central office (as indicated by the operation of the RC relay which commences readout) is so slow or nonexistent as to not occur within the second 1000 millisecond time-out timer interval, transistor 773 will again operate to provide a discharge path for capacitor CTO through the same windings on cores 760, 741 and 742. The importance of this discharge pulse with respect to the scan control circuit 74 may now be made plain. Core 741 had been switched upward by the REPEAT INHIBIT signal which occurred after the first time-out of the time-out timer; core 742 was still switched downward in response to the first discharge pulse of capacitor CTO. When the second discharge pulse from capacitor CTO attempts to switch both cores 741 and 742 down, only core 741 can respond thereto and the polarity of its output winding's pulse is now in the proper direction to turn on transistor 740. Relay 7END thereby operates causing the release of the 6CON relay which in turn commences scanning and resets both the recycle and time-out timers as indicated.

A further function of the time-out timer can be noted here with respect to the valid first attempt identification described in Case I. In that situation, a valid $WRITE_2$ signal had set check core 760 upward in phase with a $T_1$ pulse and the next $T_2$ pulse (as the CHECK signal) had resulted in the BID signal (requesting a central office data link) and the REPEAT INHIBIT signal. It now becomes instructive to compare the timing intervals being timed by the time-out timer and the time sequence associated with the regular identification attempt. The starting point for this comparison should be the operation of the 6CON relay. At that point, the time-out timer begins to time its first 1000 millisecond interval. At the same time, the identification sequence begins with relation to the start ANI gate 71 which provides the START signal approximately four or five $T_1$–$T_2$ intervals after the operation of the 6CON relay. Then, in sequence with the following $T_2$, $T_1$, and $T_2$ pulses, the CLEAR-WRITE-CHECK cycle occurs. When the CHECK signal thus switches check core 760 to energize transistor 762, the REPEAT INHIBIT signal transmitted as a $T_{12}$ pulse through transistor 762 does not affect core 741 since it is already switched upward.

It is also at this time (when core 760 switches) that the BID signal is made for a data link by the operation of relay 7SZR in response to the energization of transistor 761. From now until the central office reply occurs with the operation of the RC relay which commences readout, the circuit is in effect idle and is awaiting the central office reply. Meanwhile, the time-out timer continues to time its first 1000 millisecond interval. In the unlikely event that the central office reply and the completion of readout as described above do not occur within the 1000 millisecond first time-out interval (due perhaps to unusually burdensome traffic conditions at the central office), the central office is given a "second chance" to reply to a second BID signal as follows. When the first 1000 millisecond point is reached and time-out timer transistor 773 is energized, the discharge pulse from capacitor CTO sets core 760 up and cores 741 and 742 down; none of these cores' transistors switches at this time due to the arrangement of their output windings. Time-out timer capacitor CTO now begins to charge again. The next $T_2$ pulse which proceeds through a winding on core 760 to negative source SRC through resistor RCK (this would ordinarily be the CHECK signal) switches core 760 downward and turns on transistor 761 to make another (second) BID attempt by reoperating relay 7SZR; transistor 762 also fires to allow the transmission of a $T_{12}$ pulse to negative source SRC through a winding on core 741 and resistor RR1 (this would normally be the REPEAT INHIBIT signal). Thus, the signal through the winding on core 741 switches that core upward. If central office reply and data readout still have not occurred when the second 1000 millisecond interval has elapsed, a discharge pulse from capacitor CTO now switches only core 741 but not core 742, transistor 740 is fired and the 7END relay operates to release the 6CON relay and to thereby start scanning anew. Equipment (not shown) prevents a tardy central office reply from thereafter energizing the readout circuit 95. It may therefore be said that in this rare event, no transmitted identification of a call involving a central office trunk seizure will be made.

VI. IDENTIFICATION OF OPERATOR POSITION ON OUTGOING CALL

A. *Number assignment*

As was centioned above, the instant invention is peculiarly well-adapted to provide trunk and station number identification for an outgoing trunk seizure call initiated by an operator position also. The reasons for this unique type of treatment being required are clear from an inspection of the relationship of the operator switchboard 28 on FIG. 2 and the station number matrix 110. That is, due to the special services (information, special service calls, etc.) provided by the individual operator position stations such as 28A–28N on FIG. 2, the connection which normally provide a path for the WRITE signal back from the normal station line sleeves to the cores of the station number matrix are not present or at least are not quite the same with respect to the operator positions.

More specifically, although an operator position such as 28B may seize a central office trunk by plugging a jack into the switchboard or by depressing a trunk pickup key, the sleeve leads associated with such a calling position are not associated with any particular hundred number group station matrix such as the 2400 group shown on FIG. 11. At first glance, therefore, it might be thought that, consistent with a flexible number assignment plan, a separate H-T-U station number matrix would be required merely to identify the relatively small number of operator positions in our illustrative CH 3–1000 PBX. (For example, there might be only ten such positions for the PBX and the provision of separate matrices for these positions would represent a costly expenditure inconsistent with the economic requirements of the system.)

The instant invention solves this problem in the following manner. Although an operator position seizes a central office trunk circuit differently from a regular PBX extension, scanning and detection of the seizure as well as identification of the trunk number are nonetheless handled the same way for an operator position as for the regular PBX extensions. However, regarding number identification, direct cross-connections are provided from the sleeves of the operator positions to selected ones of the switchboard terminal inputs OP0–OP9 on the thousands part of station number matrix 110 on FIG. 12. The cross-connections specifically shown on FIG. 12 are from the sleeves of operator positions 28A, 28B and 28N, with assumed station identification 0400, 1400 and 9400, respectively, to switchboard terminals OP0, OP1 and OP9, respectively, on FIG. 12. The station numbers of the operator positions (such as 1400 for position 28B) are chosen to differ only in the thousands digit from a randomly selected station number in an associated H-T-U station number matrix. Thus, operator position 28B is assigned identification number 1400 differing only in the thousands digit from the PBX extension which was assigned identification number 2400. (In many cases, all operator positions will have the same "listed" identification number, although individual number assignment is being assumed here.) Cross-connections from other operator position sleeves to the remaining OP0–OP9 terminals (except terminal OP2) allow for the assignment of four-digit identification numbers 0400, 3400, 4400, etc. to these other operator positions. The X400 designation for the operator positions is determined by the "random" connection from lead OP emerging from the left side of the thousands part of station number matrix 110 (FIG. 12) to lead 2400 of the H–T–V part of station number matrix 110 (FIG. 11). Such a connection might be termed a "parasitic" one which allows the operator positions to be assigned the same last three digits (using the same matrix cores on FIG. 11) as a regular PBX extension so that the operator positions act as "parasites" with respect to the extension station identification lead (here, lead 2400) to which they are all connected.

As a final point before a sample operator-initiated outgoing call is described, it is noted that the cross-connections to the switchboard terminals OP0–OP9 are relied on to provide the initial return paths for the $WRITE_2$ signal which is proceeding to the station number matrix 110 directly from the sleeve of the calling operator position.

B. *Illustrative operator position outgoing call*

In this portion of the description, it is assumed that operator position 28B with assigned identification number 1400 initiates an outgoing call by seizing, in the manner alluded to above (and see the Abbott et al. patent, supra), one of trunk circuits 1–30. To facilitate the description, it is further assumed that it is trunk circuit 6 with trunk identification number 1492 which is so seized (just as in the illustrative calls described in Cases I–III with respect to PBX extension 20). Thus, circuit block 306 of trunk sense group 1 within trunk sensing circuit 30 detects the seizure precisely as before by switching sense core 356 to the right. When this core is scanned by a signal over scan lead SC6 from trunk scanner 40, the switching of core 356 again sets up the relay tree by energizing transistors 341, 421, and 422 to allow for the operation of relays 6GP1, 6B1 and 6B2, respectively. The trunk scanner 40 is inhibited by the energization of scan inhibit transistor 423 while an operating path is provided for the 6CON relay by the energization of transistor 424.

The operation of the 6CON relay performs the exact same functions as described above, starting the identification sequence with a START signal from start ANI gate 71, resulting in the sequential generation of the CLEAR and WRITE signals. It is with respect to tracing the path followed by the $\text{WRITE}_2$ pulse back to the cores of station number matrix 110 that the two identification arrangements differ.

C. *Path of WRITE signals*

When the outpulser 60 generates the WRITE signal, the symbolic $\text{WRITE}_1$ signal is transmitted to the control electrode of check gate transistor 610 while the symbolic $\text{WRITE}_2$ signal is transmitted through closed bus 6 to input lead 1492 of trunk number matrix 58. The $\text{WRITE}_2$ signal proceeds through trunk number matrix 58 setting cores 5TH1, 5H4, 8T9, and 8U2 downward again, just as was done in Cases I–III supra. Further, following the same path as was priorly traced out, the $\text{WRITE}_2$ signal is transmitted through the closed make portion of transfer contact 6 of the 6GP1 relay to the sleeve lead of energized trunk circuit 6.

From this sleeve lead, the signal proceeds directly to the sleeve lead of calling operator position 28B. As mentioned above, the cross-connection from this latter sleeve lead to switchboard terminal input OP1 on FIG. 12 provides a direct connection to winding A on core 12TH1 for the $\text{WRITE}_2$ signal. This winding is arranged to have more turns than winding C on the core (connected to common terminal OPT), thereby allowing the $\text{WRITE}_2$ signal through winding A to override the same signal through winding C and yet nevertheless allowing the $\text{WRITE}_2$ signal through winding C on core 12TH2 to override or cancel the same signal passing through winding B on core 12TH2. It is believed that this will be made clearer in the following analysis.

The $\text{WRITE}_2$ signal connected to switchboard terminal OP1 passes through winding A (with two turns, for example) on core 12TH1 and thence to common terminal OPT, proceeding through the C windings (e.g., one turn each) of each of cores 12TH0–12TH9 to output lead OP. The passage of the $\text{WRITE}_2$ signal through the A winding of core 12TH1 sets that core upward, overriding the attempt of that same signal to set it downward by passing through its winding C; none of the other 12TH– cores is switched since they are already switched downward (by the CLEAR signal).

From the OP output lead of the thousands part of station number matrix 110, the $\text{WRITE}_2$ signal proceeds as a "parasite" to input lead 2400 of the H-T-U part of station number matrix 110. In proceeding through this H-T-U part, cores 11U0, 11T0 and 11H4 are each set downward and by virtue of the cross-connection from output terminal 4 of the H-T-U part of station number matrix 110 to input terminal 2 of the thousands part of station number matrix 110, an attempt is made (as would be made if any of the extension stations with identification numbers 2400–2499 originated the call) to set core 12TH2 upward through winding B.

However, this attempt is inhibited and core 12TH2 remains switched down due to the still present equal and opposite magnetomotive force associated with winding C on core 12TH2. The cores of station number matrix 110 which have thereby been set so as to be responsive to the subsequent readout signals are cores 11U0, 11T0, 11H4 and 12TH1, readout from which will provide identification of the calling operator position number 1400.

The $\text{WRITE}_2$ signal proceeds from the thousands part of station number matrix 110 just as in Case I to set check core 760 upward and to proceed to ground through the active electrode path of gate transistor 610. The $T_2$ CHECK signal input to core 760 again initiates the BID and REPEAT INHIBIT signals and the central office reply, readout and the beginning of scanning all occur in a manner identical to that described previously. If there is an initial failure to identify the identification number of the calling operator position as indicated by the maintaining of check core 760 in its downward orientation, the circuit operates in response to the recycle timer as described in Case II supra. Finally, should there be a similar failure to identify the operator position number after the predetermined number of attempts has been made, the time-out timer and readout circuit operate as described in Case III supra.

It is to be understood that the above-described arrangements are illustrative of the application of the principles of the invention. Numerous other arrangements may be devised by those skilled in the art without departing from the spirit and scope of the invention.

What is claimed is:

1. In a telephone system, a central office, a private branch exchange, a plurality of stations connectable through said private branch exchange to said central office, scanning means at said private branch exchange responsive to an outgoing service request from one of said stations for generating a start signal, identification storage means at said private branch exchange including a plurality of switching matrices for storing data individual to said stations, gating means at said private branch exchange coupled to said identification storage means, control means at said private branch exchange responsive to said start signal for transmitting an identification signal simultaneously over two paths, the first of said paths including said gating means and the second of said paths including said matrices, said private branch exchange, said control means and said gating means, checking means within said control means for signaling said central office if said data has been stored in said matrices in response to the passage of said identification signal over said second path, and data readout means at said private branch exchange responsive to a command signal from said central office for sequentially reading out said data from said matrices and transmitting said data to said central office.

2. A telephone system in accordance with claim 1 wherein said control means includes repetitive means for sending a plurality of successive identification signals over said paths in response to the failure of said gating means to be energized by said identification signal.

3. In a telephone system, a central office, a private branch exchange, a plurality of stations connectable through said private branch exchange to said central office, scanning means at said private branch exchange responsive to a central office service request from one of said stations for generating a start signal, identification storage means at said private branch exchange for storing data individual to said one of said stations, gating means at said private branch exchange including first and second energizing terminals, control means at said private branch exchange responsive to said start signal for transmitting an identification signal directly to said first of said terminals of said gating means and through said storage means and through said private branch exchange to said second of said terminals, checking means at said private branch exchange responsive to the energization of said first and said second of said terminals of said gating means for disabling said control means, data readout means at said private branch exchange, and means at said private branch exchange responsive to the disabling of said control means for causing said data readout means to read out said data stored in said storage means and transmit said data to said central office.

4. A telephone system in accordance with claim 3 wherein said checking means includes recycling means for providing a plurality of additional successive ones of said start and said identification signals in response to the energization of only one of said first and said second of said terminals of said gating means, and timing means at said private branch exchange for simulating the energization of said first and said second terminals of said gating means after the generation of a predetermined number of said identification signals.

5. In a telephone identification system at a private branch exchange connected to a central office, said private branch exchange including a plurality of switching means, a plurality of station means, trunk circuits seizable to connect said station means to said central office, sense scanning means responsive to the seizure of one of said trunk circuits for generating a start signal, matrix means for storing data individual to said station means, gating means including a first and a second terminal, said gating means being energizable by concurrent signals on each of said terminals, clearing means responsive to said start signal for transmitting a clear signal through said matrix means to eliminate priorly stored data therefrom, outpulser means responsive to said clear signal for transmitting a write identification signal concurrently to said first terminal of said gating means and through said matrix means and said switching means of said private branch exchange to said second terminal of said gating means, checking means responsive to the energization of said gating means for indicating the completion of an identification sequence to said central office, and means responsive to a reply signal from said central office for reading out said data from said matrix means and transmitting said data to said central office.

6. A telephone identification system in accordance with claim 5 wherein said checking means includes recycle means responsive to said start signal and to the nonenergization of said gating means for generating a plurality of additional start signals each to successively and sequentially energize said clearing means and said outpulser means for generating respectively a corresponding plurailty of said clear signals and said write signals, and wherein said checking means further includes means for inhibiting said clearing means in response to the energization of said gating means by any of said additional corresponding plurality of said write signals, and independent timing means for simulating in said checking means the energization of said gating means after the passage of a predetermined time interval.

7. In a telephone system, a central office, a private branch exchange, a plurality of stations connectable through said private branch exchange to said central office, scanning means at said exchange responsive to a central office service request from one of said stations for generating a start signal, number storage means at said exchange for storing identification data individual to said stations, gating means at said exchange, a pulser at said exchange, a pair of signal transmission paths between said pulser and said gating means, one of said paths including said number storage means, said pulser being responsive to said start signal for applying an identification signal to both said paths, said gating means being responsive to the appearance of said identification signal on both said paths for enabling said number storage means to receive said identification signal, checking means at said exchange for disabling said pulser in response to the storage of said data in said storage means and for causing said pulser to make additional identification attempts in response to the failure of said data to be stored in said storage means, readout control means at said exchange energizable in response to a command signal from said central office, and data readout means responsive to said readout control means for sequentially reading out said data stored in said storage means and transmitting said data to said central office.

8. An automatic telephone number identification system at a private branch exchange connected to a central office, comprising a plurality of trunk circuits linking said exchange and said central office, a plurality of extension stations connected to said exchange, scanning means for detecting the seizure of one of said trunk circuits by one of said stations, storage means, control means responsive to the detection of said seizure for interrupting said scanning means and for storing in said storage means data individual to said one of said stations and to said one of said trunk circuits, means for checking the valid storage of said data in said storage means, means responsive to said checking means for transmitting an information signal to said central office, means responsive to said information signal for reading out said data to said central office, and means responsive to said reading out of said data for energizing said scanning means.

9. In a telephone system, a central office, a private branch exchange, a plurality of stations at said exchange, a plurality of trunk means responsive to an outgoing service request from one of said stations for connecting said one of said stations to said office, sensing means at said exchange for detecting the operation of said trunk means, scanning means at said exchange responsive to said sensing means having detected the operation of one of said trunk means for governing said sensing means to disable said scanning means and to generate a start signal, trunk and station number matrix means at said exchange for storing respectively the trunk number of said one of said trunk means and the station number of said one of said stations, checking means at said exchange, matrix enabling means at said exchange connected to said checking means, pulsing means at said exhange responsive to said start signal for transmitting a first identification signal directly to said matrix enabling means and a second identification signal to said matrix enabling means over a path including said trunk number matrix means, said one of said trunk means, said exchange, said one of said stations, said station number matrix means and said checking means, means at said exchange for interrogating said checking means and for transmitting a bid signal to said central office in response to the energization of said matrix enabling means by said first and said second identification signals, data readout means at said exchange, means at said exchange responsive to said bid signal for governing said data readout means to read out said trunk number from said trunk number matrix means and said station number from said station number matrix means, and means at said exchange responsive to the completion of readout for energizing said scanning means.

10. A telephone system in accordance with claim 9 including in adidtion recycle timing means at said exchange for generating a predetermined plurality of additional start signals, means at said exchange for normally activating said recycle timing means and responsive to be inhibited by the successful interrogation of said checking means, and independent timing means at said exchange for simulating a successful interrogation of said checking means after a first predetermined time interval and for energizing said scanning means after a second predetermined time interval.

11. A telephone system in accordance with claim 9 wherein said matrix enabling means includes a PNPN transistor comprising a control electrode energizable by said first identifiaction signal and at least a first active electrode, said first active electrode being responsive to said second identification signal.

12. A telephone system in accordance with claim 9 including in addition synchronous control means at said exchange for generating timing pulses, and wherein said data readout means includes a stepping switch comprising a plurality of stages, each of said stages including a magnetic core selectively operative in response to said synchronous control means and a PNPN transistor responsive to the operation of said core for reading out a portion of said data and for switching the core of the succeeding one of said stages.

13. A telephone system in accordance with claim 12 wherein said pulsing means includes a plurality of capacitors normally charged in parallel by said synchronous control means, a magnetic core operative in response to a selected one of said timing pulses subsequent to said start signal and a corresponding plurality of PNPN transistors, each of said transistors responsive to the operation of said core for discharging said capacitors in series to furnish said first and said second identification signal.

14. A telephone automatic number identification system at a private branch exchange connected to a central office comprising a plurality of extension stations connectable to said exchange, a plurality of trunk circuits for selectively connecting said extension stations through said exchange to said office in response to a central office service request from said stations, sensing means for detecting said request in response to the operation of one of said trunk circuits, means for scanning said sensing means and for interrupting said scanning in response to said operation of said one of said trunk circuits, a trunk number matrix and a station number matrix each including a plurality of magnetic cores for registering respectively the trunk number of said one of said trunk circuits and the station number of said service-requesting station, control means operative in response to said sensing means having detected the operation of said one of said trunk circuits, relay means responsive to said sensing means for establishing a bus connection to selected ones of said cores of said trunk member matrix corresponding to said trunk number of said one of said trunk circuits and a group path from said trunk cores to said one of said trunk circuits, synchronous timing means for generating a plurality of pulses of a first phase and a second phase, identification start means responsive to the operation of said control means and to one of said second phase pulses for commencing an identification sequence by generating a start signal, clearing means responsive to said start signal and to one of said second phase pulses for generating a clear signal to reset all of said cores in said trunk number matrix and said station number matrix, supervisory means coupled to said cores of said station number matrix responsive to a failure of completion of said identification sequence for initiating an additional said identification sequence, matrix enable gating means coupled to said supervisory means, write means responsive to said clear signal and to one of said first phase pulses for transmitting a first write signal directly to said matrix enable gating means and for transmitting a second write signal to said matrix enable gating means over an electrical path including said bus connection, said selected trunk cores, said group path, said one of said trunk circuits, said exchange, said one of said stations, selected ones of said cores of said station number matrix corresponding to the station number of said service-requesting station, said supervisory means and said matrix enable gating means whereby said selected trunk cores and said selected station cores are set, check means in said supervisory means responsive to said second write signal and to one of said second phase pulses for establishing a data path to said central office and for releasing said relay means, output means connectable to said data path for reading out from said selected cores data corresponding to said trunk number of said one of said trunk circuits and to said station number of said service-requesting station and for transmitting said data to said central office, readout start means responsive to the establishment of said data path and to one of said second phase pulses for energizing said output means, terminating means responsive to the transmission of all of said data to said central office for releasing said control means, and scanning start means responsive to the release of said control means for energizing said scanning means.

15. A telephone system in accordance with claim 14 wherein said relay means includes a plurality of group relays each responsive to the operation of one of a plurality of said trunk circuits, each of said plurality of trunk circuits being associated with one of said group relays, for connecting said cores of said trunk number matrix to said plurality of said trunk circuits and a plurality of bus relays responsive to the operation of one of said trunk circuits in each of said plurality of trunk circuits for connecting said write means to said cores of said trunk number matrix.

16. A telephone system in accordance with claim 14 wherein said supervisory means further includes recycle timing means for periodically transmitting to said clearing means a predetermined plurality of additional start signals in response to selected ones of said first phase pulses and to the operation of said control means, each of said additional start signals initiating an additional said identification sequence, independent timing means responsive to the operation of said control means and to selected ones of said first phase pulses for simulating said second write signal to said check means after a first predetermined time interval and for energizing said terminating means after a second predetermined time interval, and recycle control means responsive to said start signal and to said first phase pulses for periodically energizing said recycle timing means and further responsive to the energization of said check means for inhibiting said recycle timing means.

17. A telephone system in accordance with claim 16 wherein said recycle timing means includes capacitor means responsive to be charged by signals from said recycle control means and by said first phase pulses and semiconductor means responsive to the charging of said capacitor means to a predetermined threshold for delivering one of said additional start signals to said clearing means, and wherein said clearing means includes magnetic core means operative in response to said second phase pulses and selectively to said start signal and to said additional start signals and a PNPN transistor for generating said clear signal in response to the operation of said magnetic core means.

18. A telephone system in accordance with claim 14 wherein said output means includes data translating means responsive to said readout start means and said synchronous timing means for initiating readout of said data from said trunk number matrix and stepping switch means responsive to the initation of said readout and to selected ones of said second phase pulses for reading out all of said data from said trunk number matrix and said station number matrix and for governing said data translating means to transmit all of said data over said data path to said central office.

19. A telephone system in accordance with claim 18 wherein said stepping switch means includes a plurality of coupled stages, each of said stages comprising a magnetic core operative in response to said selected ones of said second phase pulses and a PNPN transistor responsive to the operation of said core and to said synchronous timing means for selectively reading out a bit of said data, said core of the first of said stages including winding means for switching said first stage core in response to said clear signal, and said core of the last of said stages including winding means responsive to the operation of said last stage core for energizing said terminating means.

20. An automatic station identification circuit comprising a plurality of telephone stations, a plurality of trunk circuits, switching means for selectively connecting said stations to said trunk circuits in response to a service request from one of said stations, means for scanning said trunk circuits, means for interrupting said scanning in response to seizure of a trunk circuit by said switching means, means responsive to the interruption of said scanning for initiating the identification of said one of said stations, matrix means for storing identification data individual to said one of said stations, signaling means responsive to the initiation of said identification for transmitting an identification signal through said matrix means, checking mean energizable by the concurrent operation of said signaling means and the passage of said identification signal through said matrix means for inhibiting said signaling means, and output means responsive to said checking means for reading out said data from said matrix means and for activating said scanning means.

21. An automatic station identification circuit in accordance with claim 20 wherein said checking means includes bistable means for registering the passage of said identification signal through said matrix means and wherein said checking means further includes gating means responsive to said signaling means and to said bistable means for completing said identification of said one of said stations.

22. In a telephone system a central office, a private branch exchange including common switching equipment, a plurality of numerically designated trunks linking said exchange and said office, a plurality of numerically designated extension stations connectable to said trunks through said switching equipment, a plurality of numerically designated operator positions directly connectable to said trunks, detecting means at said exchange for detecting the seizure of one of said trunks in response to a service request from one of said stations and operator positions, trunk number matrix means at said exchange including a plurality of magnetic cores for registering the trunk number of said one of said trunks, first and second station number matrix means at said exchange including a plurality of magnetic cores for registering the station number of said one of said stations and the number of said one of said operator positions, gate means at said exchange including a first and a second terminal, control means at said exchange responsive to said detecting means for transmitting an identification signal directly to said first terminal and to said second terminal over a first path including said cores of said trunk number matrix means corresponding to the trunk number of said one of said trunks, said one of said trunks, said switching equipment, said one of said stations and said cores of said first and said second station number matrix means corresponding to the station number of said one of said stations if said one of said trunks is seized by a service request from one of said stations, and to said second terminal over a second path including said cores of said trunk number matrix means corresponding to the trunk number of said one of said trunks, said one of said trunks, said one of said operator positions, said cores of said first and said second station number matrix means corresponding to said one of said stations and said cores of said second station number matrix means corresponding to said one of said operator positions if said one of said trunks is seized by a service request from one of said operator positions, checking means at said exchange responsive to the energization of said first terminal and said second terminal of said gate means for inhibiting said control means, and means at said exchange responsive to the inhibiting of said control means for reading out said trunk number, said station number and said operator position number to said central office.

23. A telephone system in accordance with claim 22 wherein said trunk number, said station number and said operator position number each comprise a plurality of digits, wherein said trunk number matrix means includes a plurality of groups of said cores, one group for each of said digits of said trunk number, wherein said first station number matrix means includes a plurality of groups of said cores, one group for each particular ones of said digits of said station number and said operator position number, and wherein said second station number matrix means includes a plurality of groups of said cores, one group for each of the remaining ones of said digits of said station number and said operator position number, including in addition first cross-connecting means for transmitting said identification signal thereover from said one of said stations to said cores of said first station number matrix means corresponding to said particular ones of said digits of said station number, second cross-connecting means for transmitting said identification signal thereover from said one of said operator positions to said cores of said second station number matrix means corresponding to said remaining ones of said digits of said operator position number, third cross-connecting means coupling one of said cores of said first station number matrix means with one of said cores of said second station number matrix means, and fourth cross-connecting means coupling all of said cores of said second station number matrix means with said first cross-connecting means.

24. In a private branch exchange having telephone stations and operator positions, an identification system comprising magnetic core matrix means including a first matrix having first and second terminals thereon and a plurality of second matrices having third terminals thereon, means including said third terminals connecting each of said stations uniquely through said second matrices and to first terminals of said first matrix, and means connecting each of said operator positions to a second terminal of said first matrix and to one of said third terminals employed for identifying said stations.

25. In a private branch exchange having telephone stations and operator positions, an identification system comprising magnetic core matrix means including a first matrix having first and second terminals thereon and second matrix means having third terminals thereon, means for applying a write pulse to one of said stations, one of said third terminals and one of said first terminals to store an identification of said one station, and means for applying a write pulse to one of said operator positions, one of said second terminals, one of said third terminals, and one of said first terminals to store an identification of said one operator position.

26. In a telephone switching system having telephone stations and operator positions, an identification system comprising first and second magnetic core matrices, means for applying a write pulse to one of said stations and once to each of said matrices to identify said one station, and means for applying a write pulse to one of said operator positions, once to said second matrix, and twice to said first matrix over distinct paths to identify said one of said positions.

27. In a telephone switching system, a private branch exchange, a plurality of telephone stations and a plurality of trunks connected to said exchange, magnetic core matrix storage means for storing the identities of particular ones of said trunks and stations interconnected through said exchange, pulse generating means for generating, in succession, a clear pulse, a write pulse, and a check pulse, means for applying said clear pulse to said storage means to assure resetting of said storage means, a check magnetic core, means for applying said write pulse to said storage means and to said check core, and means for applying said check pulse to said check core.

28. In a telephone switching system, the combination of claim 27 wherein said check core includes a winding to which said write pulse is applied and impedance means connected in parallel across said winding whereby said write pulse applies a smaller magnetomotive force to said check core than to said magnetic core matrix storage means.

29. In a telephone switching system having telephone stations and trunks, an identification system comprising station and trunk number magnetic core matrices, pulser means, an AND gate, means for applying a pulse from said pulser means directly to a first terminal of said AND gate, and means for also applying said pulse from said pulser means to a second terminal of said gate over a path including one of said stations, one of said trunks, and said number matrices, said path further including a checking element.

30. In a telephone switching system, the combination of claim 29 wherein said checking element is a magnetic core located in said path and having a winding directly connected to said second terminal.

31. In a telephone system, the combination of claim 30 further comprising means for detecting failure of said checking core to switch on application of said pulse to said path, means responsive to said detecting means for causing said pulser means to apply an additional pulse to said path, and means including a second winding on said checking core distinct from said path for causing said core to switch after detection of a predetermined number of failures of said checking core to switch responsive to said pulses from said pulser means over said path.

References Cited

UNITED STATES PATENTS

| | | | |
|---|---|---|---|
| 3,211,837 | 10/1965 | Bruglemans | 179—18.61 |
| 3,231,680 | 1/1966 | Yamato et al. | 179—18.61 |
| 3,267,216 | 8/1966 | Raab et al. | 179—18.61 |

KATHLEEN H. CLAFFY, *Primary Examiner.*

L. A. WRIGHT, *Assistant Examiner.*